(12) United States Patent
Williamson et al.

(10) Patent No.: US 10,286,765 B2
(45) Date of Patent: May 14, 2019

(54) TONNEAU COVER SYSTEM FOR A CARGO BED OF A VEHICLE

(71) Applicant: Rugged Liner, Inc., Owosso, MI (US)

(72) Inventors: Scott Williamson, Orlando, FL (US); David Kosinski, Northville, MI (US); Michael Yang, St. Charles, IL (US); Xichang Yan, Nanjing (CN); Jianfeng Tong, Nanjing (CN); Chengping Wei, Nanjing (CN); Ronald Brian Smith, Oxford, MI (US); Daniel David Burger, Bruce Township, MI (US); James Mays, Flint, MI (US); Taylor M. Hixson, Farmington Hills, MI (US)

(73) Assignee: Rugged Liner, Inc., Owosso, MI (US)

( * ) Notice: Subject to any disclaimer, the term of this patent is extended or adjusted under 35 U.S.C. 154(b) by 162 days.

(21) Appl. No.: 15/536,157

(22) PCT Filed: Apr. 25, 2017

(86) PCT No.: PCT/CN2017/081841
§ 371 (c)(1),
(2) Date: Jun. 15, 2017

(87) PCT Pub. No.: WO2018/076637
PCT Pub. Date: May 3, 2018

(65) Prior Publication Data
US 2019/0001800 A1 Jan. 3, 2019

Related U.S. Application Data

(60) Provisional application No. 62/414,384, filed on Oct. 28, 2016.

(51) Int. Cl.
*B60J 7/19* (2006.01)
*B60J 7/14* (2006.01)
(Continued)

(52) U.S. Cl.
CPC ............. *B60J 7/198* (2013.01); *B60J 7/141* (2013.01); *B60P 7/00* (2013.01); *B60P 7/02* (2013.01)

(58) Field of Classification Search
CPC ..... B60J 7/198; B60J 7/141; B60J 7/19; B60J 7/185; B60P 7/02; E05B 15/024;
(Continued)

(56) References Cited

U.S. PATENT DOCUMENTS 1,688,626 A * 10/1928 Kissinger ............ E05B 15/0245
292/341.18
4,607,876 A 8/1986 Reed
(Continued)

FOREIGN PATENT DOCUMENTS

CA 2 535 201 A1 8/2006
CA 2 746 916 A1 1/2012
(Continued)

OTHER PUBLICATIONS

U.S. Appl. No. 15/536,187, filed Jun. 15, 2017, 77 pages.
(Continued)

*Primary Examiner* — Gregory A Blankenship
(74) *Attorney, Agent, or Firm* — The Dobrusin Law Firm, P.C.; Daniel P. Aleksynas

(57) ABSTRACT

A tonneau cover system includes a cover assembly coupled to first and second side rails. The cover assembly includes a cover disposed over and coupled to a frame, a latch mechanism coupled to the frame and having a catch biased toward a latch position to secure the cover to the first side rail and retractable to an unlatch position to release the cover from the first side rail, a release device coupled to the frame and latch mechanism and actuatable to move the catch to the unlatch position, and an adjustment mechanism coupled to the latch mechanism. The adjustment mechanism has a first (Continued)

portion coupled to the catch and a second portion interacting with the first portion to adjust a vertical position of the catch relative to the frame transverse to a width-wise axis defined between the side rails, with the first and/or second portions forming a sloped profile.

19 Claims, 38 Drawing Sheets

(51) Int. Cl.
    *B60P 7/02*     (2006.01)
    *B60P 7/00*     (2006.01)

(58) Field of Classification Search
    CPC ......... E05B 15/0245; E05B 2015/0275; E05B 83/00; E05B 83/02; E05B 83/18; E05B 85/22
    USPC ............. 296/100.07, 100.16, 136.03, 100.04
    See application file for complete search history.

(56) References Cited

U.S. PATENT DOCUMENTS

| | | |
|---|---|---|
| 4,639,033 A | 1/1987 | Wheatley et al. |
| 4,730,866 A | 3/1988 | Nett |
| 4,747,441 A | 5/1988 | Apolzer et al. |
| 4,757,854 A | 7/1988 | Rippberger |
| 4,838,602 A | 6/1989 | Nett |
| 4,991,640 A | 2/1991 | Verkindt et al. |
| 5,058,652 A | 10/1991 | Wheatley et al. |
| 5,076,338 A | 12/1991 | Schmeichel et al. |
| 5,096,250 A | 3/1992 | Menz |
| 5,121,960 A | 6/1992 | Wheatley |
| 5,165,750 A | 11/1992 | Pirhonen |
| 5,174,353 A | 12/1992 | Schmeichel et al. |
| 5,207,262 A | 5/1993 | Rushford |
| 5,228,736 A | 7/1993 | Dutton |
| 5,251,951 A | 10/1993 | Wheatley |
| 5,275,458 A | 1/1994 | Barben et al. |
| 5,301,913 A | 4/1994 | Wheatley |
| 5,301,995 A | 4/1994 | Isler |
| 5,310,238 A | 5/1994 | Wheatley |
| 5,365,994 A | 11/1994 | Wheatley et al. |
| 5,460,423 A | 10/1995 | Kersting et al. |
| 5,472,256 A | 12/1995 | Tucker |
| 5,487,585 A | 1/1996 | Wheatley |
| 5,511,843 A | 4/1996 | Isler et al. |
| 5,513,934 A | 5/1996 | German |
| 5,636,893 A | 6/1997 | Wheatley et al. |
| 5,653,491 A | 8/1997 | Steffens et al. |
| 5,655,807 A | 8/1997 | Rosario |
| 5,758,922 A | 6/1998 | Wheatley |
| 5,765,903 A | 6/1998 | Essig et al. |
| 5,772,273 A | 6/1998 | Wheatley |
| 5,860,691 A | 1/1999 | Thomsen et al. |
| 5,934,735 A | 8/1999 | Wheatley |
| 6,024,401 A | 2/2000 | Wheatley et al. |
| 6,053,556 A | 4/2000 | Webb |
| 6,053,558 A | 4/2000 | Weldy et al. |
| 6,059,350 A | 5/2000 | Kooiker |
| 6,126,226 A | 10/2000 | Wheatley |
| 6,209,366 B1 | 4/2001 | Zagoroff |
| 6,234,561 B1 | 5/2001 | Huotari |
| 6,257,306 B1 | 7/2001 | Weldy |
| 6,257,647 B1 | 7/2001 | Ninness et al. |
| 6,293,608 B1 | 9/2001 | Dicke et al. |
| 6,309,006 B1 | 10/2001 | Rippberger |
| 6,322,129 B2 | 11/2001 | Huotari |
| 6,386,616 B1 | 5/2002 | Wheatley |
| 6,422,635 B1 | 7/2002 | Steffens et al. |
| 6,427,500 B1 * | 8/2002 | Weinerman .............. B60J 7/198 292/196 |
| 6,439,640 B1 | 8/2002 | Wheatley |
| 6,454,337 B2 | 9/2002 | Steffens et al. |
| 6,499,791 B2 | 12/2002 | Wheatley |
| 6,520,559 B1 | 2/2003 | Steffens et al. |
| 6,527,330 B1 | 3/2003 | Steffens et al. |
| 6,543,835 B2 | 4/2003 | Schmeichel et al. |
| 6,543,836 B1 | 4/2003 | Wheatley |
| 6,547,310 B2 | 4/2003 | Myers |
| 6,565,141 B1 | 5/2003 | Steffens et al. |
| 6,568,740 B1 | 5/2003 | Dimmer |
| 6,575,520 B1 | 6/2003 | Spencer |
| 6,585,309 B2 | 7/2003 | Dicke |
| 6,588,825 B1 | 7/2003 | Wheatley |
| 6,607,234 B1 | 8/2003 | Schmeichel |
| 6,619,719 B1 | 9/2003 | Wheatley |
| 6,669,264 B1 | 12/2003 | Tucker |
| 6,672,644 B2 | 1/2004 | Schmeichel |
| 6,688,668 B2 | 2/2004 | Stevens et al. |
| 6,719,353 B1 | 4/2004 | Isler et al. |
| 6,722,096 B2 | 4/2004 | Von Arx et al. |
| 6,752,449 B1 | 6/2004 | Wheatley |
| 6,808,220 B2 | 10/2004 | Wheatley |
| 6,808,221 B2 | 10/2004 | Wheatley |
| 6,811,203 B2 | 11/2004 | Wheatley |
| 6,814,388 B2 | 11/2004 | Wheatley |
| 6,814,389 B2 | 11/2004 | Wheatley |
| 6,824,191 B2 | 11/2004 | Wheatley |
| 6,851,738 B1 | 2/2005 | Schmeichel et al. |
| 6,857,683 B2 | 2/2005 | Myers |
| 6,893,073 B2 | 5/2005 | Wheatley |
| 6,953,312 B1 | 10/2005 | Wheatley |
| 6,976,724 B2 | 12/2005 | Wheatley |
| 7,008,000 B1 | 3/2006 | Schmeichel |
| 7,011,284 B2 | 3/2006 | Melius |
| 7,025,403 B2 | 4/2006 | Wheatley |
| 7,037,057 B1 | 5/2006 | Wheatley |
| 7,048,277 B1 | 5/2006 | Schmeichel |
| 7,052,071 B2 | 5/2006 | Mulder et al. |
| 7,066,524 B2 | 6/2006 | Schmeichel et al. |
| 7,104,586 B2 | 9/2006 | Schmeichel et al. |
| 7,150,490 B2 | 12/2006 | Malmberg et al. |
| 7,165,803 B2 | 1/2007 | Malmberg et al. |
| 7,188,888 B2 | 3/2007 | Wheatley et al. |
| 7,204,540 B2 | 4/2007 | Wheatley |
| 7,252,322 B2 | 8/2007 | Rusu |
| 7,258,387 B2 | 8/2007 | Weldy |
| 7,334,830 B2 | 2/2008 | Weldy |
| 7,384,090 B1 | 6/2008 | Weldy |
| 7,427,095 B2 | 9/2008 | Wheatley |
| 7,445,264 B2 | 11/2008 | Spencer et al. |
| 7,472,941 B2 | 1/2009 | Schmeichel et al. |
| 7,484,788 B2 | 2/2009 | Calder et al. |
| 7,484,790 B2 | 2/2009 | Wheatley |
| 7,537,264 B2 | 5/2009 | Maimin et al. |
| 7,604,282 B2 | 10/2009 | Spencer et al. |
| 7,607,714 B2 | 10/2009 | Wheatley |
| 7,621,582 B2 | 11/2009 | Schmeichel et al. |
| 7,628,442 B1 | 12/2009 | Spencer et al. |
| RE41,078 E | 1/2010 | Schmeichel |
| 7,735,881 B2 | 6/2010 | Steffens et al. |
| RE41,724 E | 9/2010 | Myers |
| 7,815,239 B1 | 10/2010 | Schmeichel et al. |
| 7,828,361 B1 | 11/2010 | Spencer |
| 7,887,114 B2 | 2/2011 | Spencer |
| 7,905,536 B2 | 3/2011 | Yue |
| 8,033,591 B2 | 10/2011 | Schmeichel et al. |
| 8,061,758 B2 | 11/2011 | Maimin et al. |
| 8,083,281 B2 | 12/2011 | Schmeichel et al. |
| 8,128,149 B1 * | 3/2012 | Wolf .......................... B60J 7/10 160/371 |
| 8,146,981 B2 | 4/2012 | Huotari et al. |
| 8,167,353 B2 | 5/2012 | Schmeichel et al. |
| 8,182,021 B2 | 5/2012 | Maimin et al. |
| 8,186,740 B2 | 5/2012 | Huotari et al. |
| 8,205,928 B2 | 6/2012 | Steffens et al. |
| 8,256,820 B2 | 9/2012 | Spencer |
| 8,262,148 B2 | 9/2012 | Rusher et al. |
| 8,308,218 B2 | 11/2012 | Kneifl et al. |
| 8,328,267 B2 | 12/2012 | Schmeichel et al. |
| 8,336,946 B2 | 12/2012 | Schrader et al. |
| 8,348,328 B2 | 1/2013 | Walser et al. |

(56) References Cited

U.S. PATENT DOCUMENTS

| | | | |
|---|---|---|---|
| 8,439,423 | B2 | 5/2013 | Schmeichel et al. |
| 8,475,096 | B2 | 7/2013 | Spencer et al. |
| 8,480,154 | B2 | 7/2013 | Yue |
| 8,523,266 | B2 | 9/2013 | Yue |
| 8,567,843 | B2 | 10/2013 | Schmeichel et al. |
| 8,573,678 | B2 | 11/2013 | Yue |
| 8,585,120 | B2 | 11/2013 | Rusher et al. |
| 8,596,708 | B2 | 12/2013 | Schmeichel |
| 8,632,114 | B2 | 1/2014 | Yue |
| 8,632,211 | B2 | 1/2014 | Cho |
| 8,641,124 | B1 | 2/2014 | Yue |
| 8,657,542 | B2 | 2/2014 | Liu et al. |
| 8,672,388 | B2 | 3/2014 | Rusher et al. |
| 8,714,622 | B2 | 5/2014 | Spencer et al. |
| 8,814,249 | B2 | 8/2014 | Rossi |
| 8,857,887 | B1 | 10/2014 | Schmeichel |
| 8,939,494 | B2 | 1/2015 | Maimin et al. |
| 8,960,764 | B2 | 2/2015 | Spencer |
| 8,960,765 | B2 | 2/2015 | Facchinello et al. |
| 9,039,066 | B1 | 5/2015 | Yue |
| 9,045,069 | B2 | 6/2015 | Schmeichel et al. |
| 9,056,542 | B2 | 6/2015 | Schmeichel |
| 9,067,481 | B2 | 6/2015 | Xu |
| 9,120,413 | B2 | 9/2015 | Fink |
| 9,211,833 | B2 | 12/2015 | Rusher et al. |
| 9,211,834 | B2 | 12/2015 | Facchinello et al. |
| 9,221,380 | B2 | 12/2015 | Spencer et al. |
| 9,254,735 | B2 | 2/2016 | Spencer |
| 9,260,139 | B2 | 2/2016 | Schmeichel |
| 9,278,611 | B2 | 3/2016 | Maimin et al. |
| 9,290,122 | B2 | 3/2016 | Spencer |
| 9,333,842 | B2 | 5/2016 | Yue |
| 9,643,479 | B1 | 5/2017 | Zheng et al. |
| 9,895,963 | B1 | 2/2018 | Spencer |
| 2002/0096268 | A1* | 7/2002 | Schmeichel ............. B60J 7/102 160/328 |
| 2002/0096910 | A1 | 7/2002 | Schmeichel et al. |
| 2004/0124658 | A1 | 7/2004 | Wheatley |
| 2004/0245799 | A1 | 12/2004 | Rusu |
| 2005/0099033 | A1 | 5/2005 | Chverchko et al. |
| 2005/0264024 | A1* | 12/2005 | Mulder ................ B60J 7/1621 296/100.07 |
| 2006/0012211 | A1 | 1/2006 | Keller |
| 2007/0205629 | A1 | 9/2007 | Wheatley |
| 2008/0100088 | A1 | 5/2008 | Calder et al. |
| 2008/0129077 | A1 | 6/2008 | Weldy |
| 2013/0015678 | A1 | 1/2013 | Williamson et al. |
| 2013/0093206 | A1 | 4/2013 | Rusher et al. |
| 2013/0106134 | A1 | 5/2013 | Spencer et al. |
| 2014/0042754 | A1 | 2/2014 | Spencer |
| 2014/0042769 | A1 | 2/2014 | Spencer |
| 2014/0312645 | A1 | 10/2014 | Maimin |
| 2015/0054300 | A1 | 2/2015 | Shi et al. |
| 2015/0061315 | A1 | 3/2015 | Facchinello et al. |
| 2015/0145277 | A1 | 5/2015 | Shi et al. |
| 2015/0224862 | A1 | 8/2015 | Yue |
| 2015/0246602 | A1 | 9/2015 | Schmeichel et al. |
| 2015/0321543 | A1 | 11/2015 | Fink |
| 2016/0059682 | A1 | 3/2016 | Rusher et al. |
| 2016/0075220 | A1 | 3/2016 | Williamson et al. |
| 2016/0096421 | A1 | 4/2016 | Facchinello et al. |
| 2016/0096422 | A1 | 4/2016 | Facchinello et al. |
| 2016/0096423 | A1 | 4/2016 | Facchinello et al. |
| 2016/0107515 | A1 | 4/2016 | Shi et al. |
| 2016/0137042 | A1 | 5/2016 | Maimin et al. |
| 2016/0280123 | A1 | 9/2016 | Rohr et al. |
| 2018/0118004 | A1* | 5/2018 | Schmeichel ............. B60J 7/141 |
| 2019/0001800 | A1* | 1/2019 | Williamson ............. B60J 7/141 |

FOREIGN PATENT DOCUMENTS

| | | | |
|---|---|---|---|
| CA | 2914607 | A1 | 4/2016 |
| CN | 101400532 | A | 4/2009 |
| CN | 201534517 | U | 7/2010 |
| CN | 103612591 | A | 3/2014 |
| CN | 204249894 | U | 4/2015 |
| CN | 205010076 | U | 2/2016 |
| CN | 105620343 | A | 6/2016 |
| CN | 205836642 | U | 12/2016 |
| WO | WO 2013/056124 | A1 | 4/2013 |
| WO | WO 2016/066132 | A1 | 5/2016 |
| WO | WO 2016/070276 | A1 | 5/2016 |

OTHER PUBLICATIONS

Office Action of Application No. 2,991,724 from the Canadian Intellectual Property Office dated Dec. 17, 2018.

Non-Final Office Action from U.S. Appl. No. 15/536,187 dated May 23, 2018.

International Search Report and Written Opinion, PCT/CN2017/081841, dated Aug. 7, 2017, international filing date Apr. 25, 2017.

Potentially related U.S. Appl. No. 15/536,187, filed Jun. 15, 2017.

* cited by examiner

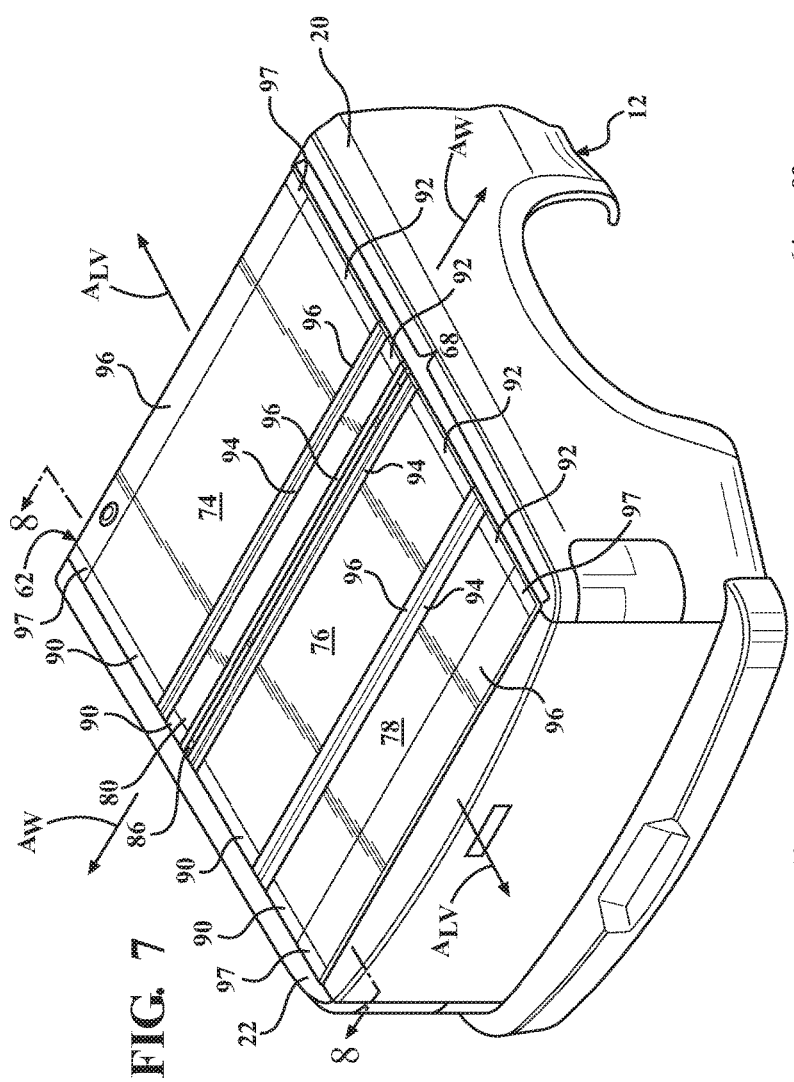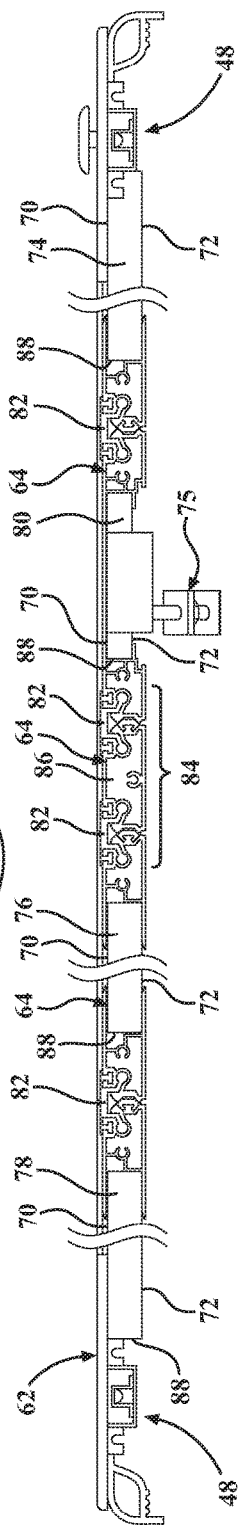

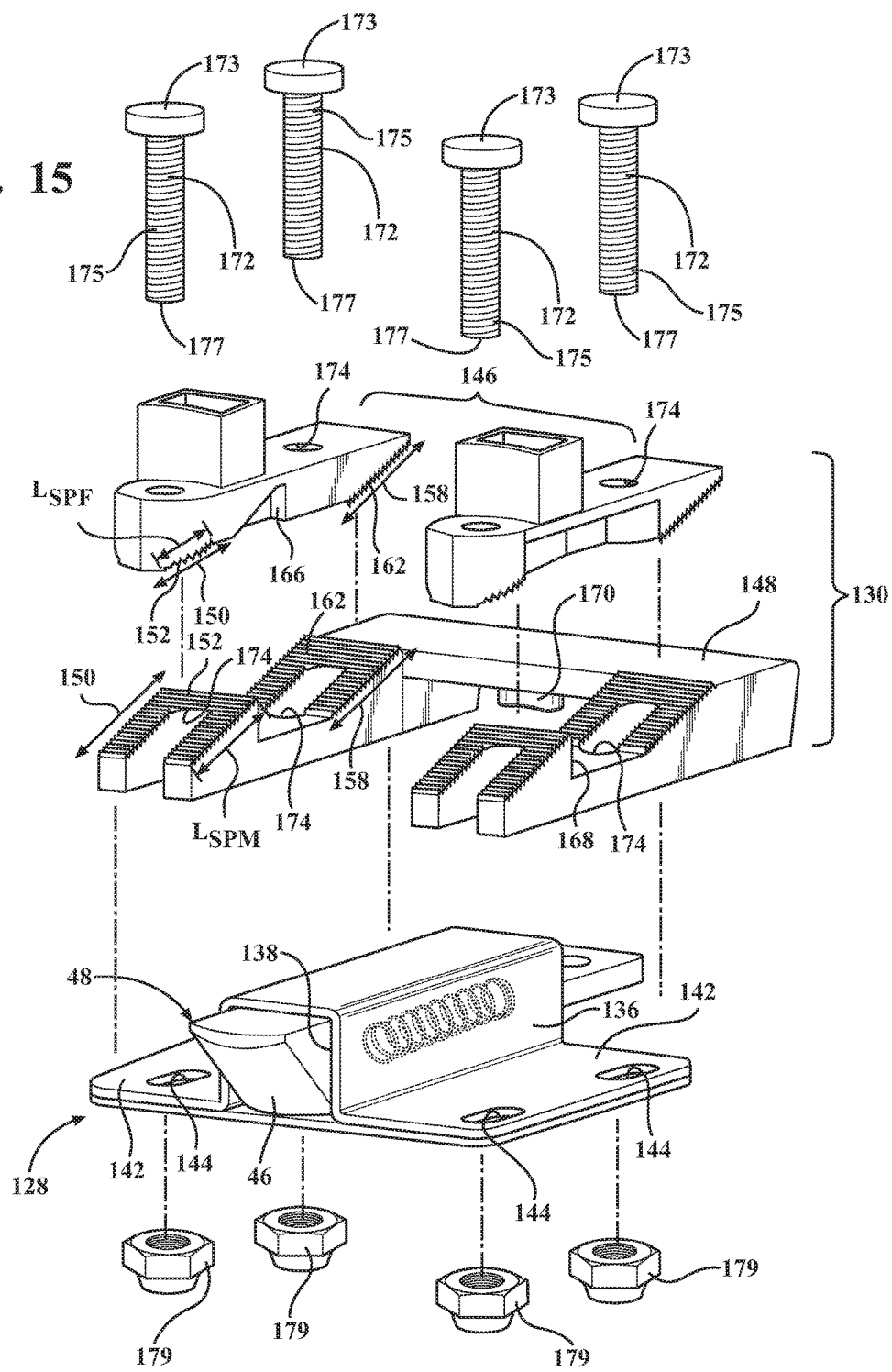

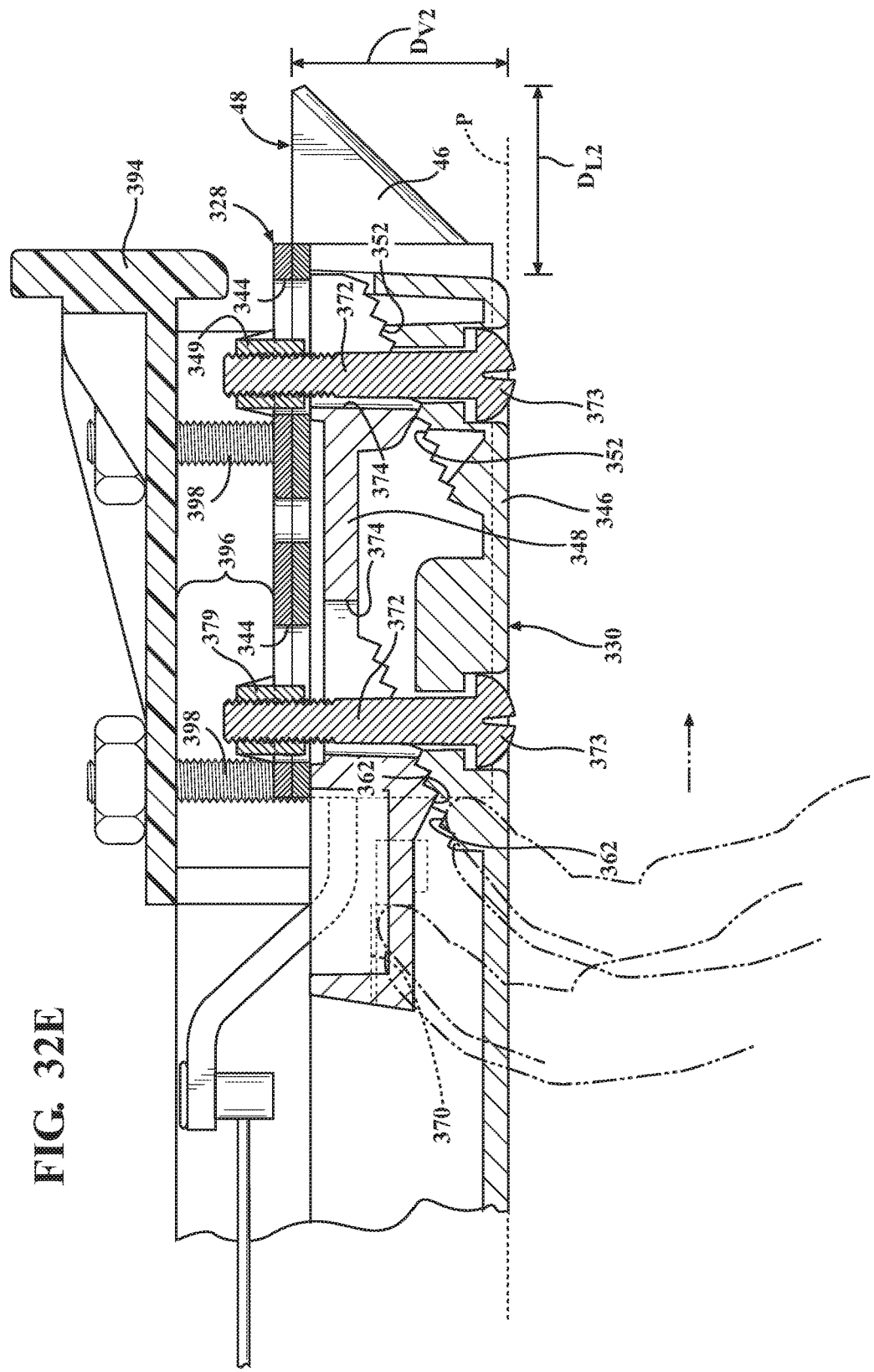

TONNEAU COVER SYSTEM FOR A CARGO BED OF A VEHICLE

CROSS REFERENCE TO RELATED APPLICATIONS

The subject application is the National Stage of International Application No. PCT/CN2017/081841 filed on Apr. 25, 2017, which claims priority to and all of the benefits of U.S. Provisional Application No. 62/414,384 filed Oct. 28, 2016, the contents of which are expressly incorporated herein in their entirety.

FIELD OF THE INVENTION

The present disclosure relates generally to a tonneau cover system for a cargo bed of a vehicle.

BACKGROUND

Tonneau covers are often used for covering a cargo bed of a vehicle, such as a pickup truck. Typically, the tonneau cover is mounted to the cargo bed utilizing a slam latch or other suitable latch mechanism. Dimensional variability of the cargo bed from one vehicle to the next, temporal changes, and/or structural changes to the cargo bed over time may affect the ability of the catch of the latch mechanism to adequately engage the side rails mounted to the cargo bed. It may therefore be desirable to adjust a position of the catch so that the catch can adequately engage the side rails when the tonneau cover is mounted to the cargo bed. The present disclosure is aimed at addressing this issue.

SUMMARY

In one embodiment of the present disclosure, a tonneau cover system for a cargo bed of a vehicle comprises a first side rail adapted to be mounted about the cargo bed of the vehicle with the first side rail having a first receiving feature, a second side rail adapted to be mounted about the cargo bed of the vehicle with the second side rail spaced from the first side rail to define a width-wise axis extending between the side rails and adapted to extend along a width of the cargo bed, and a cover assembly coupled to the side rails. The cover assembly comprises a frame, a cover disposed over and coupled to the frame for covering the cargo bed of the vehicle, a latch mechanism coupled to the frame with the latch mechanism having a catch biased toward a latch position to engage the first receiving feature to secure the cover to the first side rail and the catch being retractable to an unlatch position spaced from the first receiving feature to release the cover from the first side rail, a release device coupled to the frame and latch mechanism, and actuatable to move the catch to the unlatch position, and an adjustment mechanism coupled to the latch mechanism with the adjustment mechanism having a first portion coupled to the catch and a second portion interacting with the first portion to adjust a vertical position of the catch relative to the frame transverse to the width-wise axis with at least one of the first and second portions forming a sloped profile.

In another embodiment of the present disclosure, a tonneau cover system for covering a cargo bed of a vehicle comprises a first side rail adapted to be mounted about the cargo bed of the vehicle with the first side rail having a first receiving feature, a second side rail adapted to be mounted about the cargo bed of the vehicle with the second side rail spaced from the first side rail to define a width-wise axis extending between the side rails and adapted to extend along a width of the cargo bed, and a cover assembly coupled to the side rails. The cover assembly comprises a frame, a cover disposed over and coupled to the frame for covering the cargo bed of the vehicle, a latch mechanism coupled to the frame with the latch mechanism having a catch biased toward a latch position to engage the first receiving feature to secure the cover to the first side rails and the catch being retractable to an unlatch position spaced from the first receiving feature to release the cover from the first side rail, a release device coupled to the frame and latch mechanism and actuatable to move the catch to the unlatch position, and an adjustment mechanism coupled to the latch mechanism with the adjustment mechanism having a first portion coupled to the catch and adjustable along the width-wise axis to adjust a lateral position of the catch independent of the movement of the catch between the latch and unlatch positions and the adjustment mechanism further including a second portion interacting with the first portion to adjust a vertical position of the catch relative to the frame transverse to the width-wise axis.

BRIEF DESCRIPTION OF THE DRAWINGS

The advantages of the present disclosure will be readily appreciated as the same becomes better understood by reference to the following detailed description when considered in connection with the accompanying drawings. It is to be understood that the drawings are purely illustrative and are not necessarily drawn to scale.

FIG. 7 is a semi-schematic perspective view of the cargo bed of the vehicle with the foldable hard tonneau cover system disposed over and covering the cargo bed.

FIG. 8 is a cross-sectional view of the cover assembly of the foldable hard tonneau cover system taken along line 8-8 in FIG. 7. Cross-hatching has been removed from FIG. 8 for purposes of simplifying the drawing.

FIG. 15 is an exploded view of a portion of the cover assembly of the foldable hard tonneau cover system.

FIG. 16A illustrates the portion of the cover assembly prior to adjustment of the latch mechanism.

FIG. 32A illustrates the portion of the cover assembly prior to adjustment of the latch mechanism.

FIG. 32E is a cross-sectional view of the portion of the cover assembly of FIG. 27 illustrating simultaneous adjustment of the lateral and vertical positions of the latch mechanism.

DETAILED DESCRIPTION

Figure 1:
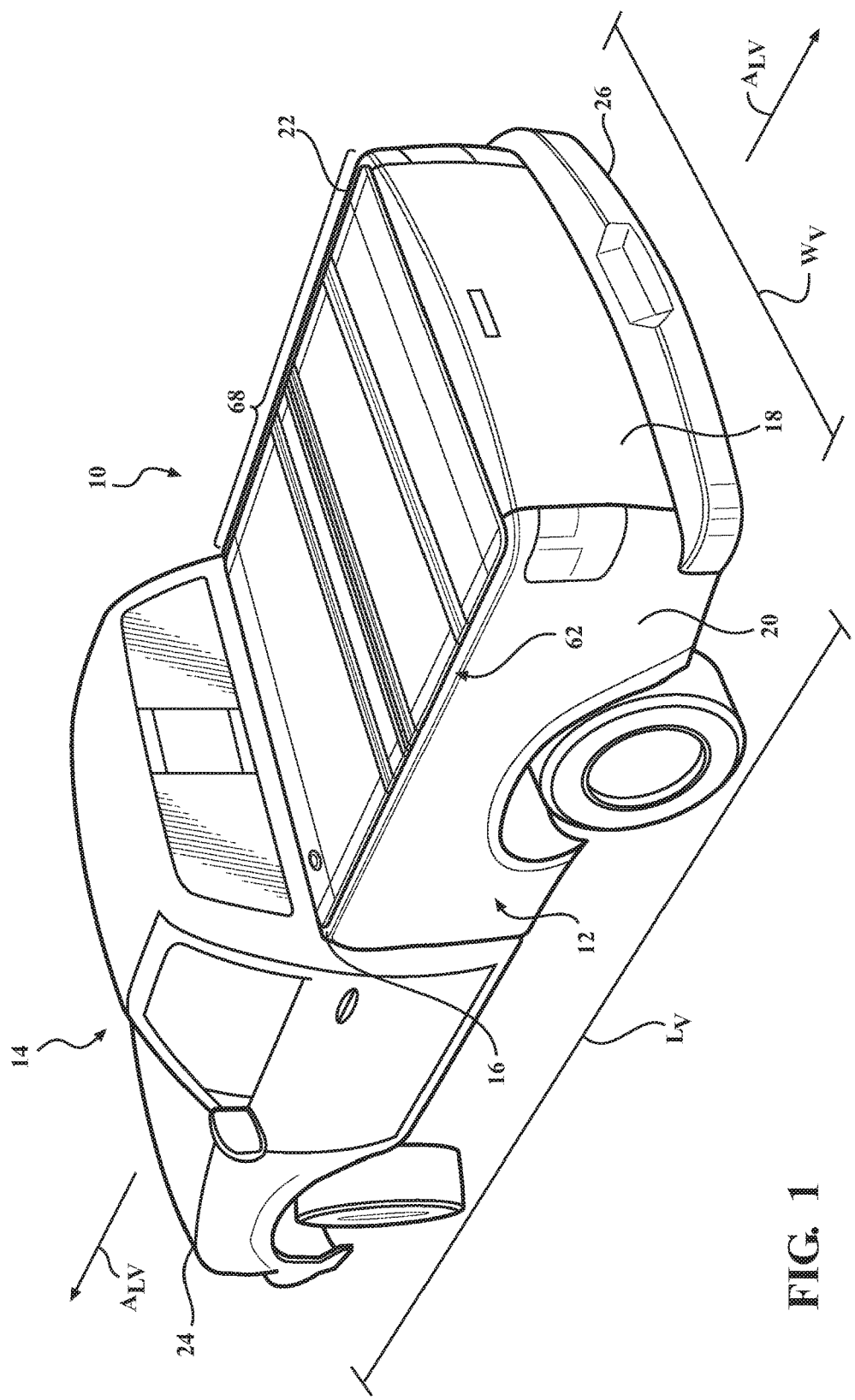
FIG. 1 is a semi-schematic perspective view of a vehicle including a cargo bed with an embodiment of a tonneau cover system disposed over and covering the cargo bed. This embodiment of the tonneau cover system includes a plurality of panels formed from a rigid material, and the tonneau cover system may be referred to as a foldable hard tonneau cover system.

Referring now to the figures, wherein like numerals indicate corresponding parts throughout the several views, embodiments of a tonneau cover system 10, 200 are shown throughout the figures and are described in detail below. In one embodiment, the tonneau cover system 10 has a plurality of panels 68 formed of a rigid material, and the system 10 may be referred to as a foldable hard tonneau cover system. In another embodiment, the tonneau cover system 200 has a foldable flexible cover 266, and the system 200 may be referred to as a foldable flexible tonneau cover system. Details of the tonneau cover assembly 10 are described below with reference to FIGS. 1-16E, and details of the tonneau cover assembly 200 are described afterwards with reference to FIGS. 17-32E.

Figure 2:
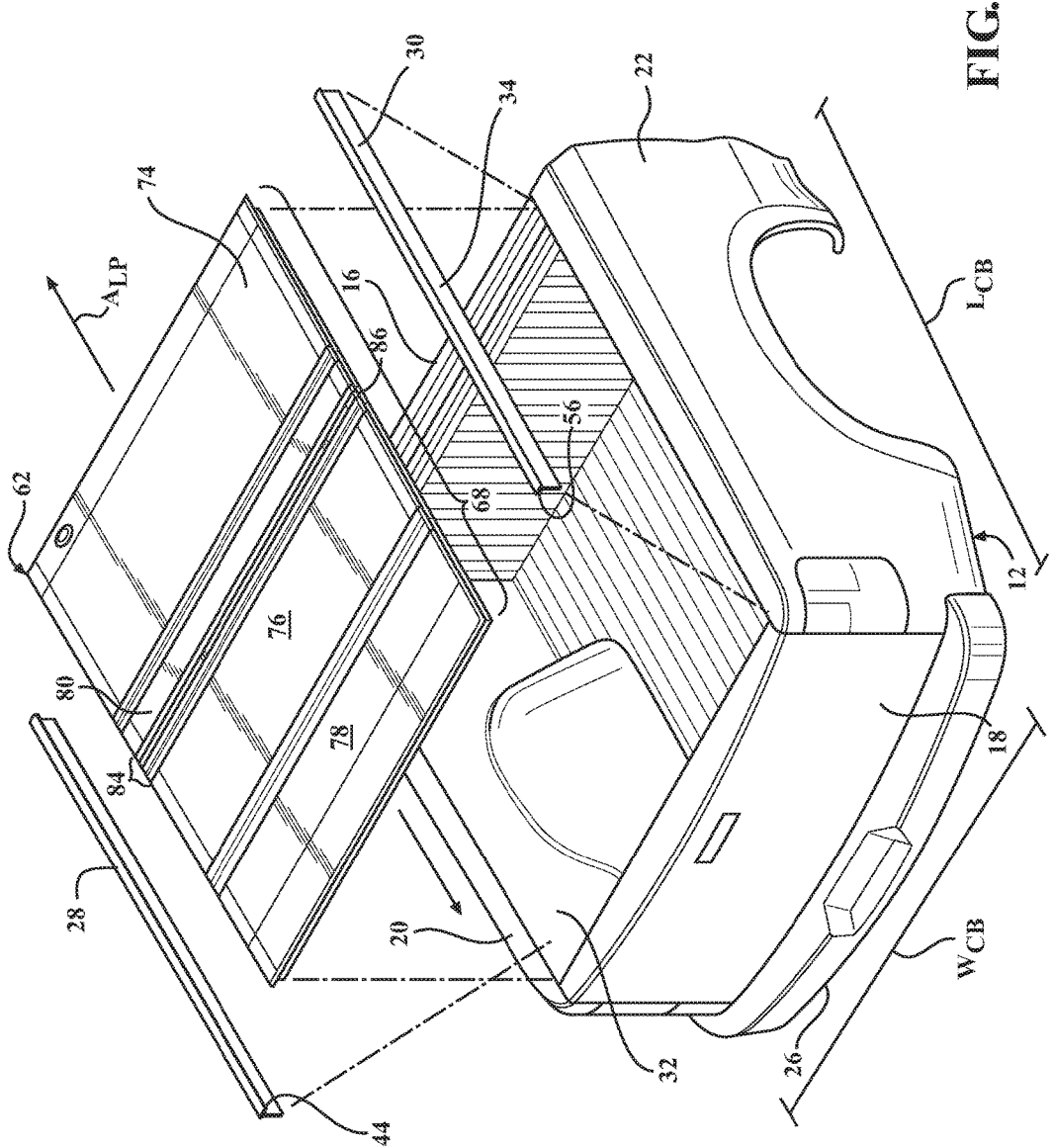
FIG. 2 is a semi-schematic exploded view of the foldable hard tonneau cover system disposed over and covering the cargo bed of the vehicle.

As shown in FIGS. 1 and 2, the tonneau cover system 10 may be disposed over and at least partially cover a cargo bed 12 of a vehicle 14. In one example, the vehicle 14 is a pickup truck including the cargo bed 12, and the tonneau cover system 10 is disposed over and at least partially covers the cargo bed 12. The cargo bed 12 has a header 16, a tailgate 18, an opposing sides 20, 22, and the tonneau cover system 10 is disposed over and coupled to the opposing sides 20, 22. The cargo bed 12 has a width $W_{CB}$ extending between the opposing sides 20, 22, and a length $L_{CB}$ extending between the header 16 and the tailgate 18. The vehicle 14 has a front end 24 and a tail end 26, and the vehicle 14 has a length $L_V$ extending between the front 24 and tail 26 ends. The vehicle 14 further has a width $W_V$ extending between the opposing sides 20, 22 of the cargo bed 12. As shown, the width $W_V$ of the vehicle 14 is the same as the width $W_{CB}$ of the cargo bed 12. The vehicle 14 further defines a longitudinal axis $A_{LV}$ extending along the length $L_V$ of the vehicle 14.

As shown in FIGS. 1-5, the tonneau cover system 10 includes first 28 and second 30 side rails each adapted to be mounted about the cargo bed 12 of the vehicle 14. The first side rail 28 is spaced from the second side rail 30 to define a width-wise axis $A_W$ between the side rails 28, 30 and adapted to extend along a width $W_{CB}$ of the cargo bed 12. The first side rail 28 is parallel with and mounted to one of the sides 20 of the cargo bed 12, and the second side rail 30 is parallel with and mounted to the other side 22 of the cargo bed 12. The side rails 28, 30 extend at least partially along the respective side 20, 22, and along at least a portion of the length $L_{CB}$ of the cargo bed 12. In the embodiment shown in FIG. 2, the side rails 28, 30 extend along the entire length $L_{CB}$ of the cargo bed 12. In an alternative embodiment, the side rails 28, 30 could be discontinuous. For example, each side rail 28, 30 could have a plurality of strikers distributed at preselected locations along the sides 20, 22 of the cargo bed 12.

Figure 3:
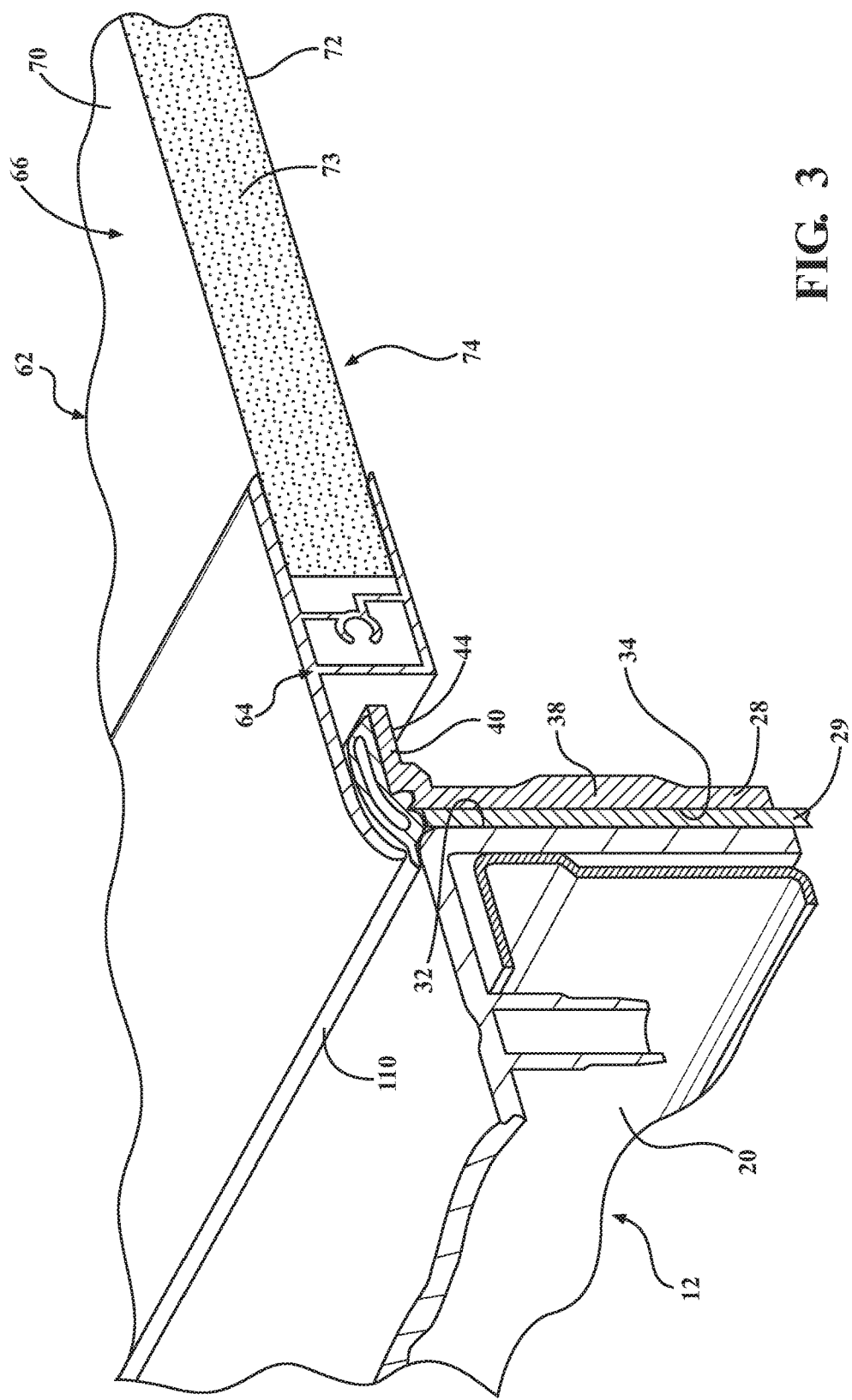
FIG. 3 is a semi-schematic, perspective, cross-sectional view of a portion of the cargo bed and a portion of the foldable hard tonneau cover system mounted to the cargo bed.
Figure 4:
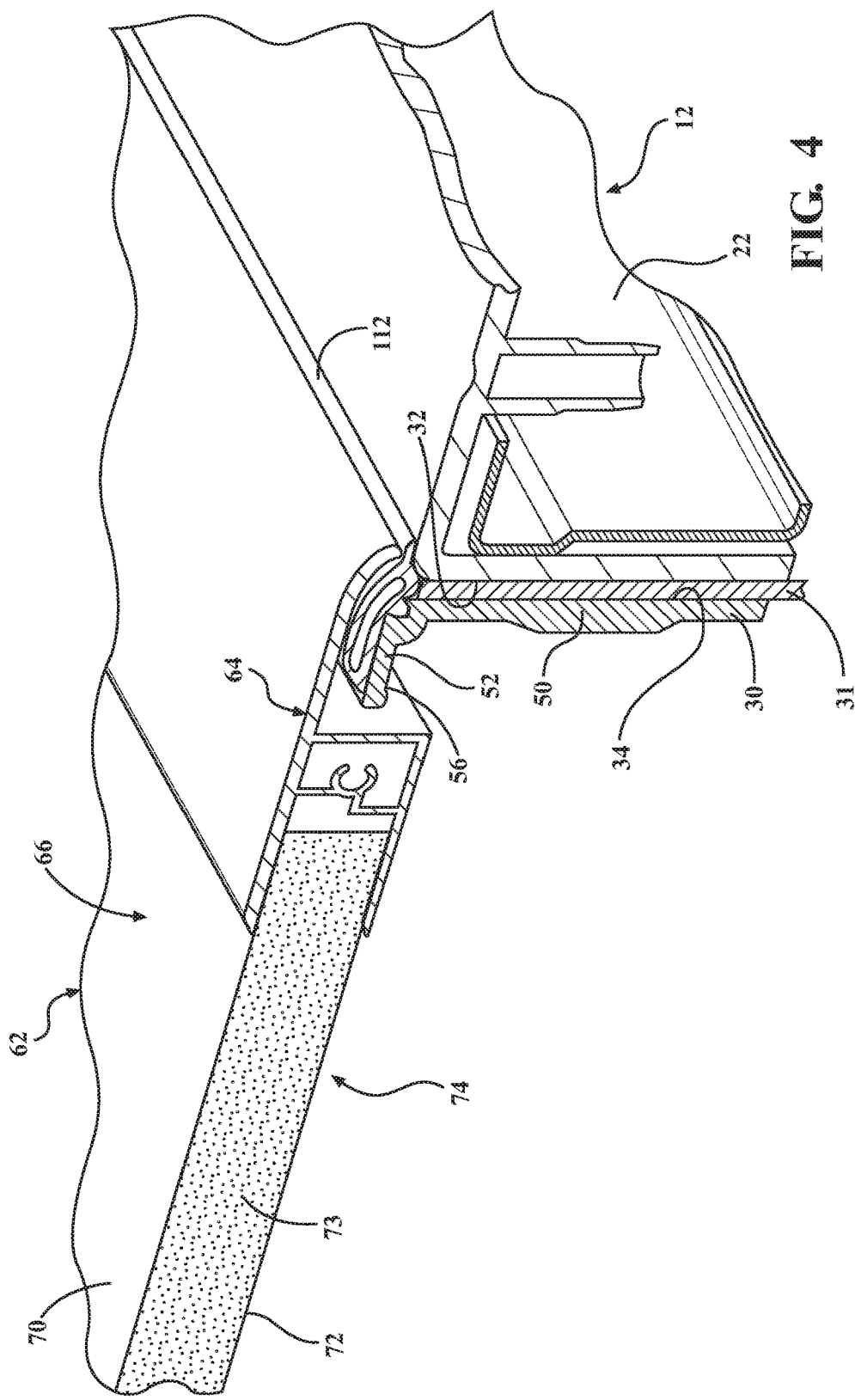
FIG. 4 is a semi-schematic, perspective, cross-sectional view of another portion of the cargo bed and another portion of the foldable hard tonneau cover system mounted to the cargo bed.

As shown in FIGS. 3 and 4, the side rail 28 is mounted to the side 20 of the cargo bed 12 with a seal 29 disposed between the side rail 28 and the side 20, and the side rail 30 is mounted to the other side 22 of the cargo bed 12 with another seal 31 disposed between the side rail 30 and the side 22. In an example, each of the opposing sides 20, 22 has an interior surface 32, and each of the side rails 28, 30 has an exterior surface 34. The opposing sides 20, 22 and the side rails 28, 30 are semi-schematically shown in the figures. Alternatively, the side rails 28, 30 could directly abut the sides 20, 22 of the cargo bed 12. In this alternative embodiment, the configuration of the exterior surface 34 of the side rails 28, 30 could be complementary to a portion of the interior surface 32 of the respective sides 20, 22 of the cargo bed 12. With this configuration, the first side rail 28 would fit against and/or within the complementary portion of the interior surface 32 of the one side 20, and the second side rail 30 would fit against and/or within the complementary portion of the interior surface 32 of the other side 22. The side rails 28, 30 may be mounted to the respective sides 20, 22 of the cargo bed 12 in any suitable manner, such as by utilizing any suitable fastening mechanism such as with one or more fasteners, clamps, latches, and/or the like.

Figure 5:
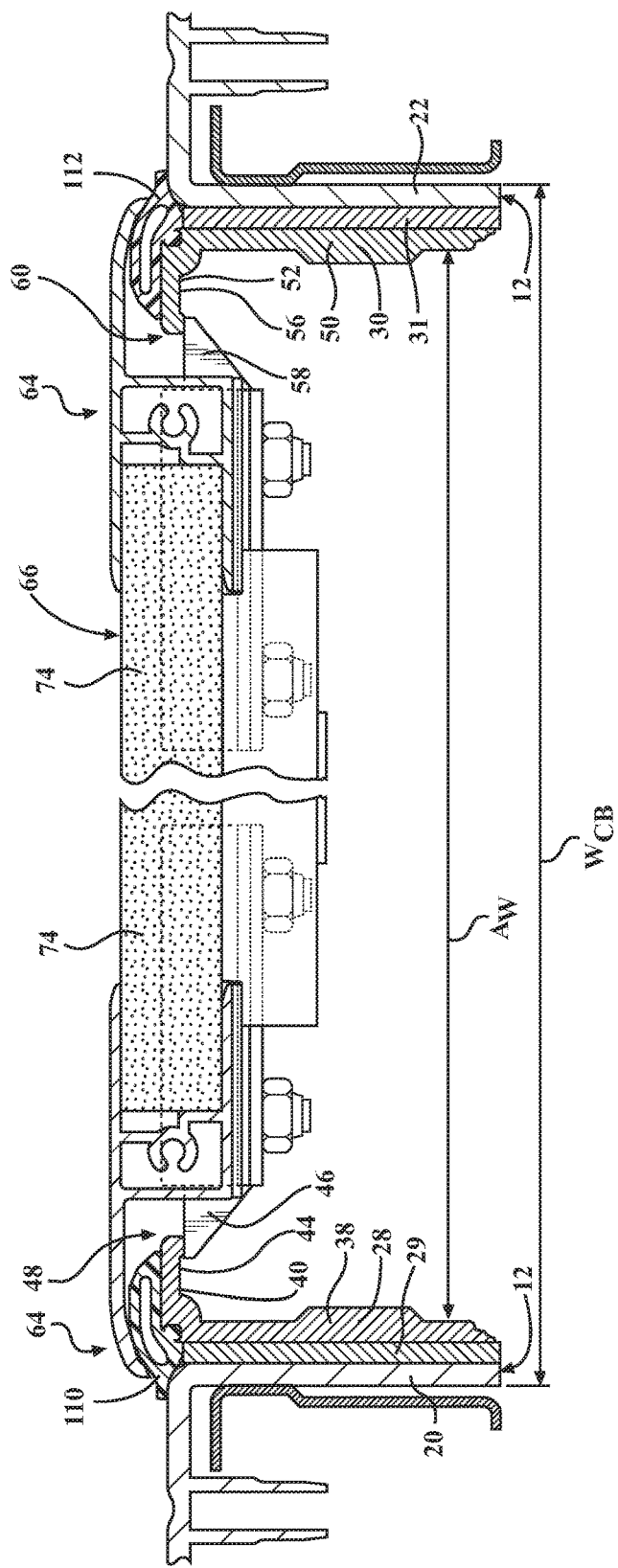
FIG. 5 is a semi-schematic cross-sectional view of the cargo bed of the vehicle including the foldable hard tonneau cover system mounted to the cargo bed.

The first side rail 28 has a body 38 and a leg 40 extending from the body 38 to define a substantially L-shaped configuration. In instances where the first side rail 28 has a plurality of strikers, each striker would also define the substantially L-shaped configuration. The body 38 and the leg 40 of the first side rail 28 define a first receiving feature 44. As shown in FIG. 5, the first receiving feature 44 receives a first catch 46 of a first latch mechanism 48 of the tonneau cover system 10 when the cover assembly 62 is mounted to the cargo bed 12. For example, the first catch 46 is received by the first receiving feature 44 when the first catch 46 rests against an underside of the leg 40 when the cover assembly 62 is mounted to the cargo bed 12. The second side rail 30 has a body 50 and a leg 52 extending from the body 50 to also define a substantially L-shaped configuration. In instances where the second side rail 30 has a plurality of strikers, each striker would also define a substantially L-shaped configuration. The body 50 and the leg 52 of the second side rail 30 define a second receiving feature 56. As shown in FIG. 5, the second receiving feature 56 receives a second catch 58 of a second latch mechanism 60 of the tonneau cover system 10 when the cover assembly 62 is mounted to the cargo bed 12. For example, the second catch 58 is received by the second receiving feature 56 when the second catch 58 rests against an underside of the leg 52 when the cover assembly 62 is mounted to the cargo bed 12. Details of the first 48 and second 60 latch mechanisms are described below.

While the side rails 28, 30 have been described above as having a substantially L-shaped configuration, it is to be appreciated that the side rails 28, 30 can alternatively have any suitable configuration that defines the receiving features 44, 56. In one example, the side rails 28, 30 could have a substantially C-shaped configuration.

The tonneau cover system 10 further comprises the cover assembly 62 coupled to the first 28 and second 30 side rails. The cover assembly 62 comprises a frame 64 and a cover 66 coupled to the frame 64 for covering the cargo bed 12 of the vehicle 14. In one embodiment, and as shown at least in FIGS. 1-8, the cover assembly 62 is further defined as a plurality of panels 68 formed of a rigid material. The rigid material may be selected from any material exhibiting a suitable degree of resistance to deformation in response to an applied force or load. Typically, the plurality of panels 68 is formed of a lightweight rigid material. Non-limiting examples of suitable rigid materials include metals (such as aluminum, aluminum alloys, steels, and/or the like), polymers such as thermoplastic olefins, reinforced plastics (such as fiberglass), composites, laminates, and/or combinations thereof. In one embodiment, and as shown in FIGS. 3-5 and 8, each of the plurality of panels 68 has opposing top 70 and bottom 72 sheets or surfaces formed of the rigid material, and a polymeric core 73 disposed between the top 70 and bottom 72 surfaces. In this embodiment, the cover 66 of the cover assembly 62 is at least one of the top 70 and bottom 72 surfaces of the plurality of panels 68. The polymeric core 73 can be a polymeric foam, such as a polystyrene foam or other suitable foamed resin. The polymeric core 73 can otherwise have a honeycomb configuration. While polymeric cores are typical, the core could alternatively be formed of or include a metal (such as aluminum, an aluminum alloy, a steel, and/or the like). In another embodiment, each of the plurality of panels 68 could be solid panels formed of the rigid material.

The plurality of panels 68 has at least two individual panels arranged adjacent one another along the longitudinal axis $A_{LV}$ of the vehicle 14. In one embodiment, and as shown in FIGS. 1, 2 and 6-8, the plurality of panels 68 forms a tri-fold hard tonneau cover assembly including a first panel 74, a second panel 76 spaced from the first panel 74, a third panel 78 adjacent the second panel 76, and a fourth panel 80 disposed between the first 74 and second 76 panels. In this embodiment, the fourth panel 80 is fixed to the first 28 and second 30 side rails utilizing a suitable mounting mechanism 75. The tonneau cover system 10 further comprises a plurality of elastomeric hinges 82 mounting the plurality of panels 68 to one another and enabling the plurality of panels 68 to pivot relative to one another. In an embodiment, the tonneau cover assembly 10 further includes a hinge assembly 84 including a fifth panel 86 disposed between two hinges 82. The hinge assembly 84 is positioned between the second panel 76 and the fourth panel 80. Further details of the plurality of panels 68 and hinges 82 can be found in co-pending International Application Ser. No. WO2018/

018962, filed concurrently herewith, the contents of which are incorporated by reference in their entirety. In the foregoing embodiment, the first panel 74 pivots relative to the fixed fourth panel 80 in a first direction to provide partial access to the interior of the cargo bed 12 adjacent the header 16. In addition, the second 76 and third 78 panels pivot relative to the fixed fourth panel 80 in a second direction opposite the first direction to provide partial access to the interior of the cargo bed 12 adjacent the tailgate 18.

It is to be understood that the cover assembly 62 can include a different number of panels and/or the panels can be arranged differently than as described above and the cover assembly 62 and still be considered a tri-fold tonneau cover assembly. For example, the cover assembly 62 may include a plurality of moveable panels that tri-fold in an accordion style to provide at least partial access to the interior of the cargo bed 12. It is also to be understood that the cover assembly 62 can include a different number of panels and/or the panels can be arranged differently than as described above to form a single-fold hard tonneau cover assembly, a bi-fold hard tonneau cover assembly, etc.

Figure 6:
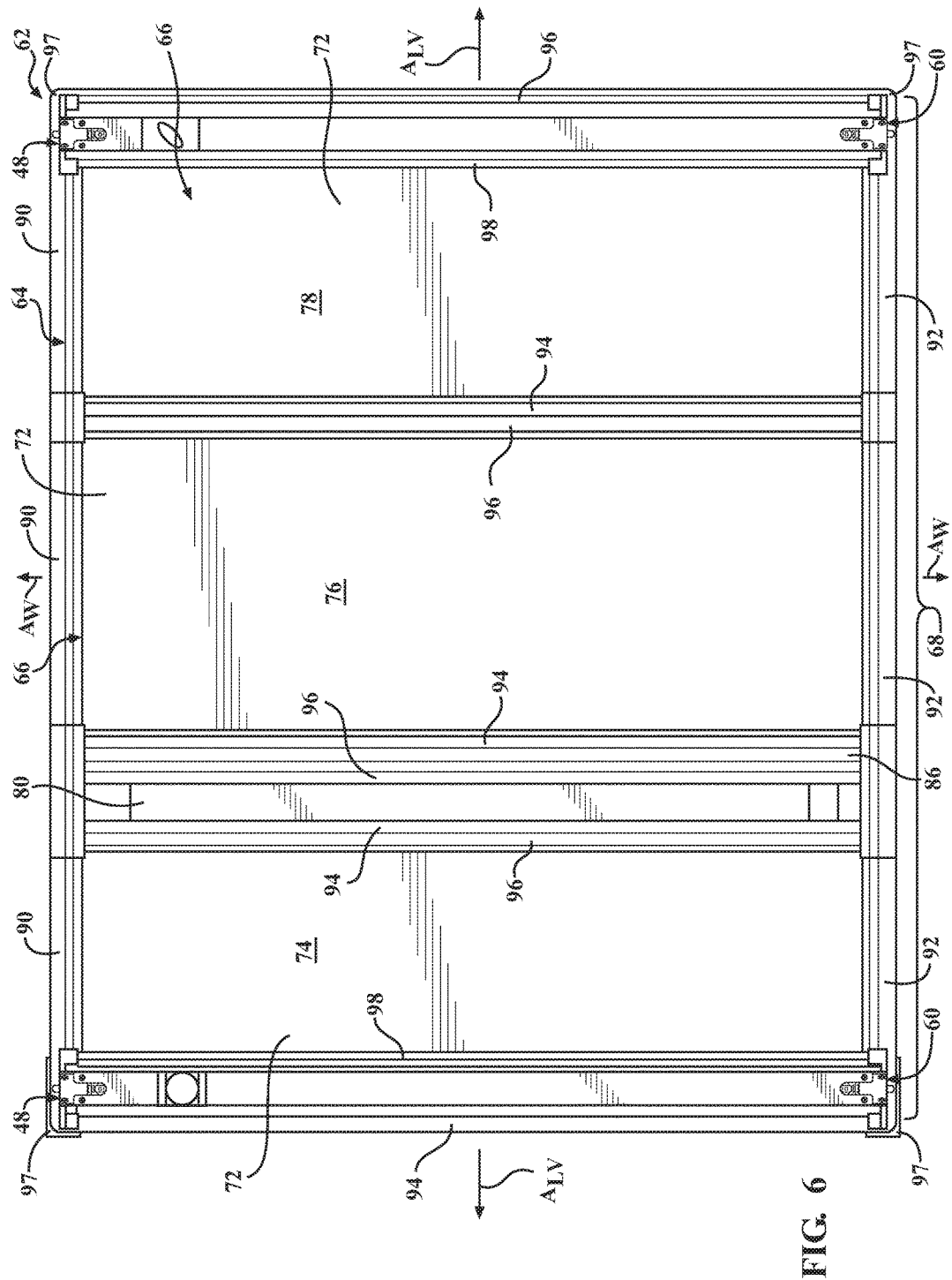
FIG. 6 is a semi-schematic, bottom plan view of a cover assembly of the foldable hard tonneau cover system.
Figure 16A:
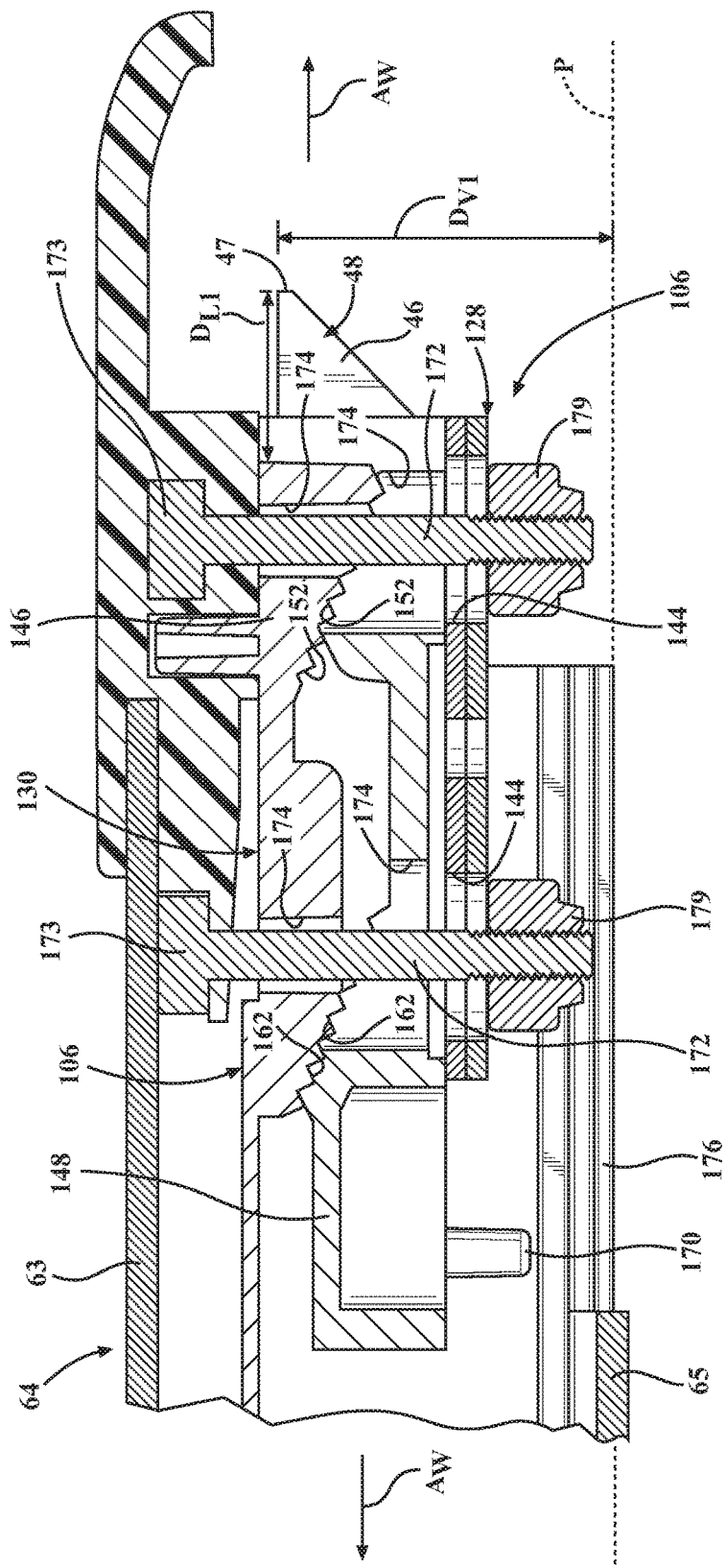
FIG. 16A is a cross-sectional view of the portion of the cover assembly of the foldable hard tonneau cover system taken along line 16A-16A in FIG. 11.

As illustrated in FIGS. 6-8, each of the plurality of panels 68 has a perimeter or periphery 88, and each of the panels 68 has the frame 64 disposed about at least a portion of the perimeter 88. The frame 64 has upper 63 and lower 65 surfaces, as shown in FIG. 16A. The frame 64 further has a plurality of outer frame members, including a first outer frame member 90 adjacent and substantially parallel to the first side rail 28 and a second outer frame member 92 adjacent and substantially parallel to the second side rail 30. Each of the first 90 and second 92 outer frame members extend partially along the longitudinal axis $A_{LV}$, and the first 90 and second 92 outer frame members are substantially parallel to one another. The frame 64 further includes third 94 and fourth 96 outer frame members extending at least partially along the width-wise axis $A_W$ and between the first 90 and second 92 outer frame members. In addition, the third 94 and fourth 96 outer frame members are substantially parallel to one another.

It is to be appreciated that the outer frame members 90, 92, 94, 96 are typically discontinuous. For example, neither the first 90 and second 92 outer frame members directly touch the third 94 and fourth 96 outer frame members. In addition, the outer frame members 90, 92, 94, 96 of adjacent panels 74, 76, 78, 80 do not directly touch one another. The discontinuity of the outer frame members 90, 92, 94, 96 enables the plurality of panels 68 to pivot relative to one another when opening one or more of the first 74, second 76, and third 78 panels for access to the interior of the cargo bed 12 of the vehicle 14. In an embodiment, the frame 64 further includes corner frame members 97, with a corner frame member 97 disposed over a corner formed between each of the first 90 and third 94 outer frame members, the first 90 and fourth 96 outer frame members, the second 92 and third 94 outer frame members, and the second 92 and fourth 96 outer frame members.

Figure 12:
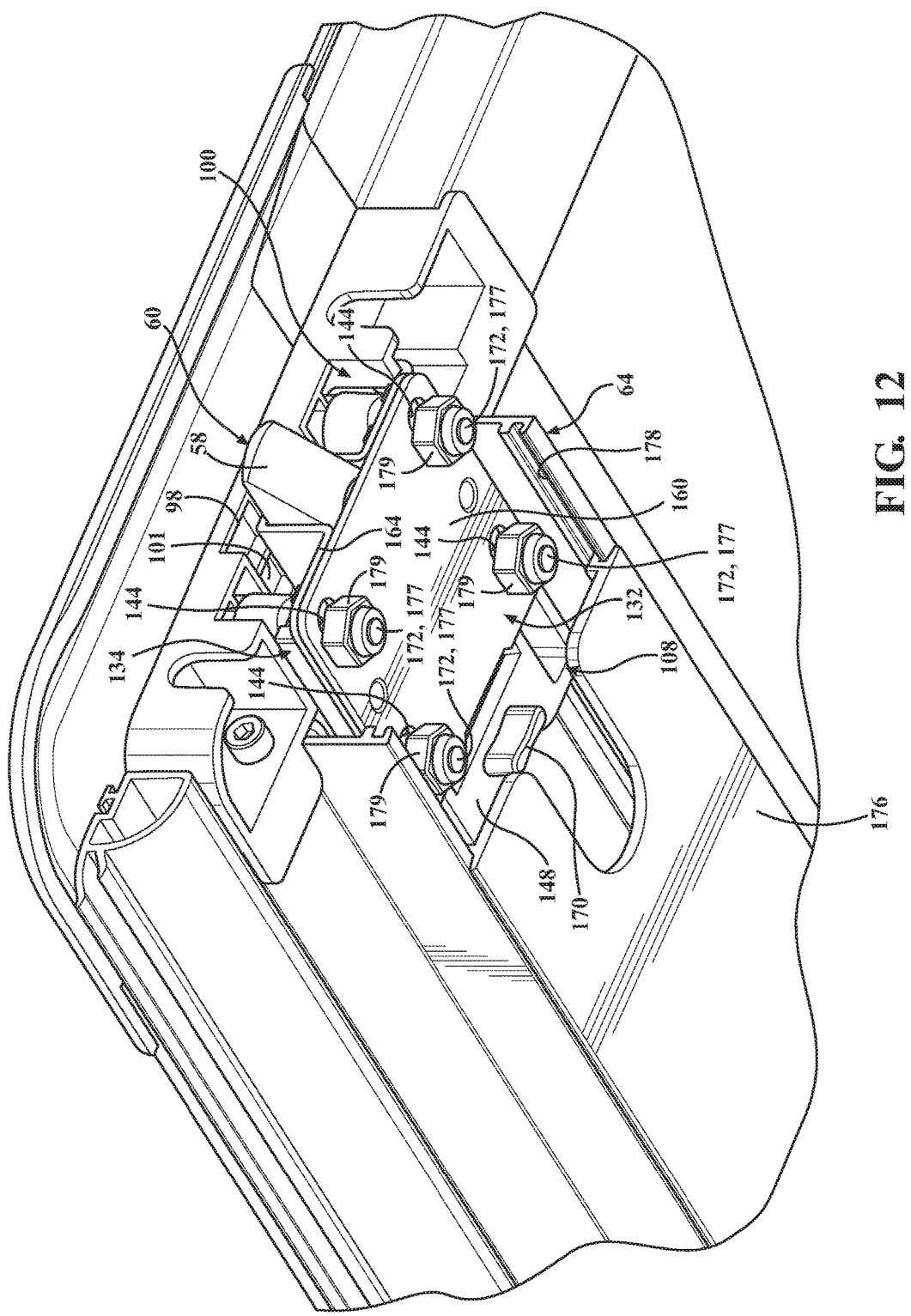
FIG. 12 is a bottom perspective view of a portion of the cover assembly of the foldable hard tonneau cover system.

The frame 64 further includes an inner frame member 98 coupled to the bottom surface 72 of one of the plurality of panels 68, and the inner frame member 98 extends along the width-wise axis $A_W$ between the first 90 and second 92 outer frame members. The inner frame member 98 is also substantially parallel to the third 94 and fourth 96 outer frame members. As shown in FIG. 12, the inner frame member 98 has an inner surface 101 defining a channel 100. As also shown in FIG. 12, the latch mechanism and adjustment mechanism are at least partially disposed in the channel 100.

In addition, and as shown in FIGS. 3 and 4, the tonneau cover system 10 includes a first seal 110 extending along the longitudinal axis $A_{LV}$ and coupled to the first side rail 28. The first seal 110 also abuts the side 20 of the cargo bed 12. Alternatively, the first seal 110 could be coupled to the cargo bed 12 and abut the first side rail 28. The system 10 further includes a second seal 112 extending along the longitudinal axis $A_{CB}$ and coupled to the second side rail 30. The second seal 112 also abuts the side 22 of the cargo bed 12. Alternatively, the second seal 112 could be coupled to the cargo bed 12 and abut the second side rail 28. The seals 100, 112 form a seal at an interface between the frame 64 and the respective sides 20, 22 of the cargo bed 12. The seals 100, 112 also form a seal at an interface between the frame 64 and the respective side rails 28, 30. It is to be appreciated that the tonneau cover system 10 could include additional seals for sealing an interface between the frame 64 and other portions of the cargo bed 12, such as the header 16 and/or tailgate 18.

As previously mentioned, the tonneau cover system 10 further includes the first 48 and second 60 latch mechanisms. Each of the first 48 and second 60 latch mechanisms is coupled to the frame 64. For instance, and as shown at least in FIGS. 6 and 9, the first latch mechanism 48 is coupled to the first outer frame member 90, and the second latch mechanism 60 is coupled to the second outer frame member 92. As shown, there are two first latch mechanisms 48, one on each end of the tonneau cover system 10. Similarly, there are two second latch mechanisms 60, one on each end of the tonneau cover system 10. The first 48 and second 60 latch mechanisms are used for latching the plurality of panels 68 to the first 28 and second 30 side rails. Specifically, the first 48 and second 60 latch mechanisms are coupled to the third panel 78 (which is adjacent the tailgate 18) and are used for latching the third panel 78 to the first 28 and second 30 side rails. As shown, the inner frame member 98 is positioned adjacent the outer frame member 96 of the third panel 78, and the latch mechanisms 48, 60 supported by the inner frame member 98 are also positioned adjacent the outer frame member 96. It is to be appreciated that the inner frame member 98 can be positioned anywhere along a length of the third panel 78, such as toward the middle of the third panel 78, adjacent the outer frame member 94 of the third panel 78, etc. In a similar fashion, the first 48 and second 60 latch mechanisms are also coupled to the first panel 74 (which is adjacent the header 16) and are used for latching the first panel 74 to the first 28 and second 30 side rails. It is to be appreciated that the frame member supporting the latch mechanisms can be positioned anywhere along a length of the first panel 74, such as toward the middle of the first panel 74, adjacent one of the frame members, etc.

Referring to FIGS. 9-16E, the first 48 and second 60 latch mechanisms will be described in greater detail. It is to be appreciated that each of the latch mechanisms 48,60 have common or similar components such that discussion of one of the latch mechanisms may equally apply to other latch mechanisms. For illustrative purposes, not all of the latch mechanisms are shown with the same level of detail.

Turning to FIGS. 9-13, the first 48 and second 60 latch mechanisms have first 46 and second 48 catches moveable between latch and unlatch positions. The term latch position is being used to describe a position of the catch 46 when the catch 46 is engaged with the side rail 28. The first catch 46 has front 47 and tail 49 ends, and the catch 46 is biased toward the latch position to engage the first receiving feature 44 of the first side rail 28 to secure the cover 66 to the first side rail 28. In an embodiment, the catch 46 is biased toward the latch position by a biasing member 54, such as a spring.

The term unlatch position is being used to describe a position of the catch 46 when the catch 46 is not engaged with and/or is released from the side rail 28. The first catch 46 is also retractable in a direction opposite the biasing direction to the unlatch position, where the first catch 46 is spaced from the first receiving feature 44 of the first side rail 28 to release the cover 66 from the first side rail 28.

The second latch mechanism 60 has the second catch 58 also moveable between latch and unlatch positions. The second catch 58 is biased toward the latch position to engage the second receiving feature 56 of the second side rail 30 to secure the cover 66 to the second side rail 30. In an embodiment, the second catch 58 is biased toward the latch position by a biasing member, such as a spring. The second catch 58 is also retractable in a direction opposite the biasing direction to the unlatch position, where the second catch 58 is spaced from the second receiving feature 56 of the second side rail 30 to release the cover 66 from the second side rail 30.

The tonneau cover system 10 further includes the release device 102 coupled to the frame 64 and the first 48 and second 60 latch mechanisms. The release device 102 is actuatable to move the first catch 46 and second catch 58 to the unlatch position. In the illustrated embodiment, the release device 102 is coupled to the inner frame member 98 and includes a handle 114, a first cable 116 coupling the handle 114 to the first latch mechanism 48, and a second cable 118 coupling the handle 114 to the second latch mechanism 60. The release device 102 further includes a coupler 120 coupled to the handle 114, with the first 116 and second 118 cables directly mounted to the coupler 120. The handle 114 is actuatable to substantially simultaneously move the first catch 46 of the first latch mechanism 48 and the second catch 58 of the second latch mechanism 60 to the unlatch positions. For example, an operator may actuate the handle 114 by rotating the handle 114 in one or more directions. When the handle 114 is rotated, the coupler 120 rotates and pulls the first cable 116 in a direction opposite the biasing direction of the first catch 46 and toward the unlatch position. The coupler 120 also pulls the second cable 118 in a direction opposite the biasing direction of the second catch 58 and toward the unlatch position when the handle 114 is rotated. When pulled or moved toward the unlatch position, the catches 46, 58 are released from the side rails 28, 30.

Figure 9:
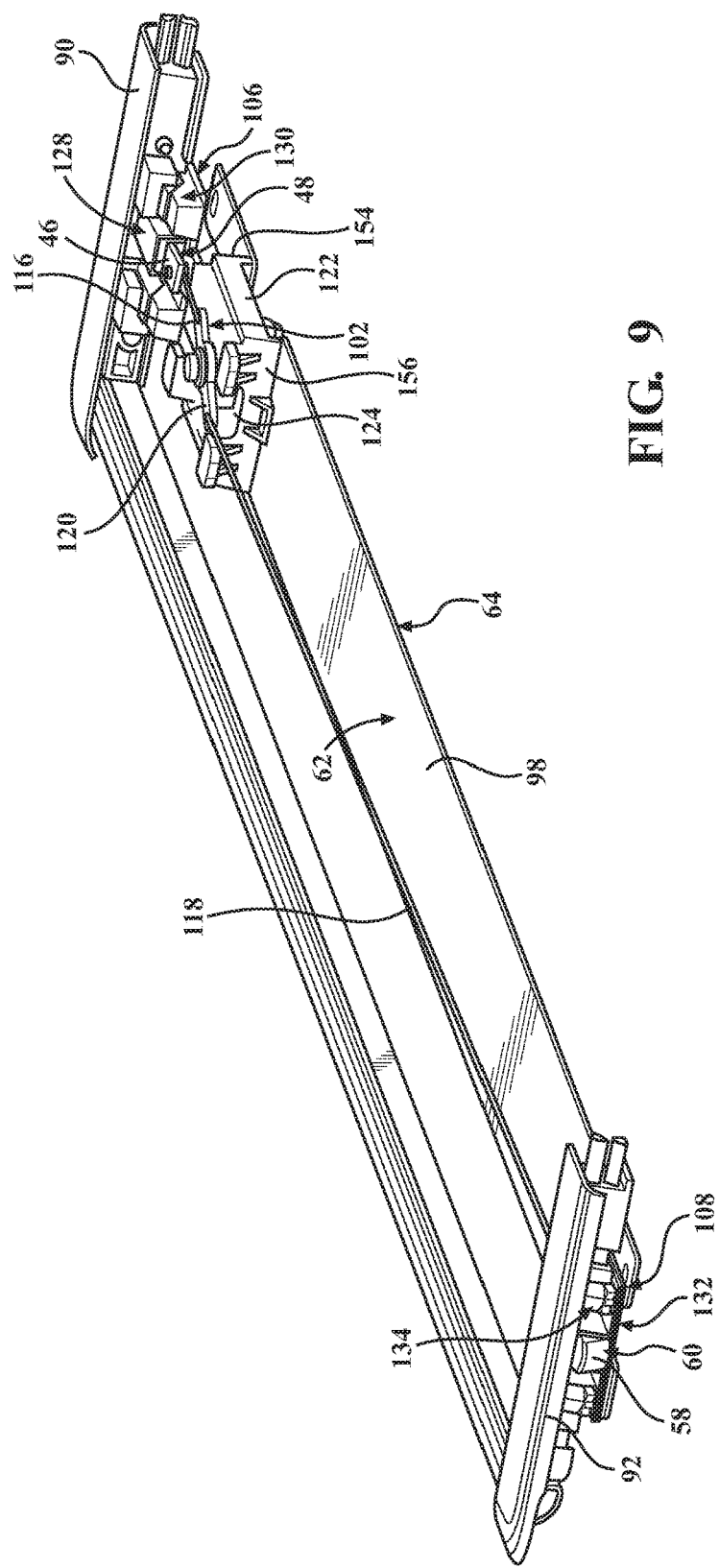
FIG. 9 is a top perspective view of a portion of the cover assembly of the foldable hard tonneau cover system including first and second latch mechanisms, first and second adjustment mechanisms, and a release device coupled to the first and second latch mechanisms and the first and second adjustment mechanisms.
Figure 10:
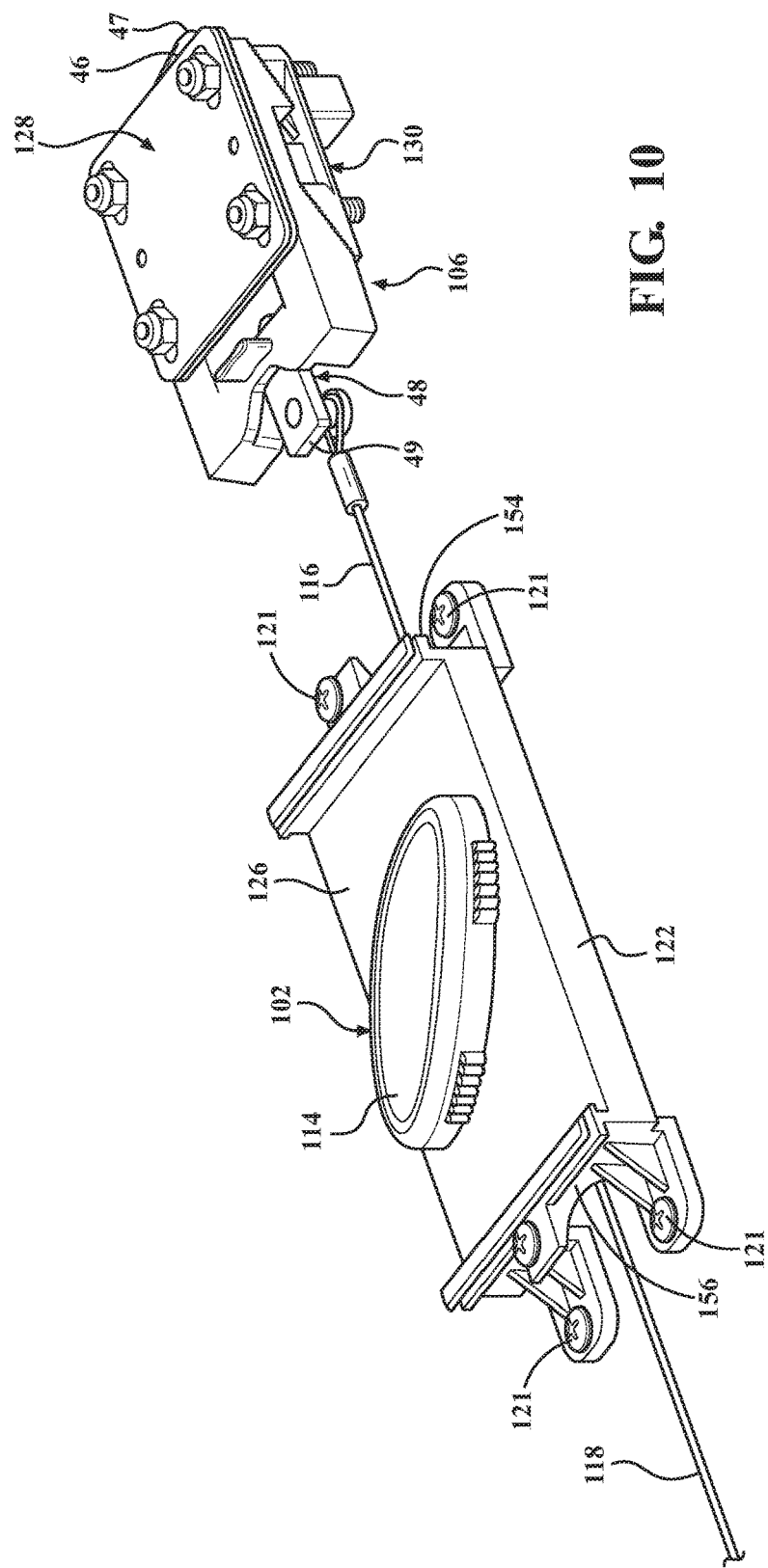
FIG. 10 is a bottom perspective view of a portion of the cover assembly of the foldable hard tonneau cover system including the first latch mechanism, the first adjustment mechanism, and the release device.

As shown in FIGS. 9 and 10, the release device 102 further includes a support 122 mounted to the inner frame member 98. The support 122 may be mounted to the inner frame member 98 utilizing fasteners 121, as shown in FIG. 10. As shown, the support 122 has first 154 and second 156 ends, with the first end 154 facing the first side rail 28 and the second end 156 facing the second side rail 30. The first end 154 of the support 122 is spaced from the first latch mechanism 48 and the first adjustment mechanism 106. The support 122 is also spaced from the second latch mechanism 60 and the second adjustment mechanism 108. The support 122 has interior 124 and exterior 126 surfaces, with the handle 114 mounted to the exterior surface 126 of the support 122 and the coupler 120 mounted to the interior 124 of the support 122.

In the illustrated embodiment, the support 122 is positioned closer to the first latch mechanism 48 than the second latch mechanism 60. With this configuration, the first cable 116 coupled to the first latch mechanism 48 is shorter in length than the second cable 118 coupled to the second latch mechanism 60. Alternatively, the support 122 can be located anywhere between the first 48 and second 60 latch mechanism. For instance, the support 122 could be located at a center point between the first 48 and second 60 latch mechanisms. To this end, the lengths of the first 116 and second 118 cables would be about the same. The support 122 could otherwise be located closer to the second latch mechanism 60 than the first latch mechanism 48. To this end, the length of the first cable 116 would be longer than the length of the second cable 118.

Figure 16B:
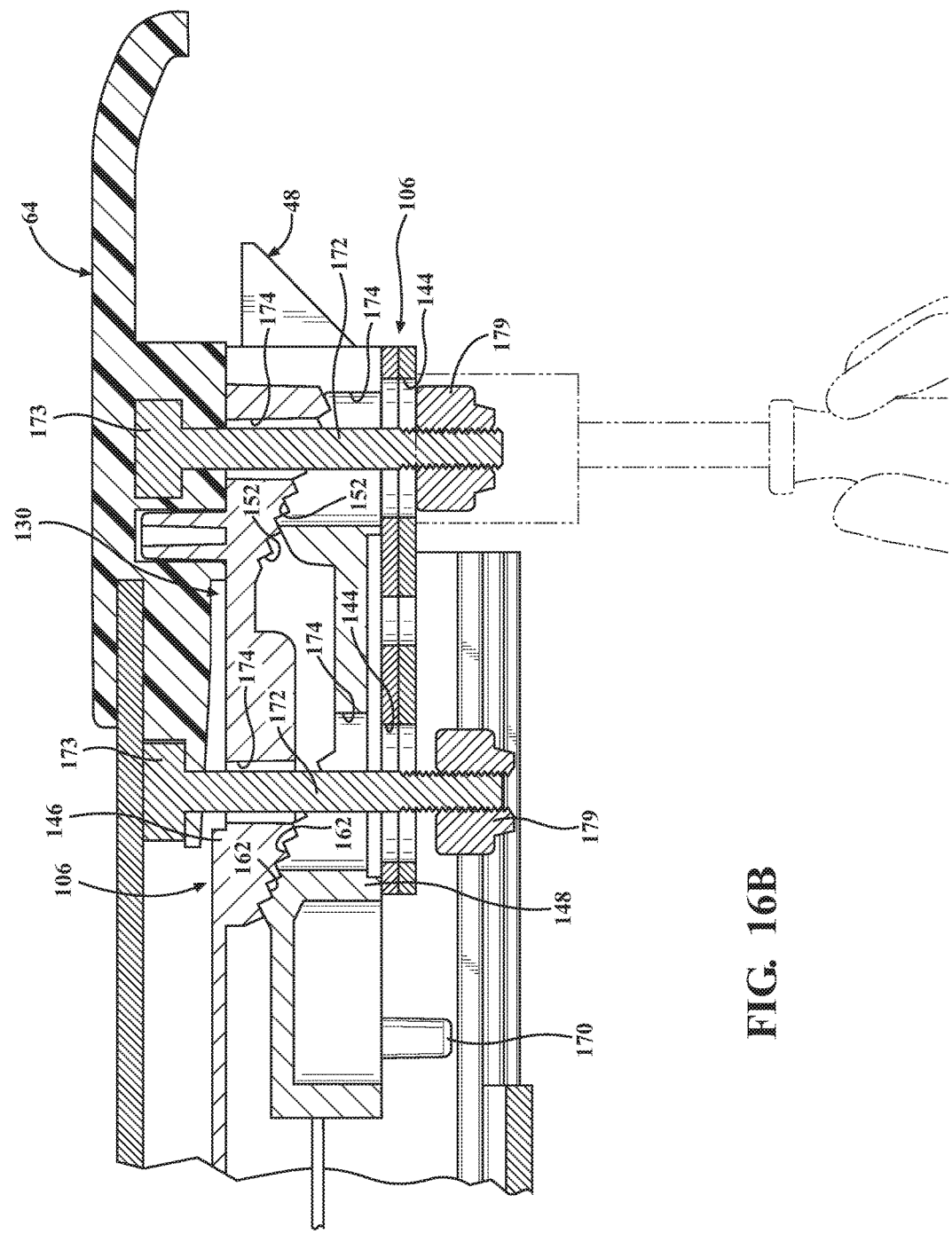
FIG. 16B is a cross-sectional view of the portion of the cover assembly of FIG. 11 illustrating loosening of the fasteners of the adjustment mechanism for adjustment of the latch mechanism.
Figure 16C:
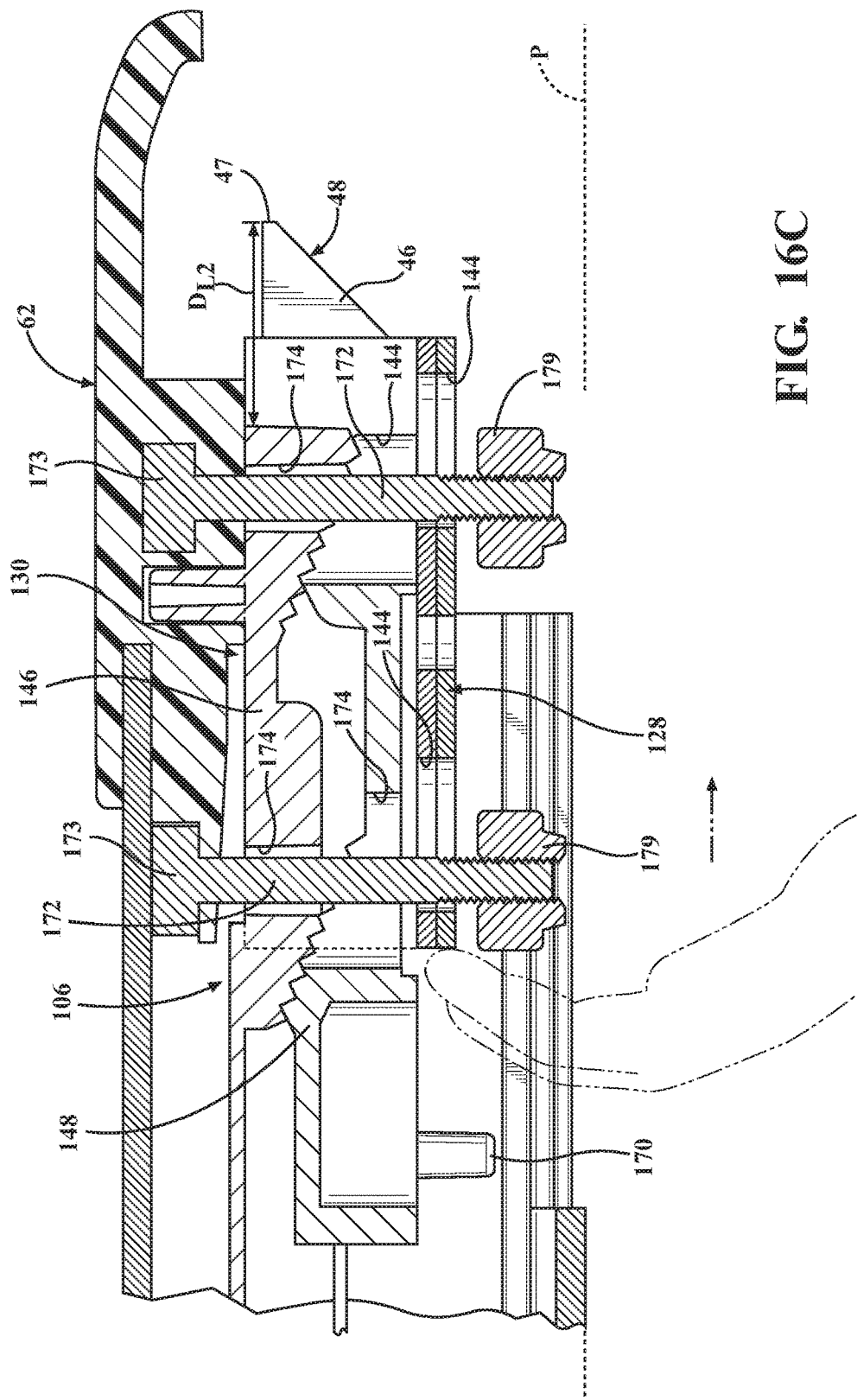
FIG. 16C is a cross-sectional view of the portion of the cover assembly of FIG. 11 illustrating adjustment of a lateral position of the latch mechanism independent of a vertical position adjustment.
Figure 16D:
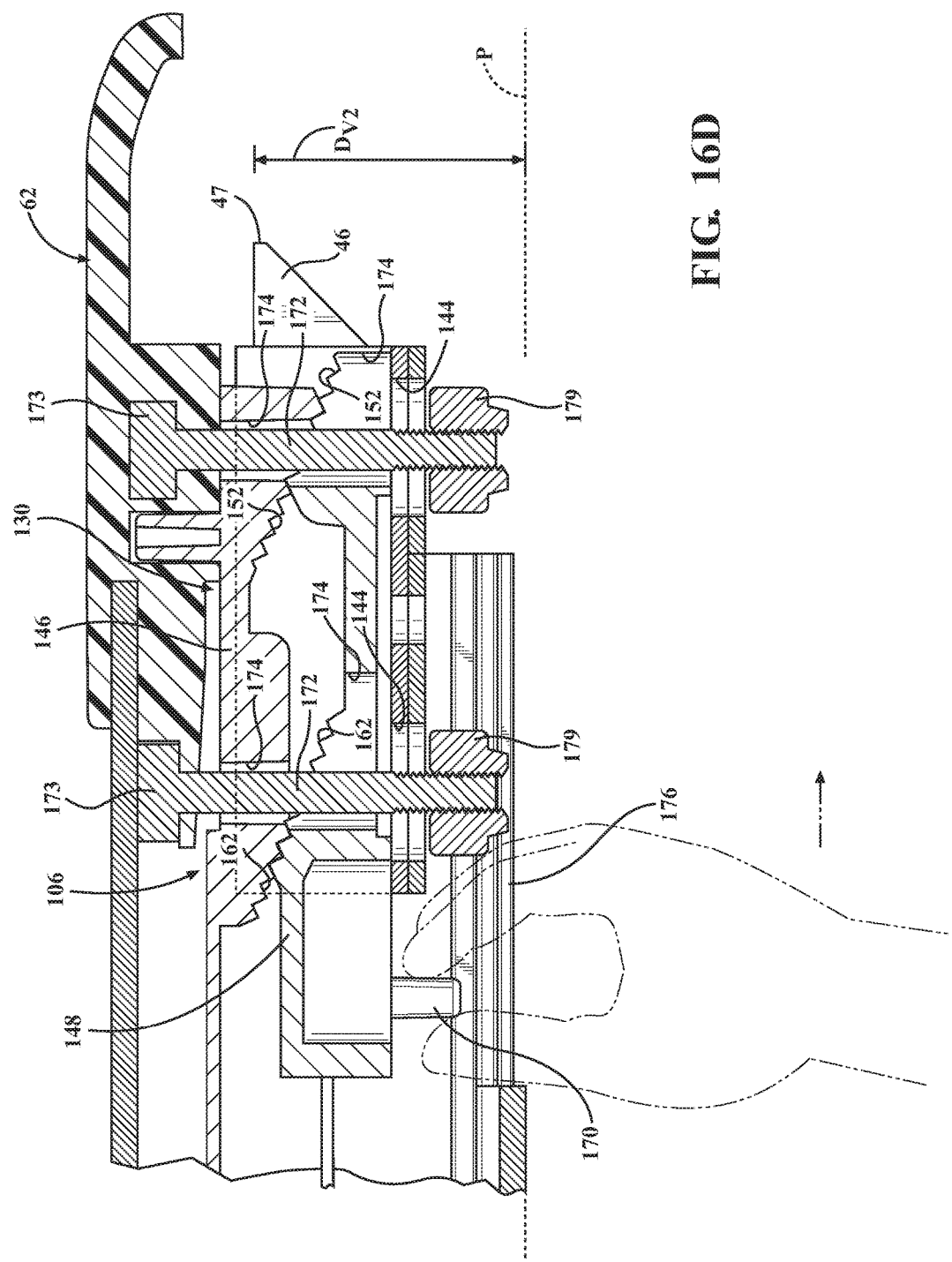
FIG. 16D is a cross-sectional view of the portion of the cover assembly of FIG. 11 illustrating adjustment of a vertical position of the latch mechanism independent of a lateral position adjustment.
Figure 16E:
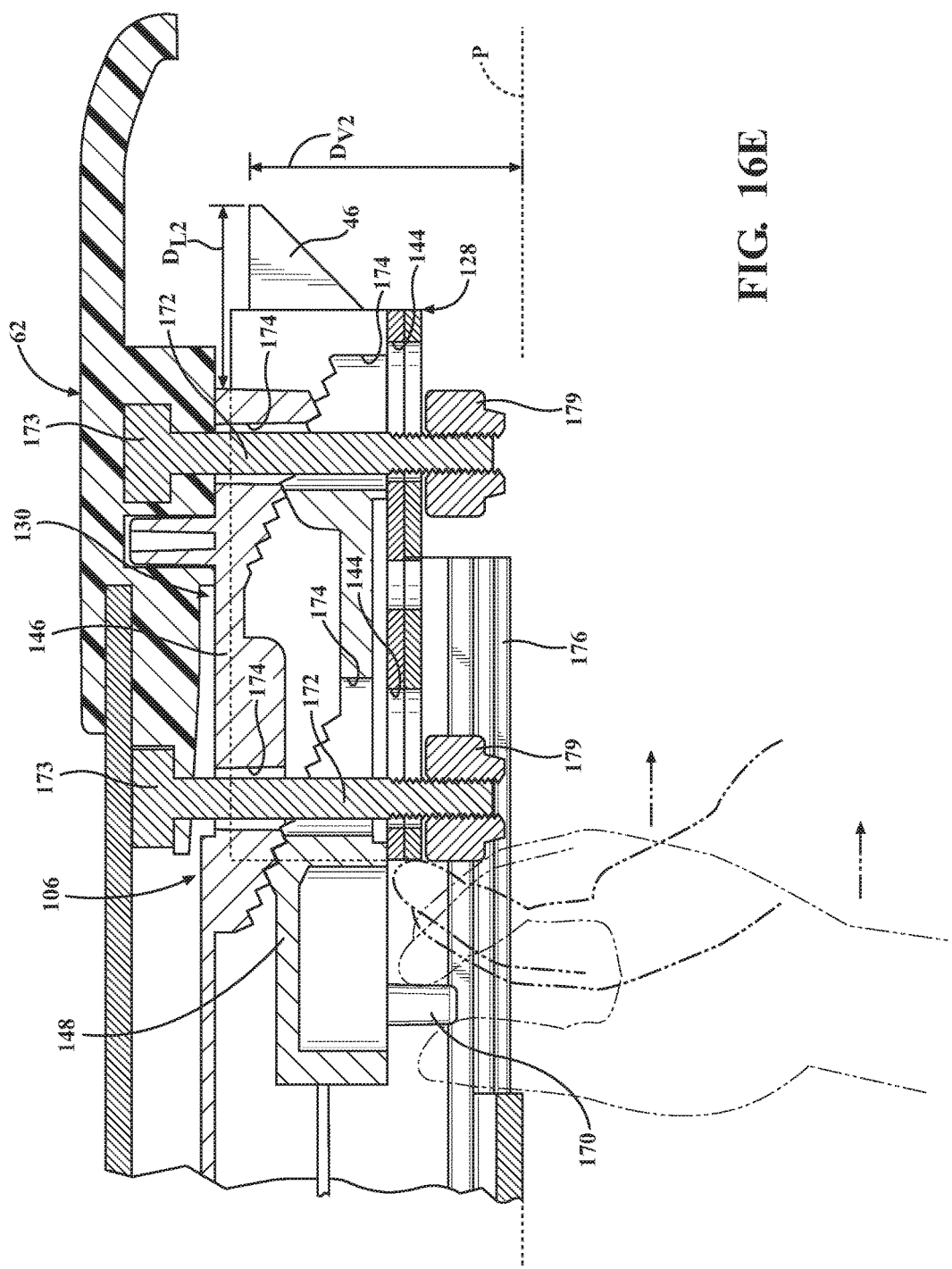
FIG. 16E is a cross-sectional view of the portion of the cover assembly of FIG. 11 illustrating simultaneous adjustment of the lateral and vertical positions of the latch mechanism.

Dimensional variability of the cargo bed 12 from one vehicle to the next, temporal changes, and/or structural changes to the cargo bed 12 over time could affect a position of the catch 46, 58. In some instances, the dimensional variability of the cargo bed 12, temporal changes, and/or structural changes may cause the catch 46, 58 to move far enough such that the catch 46, 58 is unable to properly engage the side rail 28, 30 when in the latch position. Accordingly, it may be desirable to adjust the position of the catch 46, 58 so that the catch 46, 58 can properly and adequately engage the side rail 28, 30 when the catch 46, 58 is moved to the latch position. Adjustment(s) to the position of the catch 46, 58 may be accomplished utilizing first 106 and second 108 adjustment mechanisms coupled to the first 48 and second 60 latch mechanisms, respectively. In one embodiment, the adjustment mechanism 106, 108 may be used to adjust a vertical position of the catch 46, 58. This is illustrated in FIG. 16D. In this embodiment, adjustment to the vertical position of the catch 46, 58 is accomplished independent of adjustment to the lateral position of the catch 46, 58. In another embodiment, the adjustment mechanism 106, 108 may be used to adjust a lateral position of the catch 46, 48. In this embodiment, adjustment to the lateral position of the catch 46, 58 is accomplished independent of adjustment of the vertical position of the catch 46, 58. This is illustrated in FIG. 16C. In yet another embodiment, the adjustment mechanism 106, 108 may be used to adjust both the vertical and lateral positions of the catch 46, 58. In this embodiment, adjustment of the vertical position of the catch 46, 58 may be accomplished simultaneously with adjustment of the lateral position of the catch 46, 58. This is shown in FIG. 16E. It is to be understood that when the lateral position of the catch 46, 58 is adjusted, the lateral adjustment is accomplished independent of the movement of the catch 46, 48 between the latch and unlatch positions. The adjustment(s) to the vertical and/or lateral position of the catch 46, 58 allows the catch 46, 58 to adequately engage the side rail 28, 30 when the catch 46, 58 is moved to the latch position.

As shown at least in FIG. 9, the first adjustment mechanism 106 has a first portion 128 coupled to the first catch 46 and a second portion 130 interacting with the first portion 128 to adjust the vertical position of the first catch 46. The second adjustment mechanism 108 has a first portion 132 coupled to the second catch 58 and a second portion 134 interacting with the first portion 132 to adjust the vertical position of the second catch 58. Details of the first adjustment mechanism 106 is described below with reference to FIGS. 11 and 13-16E. The second adjustment mechanism 108 includes operational components that are substantially the same as the first adjustment mechanism 106. Accordingly, the details of the first adjustment mechanism 106 described below are also applicable to the second adjustment mechanism 108.

Referring at least to FIGS. 11 and 13-16E, and in an embodiment, the first portion 128 of the adjustment mechanism 106 has first 160 and second 164 plates joined to one another to form a single component. In one example, the first 160 and second 164 plates are welded to one another such as by stamp welding. In another embodiment, the first plate 160 may be integral with the second plate 164 to form the single component.

The first portion 128 includes a catch housing 136 for receiving and supporting at least a portion of the catch 46 of the latch mechanism 48. The catch housing 136 defines first 138 and second 140 openings. The front end 47 of the catch 46 protrudes through the first opening 138 when the catch 46 is biased toward the side rail 28 in the latch position. When in the unlatch position, the catch 46 is moved opposite the biasing direction and a majority of the front end 47 of the catch 46 is moved inside the catch housing 136. The tail end 49 of the catch 46 protrudes through the second opening 140 when the catch 46 is in the latch and unlatch positions, with more of the tail end 49 protruding through the second opening 140 when the catch 46 is in the unlatch position compared to when the catch 46 is in the latch position.

As shown at least in FIG. 15, the first portion 128 of the adjustment mechanism 106 further has a flange 142 with the second portion 130 of the adjustment mechanism 106 engaging the flange 142. In an embodiment, the first portion 128 of the adjustment mechanism 106 has two flanges 142, with each flange 142 each extending from the catch housing 136 in opposite directions. Each of the flanges 142 defines a plurality of apertures 144 having an oval configuration.

The second portion 130 of the adjustment mechanism 106 has a fixed segment 146 fixed to the frame 64 and a moveable segment 148 moveable relative to the fixed segment 146. The moveable segment 148 of the second portion 130 abuts the first portion 128 of the adjustment mechanism 106. The moveable segment 148 is also sandwiched between the first portion 128 of the adjustment mechanism 106 and the fixed segment 146 of the second portion 130 of the adjustment mechanism 106. As shown, the moveable segment 148 engages the flange 142 of the first portion 128, and the moveable segment 148 is located between the flange 142 of the first portion 128 and the fixed segment 146 of the adjustment mechanism 106. In addition, the second portion 130 of the adjustment mechanism 106 is located between the flange 142 of the first portion 128 and the inner surface 101 of the inner frame member 98.

Figure 14:
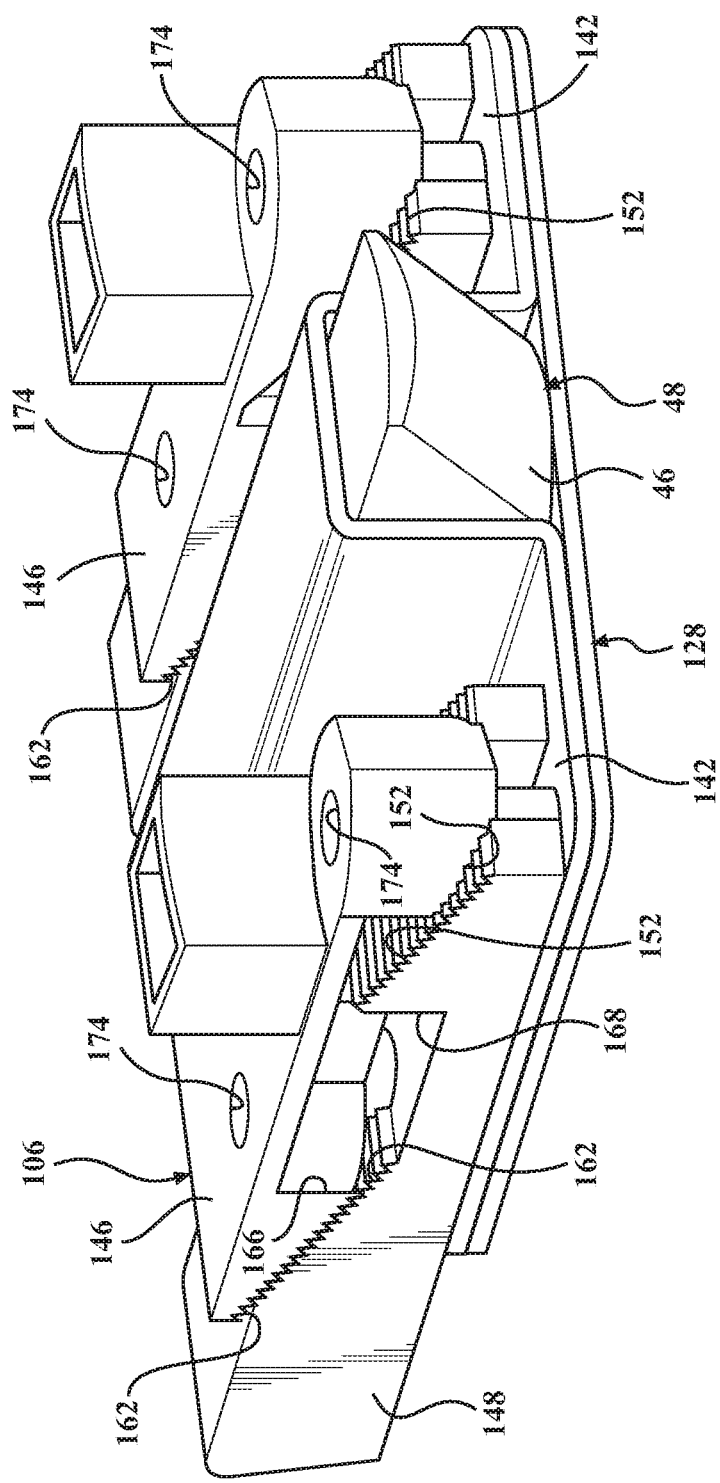
FIG. 14 is a perspective view of a portion of the cover assembly of the foldable hard tonneau cover system.

With reference to FIGS. 14 and 15, at least one of the first 128 and second 130 portions of the adjustment mechanism 106 forms a sloped profile 150. In an embodiment, the second portion 130 forms the sloped profile 150. In another embodiment, at least one of the fixed segment 146 and the moveable segment 148 forms the sloped profile 150. In this embodiment, at least one of the fixed segment 146 and the moveable segment 148 defines a plurality of notches 152 forming the sloped profile 150, and the other of the fixed segment 146 and the moveable segment 148 engages the plurality of notches 152. In yet another embodiment, both of the fixed segment 146 and the moveable segment 148 form a sloped profile 150. In this embodiment, the fixed segment 146 defines a plurality of notches 152 forming the sloped profile 150 on the fixed segment 146, and the moveable segment 148 defines a plurality of notches 152 forming the sloped profile 150 on the moveable segment 148. The plurality of notches 152 of the fixed segment 146 and the plurality of notches 152 of the moveable segment 148 engage one another.

The sloped profile 150 may have any desirable angle between 0 and 90 degrees. In an embodiment, the angle of the sloped profile 150 is from 30 to 60 degrees. In another embodiment, the angle of the sloped profile 150 is from about 40 to 50 degrees. The angle of the sloped profile 150 of the fixed segment 146 is typically the same as the angle of the sloped profile 150 of the moveable segment 148. In addition, the sloped profile 150 of the fixed segment 146 has a length $L_{SPF}$ and the sloped profile 150 of the moveable segment 148 has a length $L_{SPM}$. The length $L_{SPF}$ of the sloped profile 150 may be substantially the same or different from the length $L_{SPM}$ of the sloped profile 150.

The plurality of notches 152 forming the sloped profile 150 of the fixed segment 146 and the plurality of notches 152 forming the sloped profile 150 of the moveable segment 148 may have any suitable configuration. Typically, the plurality of notches 152 of the fixed segment 146 is complementary in configuration to the plurality of notches 152 of the moveable segment 148. In an embodiment, the plurality of notches 152 is a plurality of teeth, with each tooth having an apex. The size of each tooth may be the same or different. Alternatively, each tooth may have a rounded or curved configuration. In another embodiment, the plurality of notches 152 could be a plurality steps, with each step having a rise and a run. The size of each step in this other embodiment may be the same or different. Other suitable configurations of the plurality of notches 152 are also contemplated herein.

In an embodiment, the sloped profile 150 of the fixed segment 146 is further defined as a first sloped profile 150, and the fixed segment 146 further has a second sloped profile 158. The second sloped profile 158 is spaced from the first sloped profile 150 of the fixed segment 146. Similarly, the sloped profile 150 of the moveable segment is further defined as a first sloped profile 150, and the moveable segment 148 further has a second sloped profile 158. The second sloped profile 158 of the fixed segment 146 may be the same or different in configuration compared to the first sloped profile 150 of the fixed segment 146. Similarly, the second sloped profile 158 of the moveable segment 148 may be the same or different in configuration compared to the first sloped profile 150 of the moveable segment 148. The fixed segment 146 defines a second plurality of notches 162 forming the second sloped profile 158 on the fixed segment, and the moveable segment 148 defines a second plurality of notches 162 forming the second sloped profile 158 on the moveable segment. The configuration of the second plurality of notches 162 may be the same as or different from the configuration of the first plurality of notches 152.

The slope of the second sloped profile 158 may be the same as or different from the slope of the first sloped profile 150. In an embodiment, the slope of the second sloped profile 158 of the fixed segment 146 is substantially the same as the slope of the first sloped profile 150 of the fixed segment 146. Similarly, the slope of the second sloped profile 158 of the moveable segment 148 is substantially the same as the slope of the first sloped profile 150 of the moveable segment 48. To this end, and as shown, the first sloped profile 150 is parallel to the second sloped profile 158.

As also shown in FIGS. 14 and 15, the fixed segment 146 has a stop 166 and the moveable segment 148 has a stop 168. As described in further detail below, the moveable segment 148 is moveable along the width-wise axis $A_W$ to adjust the vertical position of the catch 46. In an embodiment, the moveable segment 148 may be moved along the width-wise axis $A_W$ until the stop 168 of the moveable segment 148 engages the stop 166 of the fixed segment 146. At this point, an operator may not be able to move the moveable segment 148 further along the width-wise axis $A_W$.

In an embodiment, the second portion 130 of the adjustment mechanism 106 further has a tab 170, with the tab 170 being actuatable to manually effect movement of the second portion 130 along the width-wise axis $A_W$. In the embodiment shown, the tab 170 is mounted to the moveable segment 148 of the second portion 130, and the tab 170 extends from the moveable segment 148 in a direction away from the panel 76. When the cover assembly 62 is disposed on and completely covers the cargo bed 12, the tab 170 extends downwardly toward to the interior of the cargo bed 12. As described further below, the operator can grasp and move the tab 170 to effect movement of the moveable segment 148 along the width-wise axis $A_W$ when adjusting the vertical position of the catch 46.

The cover assembly 62 further includes a plurality of fasteners 172 extending through the first 128 and second 130 portions of the adjustment mechanism 106. As previously mentioned, the first portion 128 has the apertures 144 having the oval configuration. As shown in FIG. 15, the second portion 130 also has apertures 174 having an oval configuration. In addition, the apertures 174 may be closed or open. The size of the apertures 174 of the second portion 130 of the adjustment mechanism 106 may be the same or different than the size of the apertures 144 defined in the first portion 128 of the adjustment mechanism 106. The apertures 144 of the first portion 128 are aligned with the apertures 174 of the second portion 130, and the fasteners 172 extend through the aligned apertures 144, 174. The oval configuration of the aligned apertures 144, 174 enables movement of the first 128 and second 130 portions relative to the fasteners 172. In the illustrated embodiment, each of the fixed segment 146 and the moveable segment 148 of the second portion 130 has the plurality of apertures 174, with the plurality of apertures 174 of the moveable segment 148 having the oval configuration. The fasteners 172 extend through the aligned apertures 144, 174 of the first portion and the fixed 146 and moveable 148 segments. The oval configuration of the apertures 144 of the first portion 128 and the apertures 174 of the moveable segment 148 enable movement of the moveable segment 148 relative to the fasteners 172.

In addition, and as shown, the apertures 174 of the fixed segment 146 have substantially the same configuration as the fasteners 172. At least because of this configuration, the fixed segment 146 remains substantially stationary when the second portion 130 of the adjustment mechanism 106 is adjusted.

Each of the fasteners 172 has a head portion 173 and a threaded portion 175 having a tip 177. The fasteners 172 are arranged such that the head portion 173 of the fasteners 172 are positioned or seated against the inner frame member 98, such as within slots defined in the inner frame member 98. The threaded portion 175 of the fasteners 172 extend downwards through the aligned apertures 174, 144, with a tip 177 exposed through the first portion 128 of the adjustment mechanism 128. A nut 179 mates with the threaded portion 175 of each of the fasteners 172 to secure the adjustment mechanism 106 in position.

Figure 11:
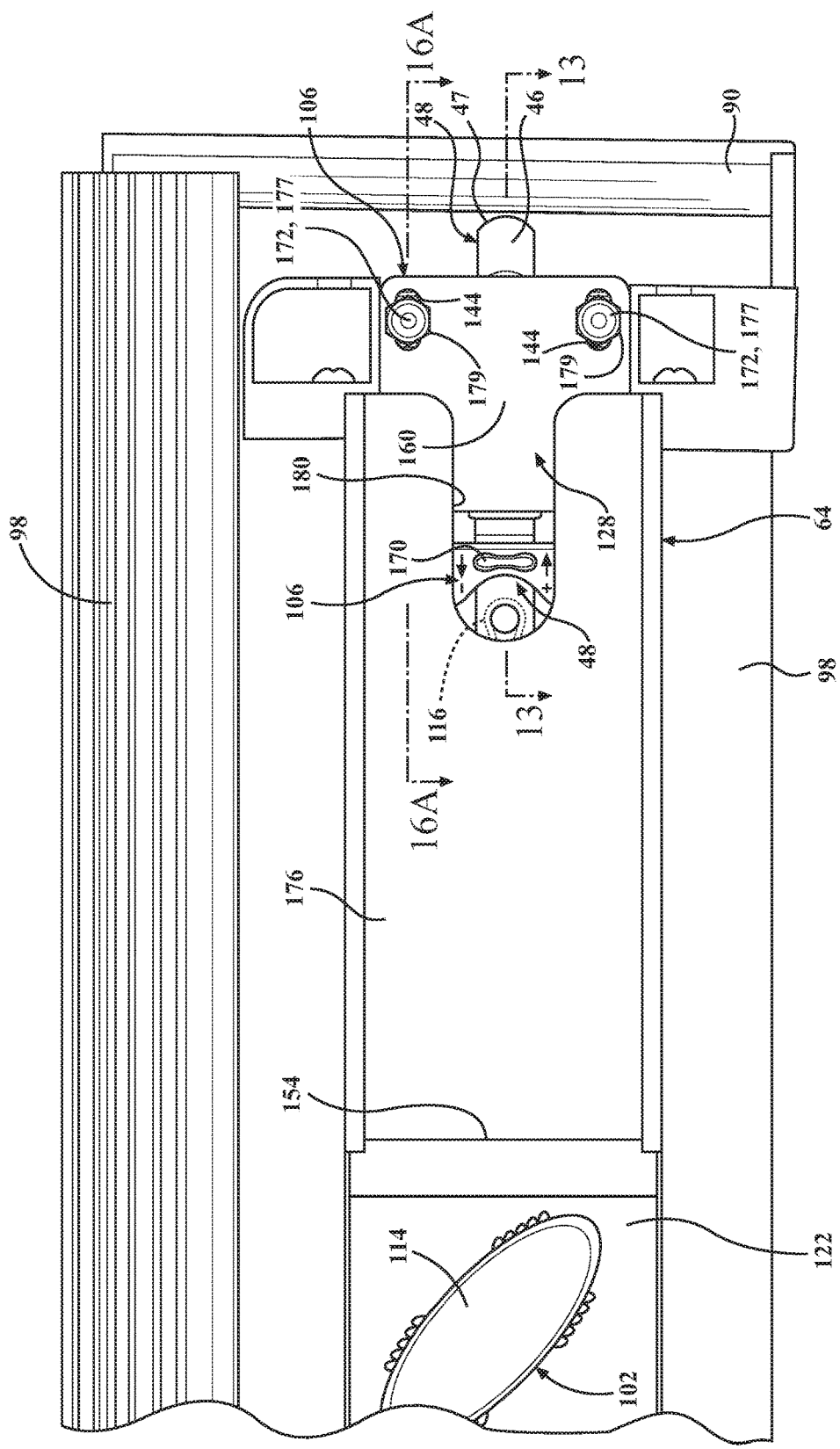
FIG. 11 is a bottom plan view of a portion of the cover assembly of the hard tonneau cover system.
Figure 13:
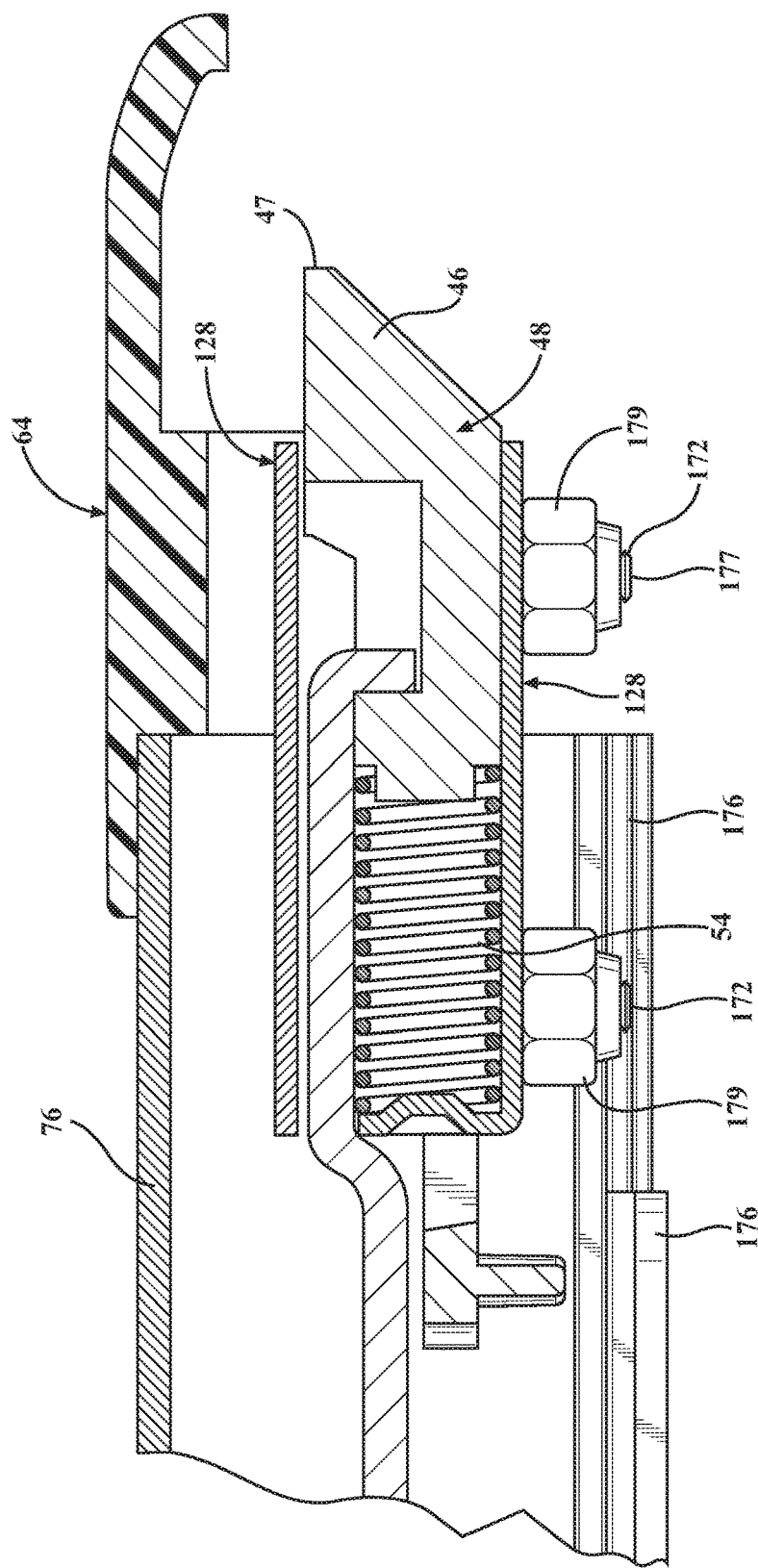
FIG. 13 is a cross-sectional view of the portion of the cover assembly of the foldable hard tonneau cover system taken along line 13-13 of FIG. 11.

As shown in FIGS. 11-13, the cover assembly 62 further has a decorative plate 176 disposed over a portion of the channel 100 and partially enclosing the latch mechanism 48, the release device 102, and the adjustment mechanism 106. In an embodiment, the inner frame member 98 defines a slot 178, and the decorative plate 176 slides into the slot 178 and is disposed over a portion of the channel 100. In addition, the decorative plate 176 abuts the end 154 of the support 122. In an embodiment, the decorative plate 176 provides access to the adjustment mechanism 106. For example, the decorative plate 176 includes an opening 180, which exposes a portion of the underlying adjustment mechanism 106 including the tab 170. With this configuration, the decorative plate 176 does not have to be removed to adjust the vertical and/or lateral position of the catch 46. For instance, the operator can grasp the tab 170 exposed through the opening 180 to adjust the vertical position of the catch 46 without having to remove the decorative plate 176. In addition, the operator can loosen the nuts 179 coupled to the fasteners 172 and manually adjust the first portion 128 along the width-wise axis $A_W$ to adjust the lateral position of the catch 46 and/or manually adjust the second portion 130 along the width-wise axis $A_W$ to adjust the vertical position of the catch 46 without having to remove the decorative plate 176.

As mentioned earlier, the adjustment mechanism 106 is used to adjust a lateral and/or vertical position of the catch 46 of the latch mechanism 48. Examples of the vertical and/or lateral adjustment of the catch 46 are described below with reference to FIGS. 16A-16E. It is to be appreciated that for illustrative purposes, the orientation of the components shown in FIGS. 16A-16E has been reversed relative to the orientation of these components shown in previous Figures.

FIG. 16A illustrates a portion of the cover assembly 62 prior to adjustment of the position of the catch 46. As shown, the front end 47 of the catch 46 extends a first lateral distance $D_{L1}$ from the fixed segment 146 of the second portion 130 of the adjustment mechanism 106. The front end 47 of the catch 46 also extends a first vertical distance $D_{V1}$ from a plane P defined by the lower surface 65 of the frame 64 of the cover assembly 62.

The position of the catch 46 may be adjusted manually. For example, the operator can lower the tailgate 18 and reach under the cover assembly 62 for access to the adjustment mechanism 106. As shown in FIG. 16B, the operator can loosen each of the nuts 179 to loosen the fasteners 172. Once the fasteners 172 are loosened, the operator can manually adjust the lateral and/or vertical position of the catch 46. In one example, the lateral position of the catch 46 is adjusted by moving the first portion 128 along the width-wise axis $A_W$ relative to the second portion 130. As mentioned above, adjustment of the lateral position of the catch 46 is independent of the movement of the catch 46 between the latch and unlatch positions. This may be accomplished, for example, by pushing the first portion 128 in either direction along the width-wise axis $A_W$ with the operator's hand as shown in FIG. 16C.

It is to be appreciated that with the fasteners 172 being loosened (by virtue of loosening the nuts 179), rather than being removed, the first portion 128 is also moveable relative to the fasteners 172. The distance that the first portion 128 can be moved is typically restricted by the diameter of the oval configuration of the apertures 144, 174 through which the fasteners 172 are disposed. Accordingly, the amount of adjustment of the lateral position of the catch 46 may be restricted is due, at least in part, to the restricted movement of the first portion 128 relative to the fasteners 172.

In the example shown in FIG. 16C, the operator moves the first portion 128 of the adjustment mechanism 106 towards the right (which would be toward the side rail 28) to adjust the lateral position of the catch 46. The first portion 128 of the adjustment mechanism 106 is moved such that the front end 47 of the catch 46 extends a second lateral distance $D_{L2}$ from the fixed segment 146. Since the first portion 128 is moved, the second lateral distance $D_{L2}$ is larger than the first lateral distance $D_{L1}$.

The operator can also manually adjust the vertical position of the catch 46. Once the nuts 179 are loosened to loosen the fasteners 172, the operator can grasp the tab 170 protruding from the moveable segment 148 of the adjustment mechanism 106. This is shown in FIG. 16D. The operator can pull the tab 170 in either direction along the width-wise axis $A_W$ to manually move the moveable segment 148 of the adjustment mechanism 106 along the width-wise axis $A_W$. In the present embodiment, the moveable segment 148 moves relative to the first portion 128 of the adjustment mechanism 106 to adjust the vertical position of the catch 46.

When the moveable segment 148 is moved along the width-wise axis $A_W$, the plurality of notches 152, 162 of the moveable segment 148 moves along or follows the plurality of notches 152, 162 of the fixed segment 146. In an example, the moveable segment 148 is moveable in increments as each notch of the plurality of notches 152, 162 of the moveable segment 148 engages the plurality of notches 152, 162 of the fixed segment 146. Alternatively, the moveable segment 148 could be moved a predefined distance along the width-wise axis $A_W$, rather than notch-by-notch. For instance, the moveable segment 148 could be separated slightly from the fixed segment 146 to disengage the notches 152, 162 of the fixed 146 and moveable 148 segments, moved a predefined distance along the width-wise axis $A_W$, and then brought back into contact with the fixed segment 146 to re-engage the notches 152, 162 of the fixed 146 and moveable 148 segments.

FIG. 16D illustrates the positioning of the adjustment mechanism 106 after the moveable segment 148 has been moved along the width-wise axis $A_W$. When the moveable segment 148 is moved, the second portion 130 of the adjustment mechanism 106 moves the catch 46 of the latch mechanism 48 to adjust the vertical position of the catch 46. For example, when the moveable segment 148 is moved toward the side rail 28 (i.e., to the right-hand-side of the figure), the moveable segment 148 moves relative to the fixed segment 146 in a downwards direction as the plurality of notches 152, 162 of the moveable segment 148 moves along or follows the plurality of notches 152, 162 of the fixed segment 146. The moveable segment 148 causes the first portion 128 of the adjustment mechanism 106 and the latch mechanism 48, which is coupled to the first portion 128, to move downwards as well. In the example shown in FIGS. 16A and 16D, the second portion 130 of the adjustment mechanism 106 moves the catch 46 of the latch mechanism 48 between a first position spaced a first vertical distance $D_{V1}$ relative to the plane P of the frame 64 (as shown in FIG. 16A) and a second position spaced a second vertical distance $D_{V2}$ relative to the plane P (as shown in FIG. 16D). In the example shown, when the moveable segment 148 is moved toward the side rail 28, the second vertical distance $D_{V2}$ is less than the first vertical distance $D_{V2}$, indicating an adjustment in the vertical position of the catch 46.

With the nuts 179 being loosened (and as such the fasteners 172 being loosened), rather than removed, the moveable segment 148 is moveable relative to the fasteners 172 as mentioned above. It is to be understood that the distance that the moveable segment 148 can be moved is typically restricted by the diameter of the oval configuration of the apertures 144, 174 through which the fasteners 172 are disposed. Accordingly, the amount of adjustment of the vertical position of the catch 46 may be restricted is due, at least in part, to the restricted movement of the moveable segment 148 relative to the fasteners 172.

The vertical and lateral positions of the catch 46 may be adjusted independently, as described above. In an embodiment, the vertical and lateral positions of the catch 46 may otherwise be adjusted at the same time. Said differently, the first portion 128 of the adjustment mechanism 106 may be adjustable along the width-wise axis $A_W$ to adjust the lateral position of the catch 46 simultaneously with the second portion 130 interacting with the first portion 128 to adjust the vertical position of the catch 46. This is shown in FIG. 16E. In this embodiment, the first portion 128 of the adjustment mechanism is moved at the same time as the moveable segment 148 of the second portion 130 of the adjustment mechanism 106. The movement of both the first 128 and second 130 portions of the adjustment mechanism causes simultaneously adjustment of the vertical and lateral positions of the catch 46.

Another embodiment of the tonneau cover system 200 of the present disclosure is described below with reference to FIGS. 17-32E. As mentioned earlier, the tonneau cover system 200 has a foldable flexible cover 266 and may be referred to as a foldable flexible tonneau cover system.

Figure 17:
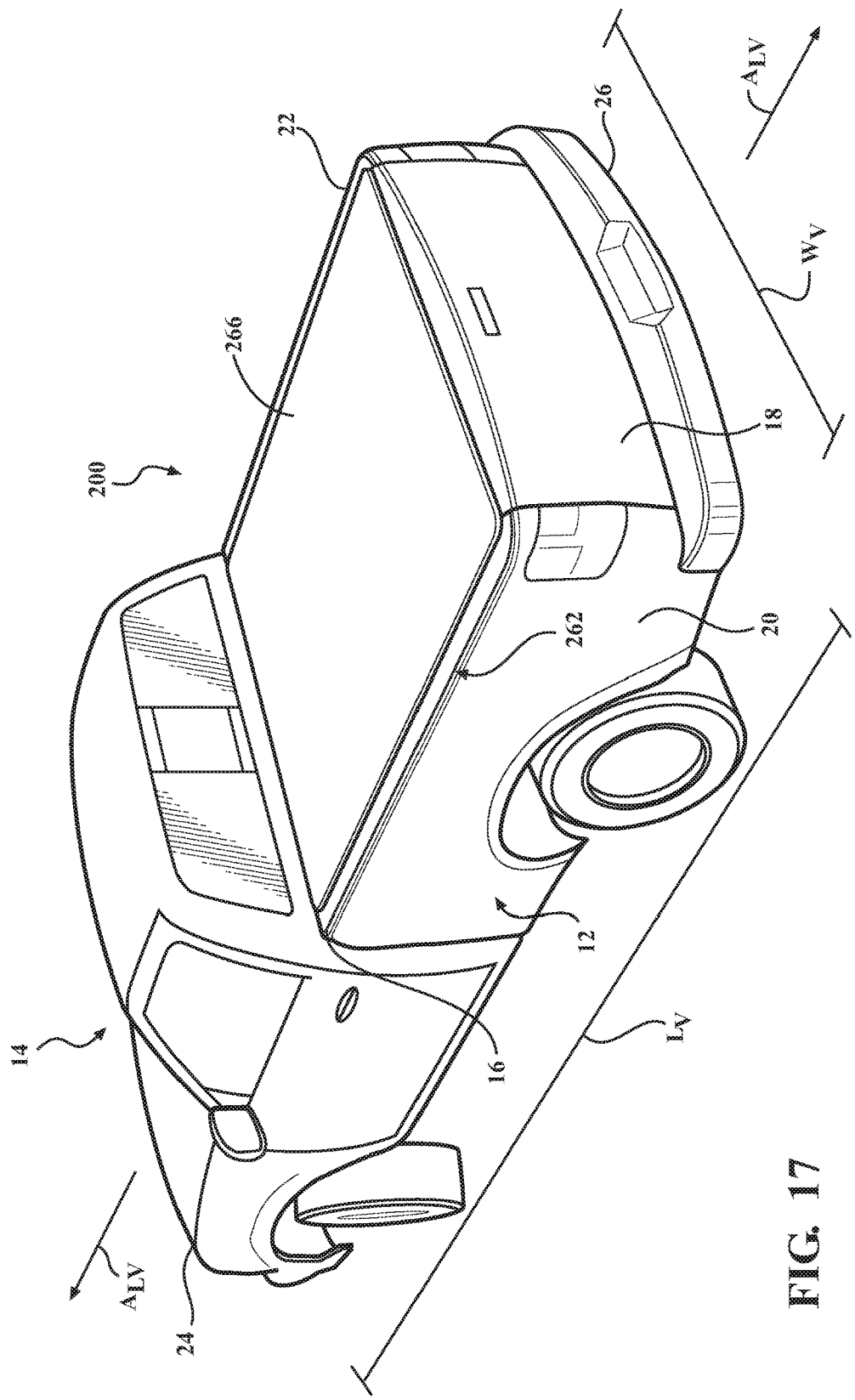
FIG. 17 is a semi-schematic perspective view of the vehicle including the cargo bed with another embodiment of the tonneau cover system disposed over and covering the cargo bed. This embodiment of the tonneau cover system includes a flexible cover, and the tonneau cover system may be referred to as a foldable flexible tonneau cover system.
Figure 18:
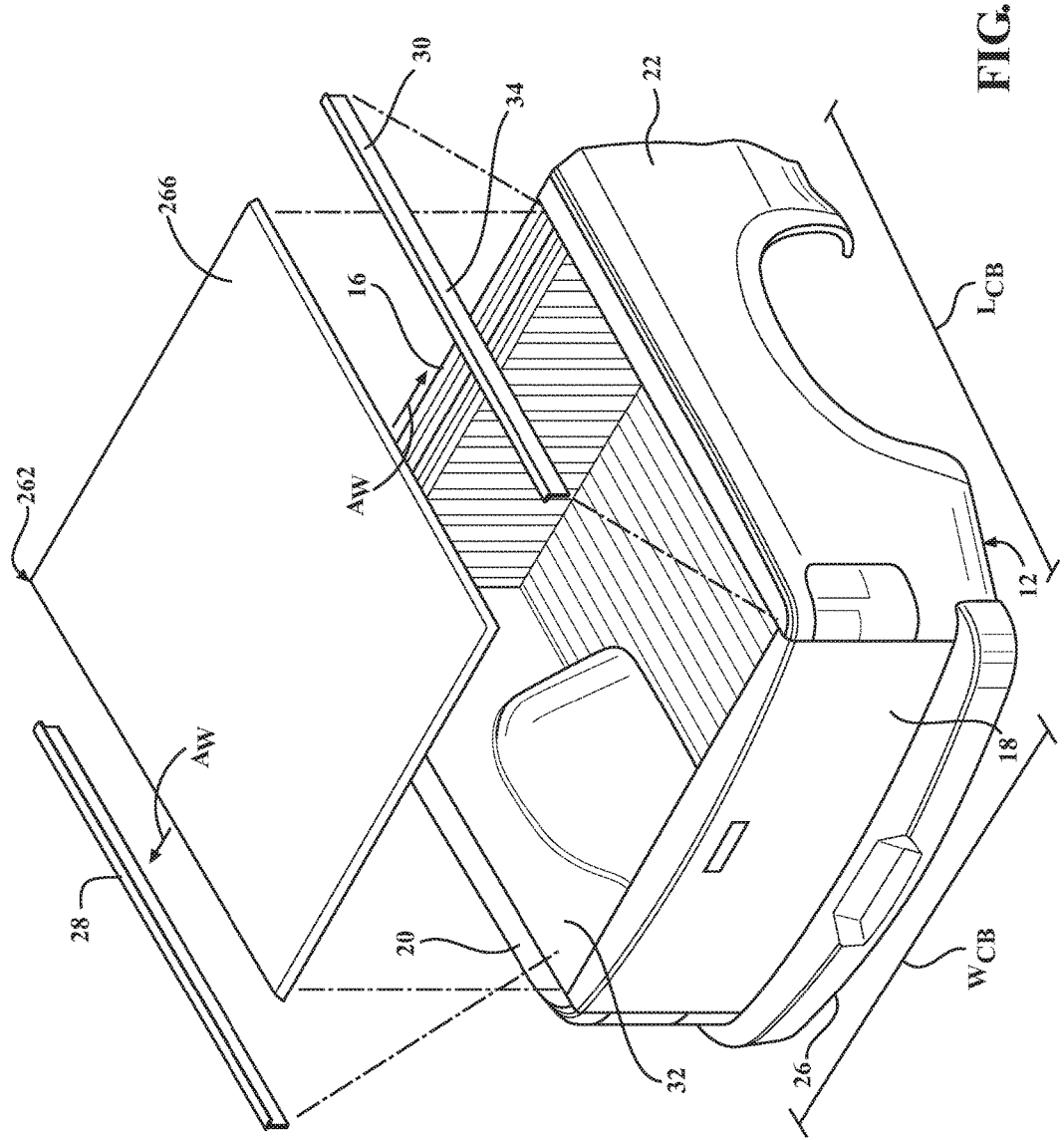
FIG. 18 is a semi-schematic exploded view of the foldable flexible tonneau cover system disposed over the cargo bed of the vehicle.
Figure 19:
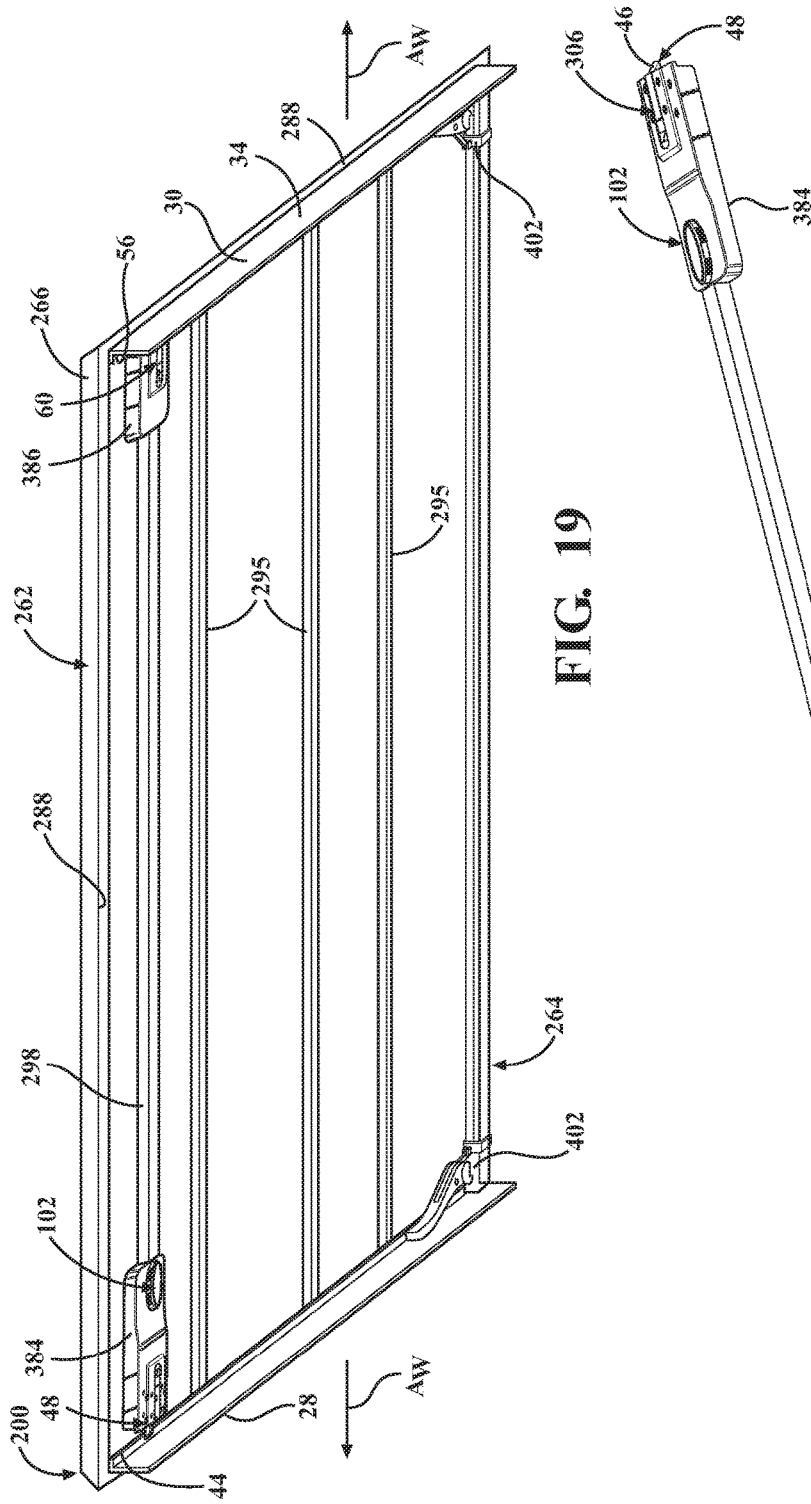
FIG. 19 is semi-schematic, bottom perspective view of the foldable flexible tonneau cover system.
Figure 20:
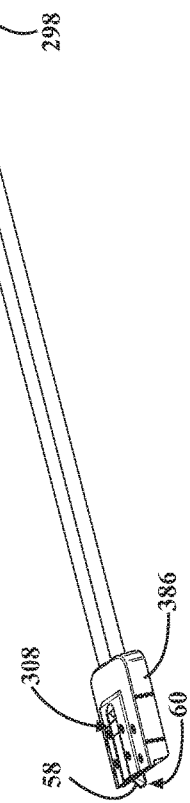
FIG. 20 is a perspective view of a portion of the foldable flexible tonneau cover system, illustrating portions of the first and second latch mechanisms, first and second adjustment mechanisms, and a release device.

As shown in FIGS. 17 and 18, the tonneau cover system 200 may be disposed over and at least partially cover the cargo bed 12 of the vehicle 14. The vehicle 14 may be a pickup truck including the cargo bed 12, and the tonneau cover system 20 is disposed over and at least partially covers the cargo bed 12. The cargo bed 12 has the header 16, the tailgate 18, and the opposing sides 20, 22, and the tonneau cover system 10 is disposed over and coupled to the opposing sides 20, 22. Further details of the vehicle 14 are described above with reference to FIGS. 1 and 2.

The tonneau cover system 200 includes the first 28 and second 30 side rails each adapted to be mounted about the cargo bed 12 of the vehicle 14. The first side rail 28 is spaced from the second side rail 30 to define the width-wise axis $A_W$ between the side rails 28, 30 and adapted to extend along a width $W_{CB}$ of the cargo bed 12. The first side rail 28 is parallel with and mounted to one of the sides 20 of the cargo bed 12, and the second side rail 30 is parallel with and mounted to the other side 22 of the cargo bed 12. The side rails 28, 30 extend at least partially along the respective side 20, 22 and along at least a portion of the length $L_{CB}$ of the cargo bed 12. In the embodiment shown in FIG. 18, the side rails 28, 30 extend along the entire length $L_{CB}$ of the cargo bed 12. In an alternative embodiment, the side rails 28, 30 could be discontinuous, with each side rail 28, 30 having a plurality of strikers distributed at preselected locations along the sides 20, 22 of the cargo bed 12.

The side rail 28 is mounted to the side 20 of the cargo bed 12 with a seal 29 disposed between the side rail 28 and the side 20, and the side rail 30 is mounted to the other side 22 of the cargo bed 12 with a seal 31 disposed between the side rail 30 and the side 22. In an example, each of the opposing sides 20, 22 has an interior surface 32, and each of the side rails 28, 30 has an exterior surface 34. The opposing sides 20, 22 and the side rails 28, 30 are semi-schematically shown in the figures. Alternatively, the side rails 28, 30 could directly abut the sides 20, 22 of the cargo bed 12. In this alternative embodiment, the configuration of the exterior surface 34 of the side rails 28, 30 could be complementary to a portion of the interior surface 32 of the respective sides 20, 22 of the cargo bed 12. With this configuration, the first side rail 28 would fit against and/or within the complementary portion of the interior surface 32 of the one side 20, and the second side rail 30 would fit against and/or within the complementary portion of the interior surface 32 of the other side 22. The side rails 28, 30 may be mounted to the respective sides 20, 22 of the cargo bed 12 utilizing any suitable fastening mechanism (not shown), such as with one or more fasteners, clamps, latches, and/or the like.

Figure 21:
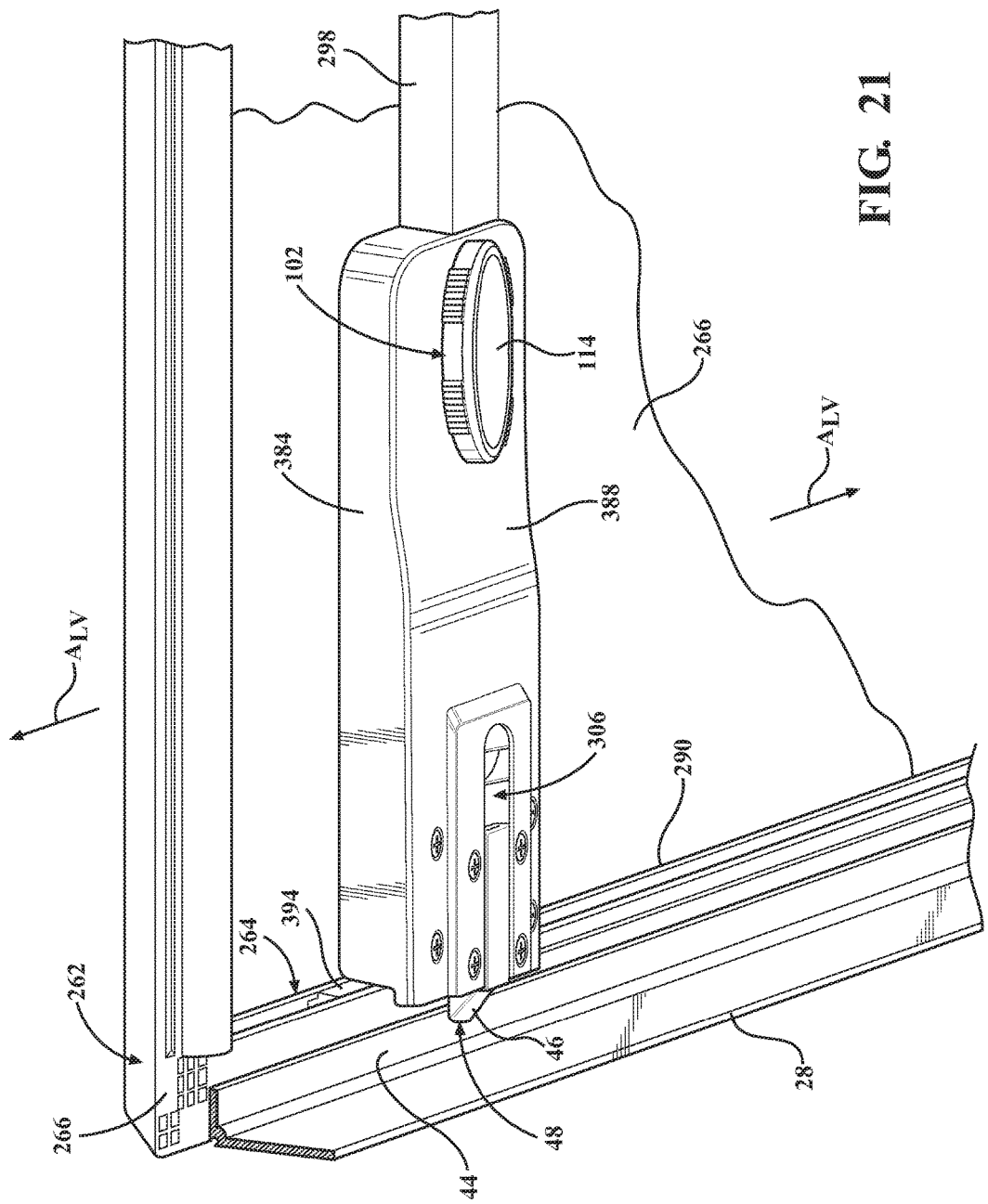
FIG. 21 is a bottom perspective view of a portion of the foldable flexible tonneau cover system, illustrating portions of the first latch mechanism, the first adjustment mechanism, and the release device.
Figure 22:
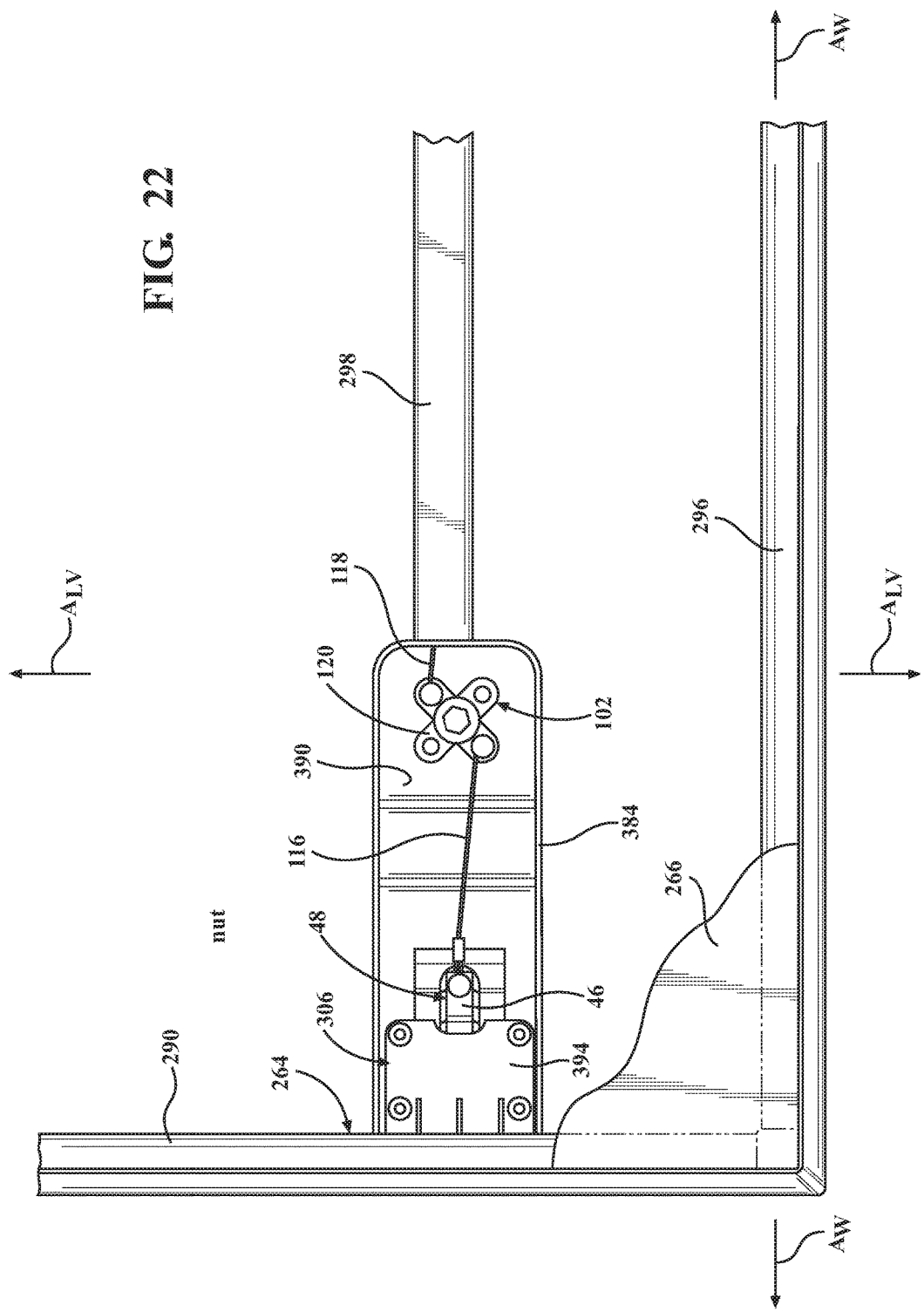
FIG. 22 is a top plan view of the portion of the foldable flexible tonneau cover system of FIG. 21.
Figure 23:
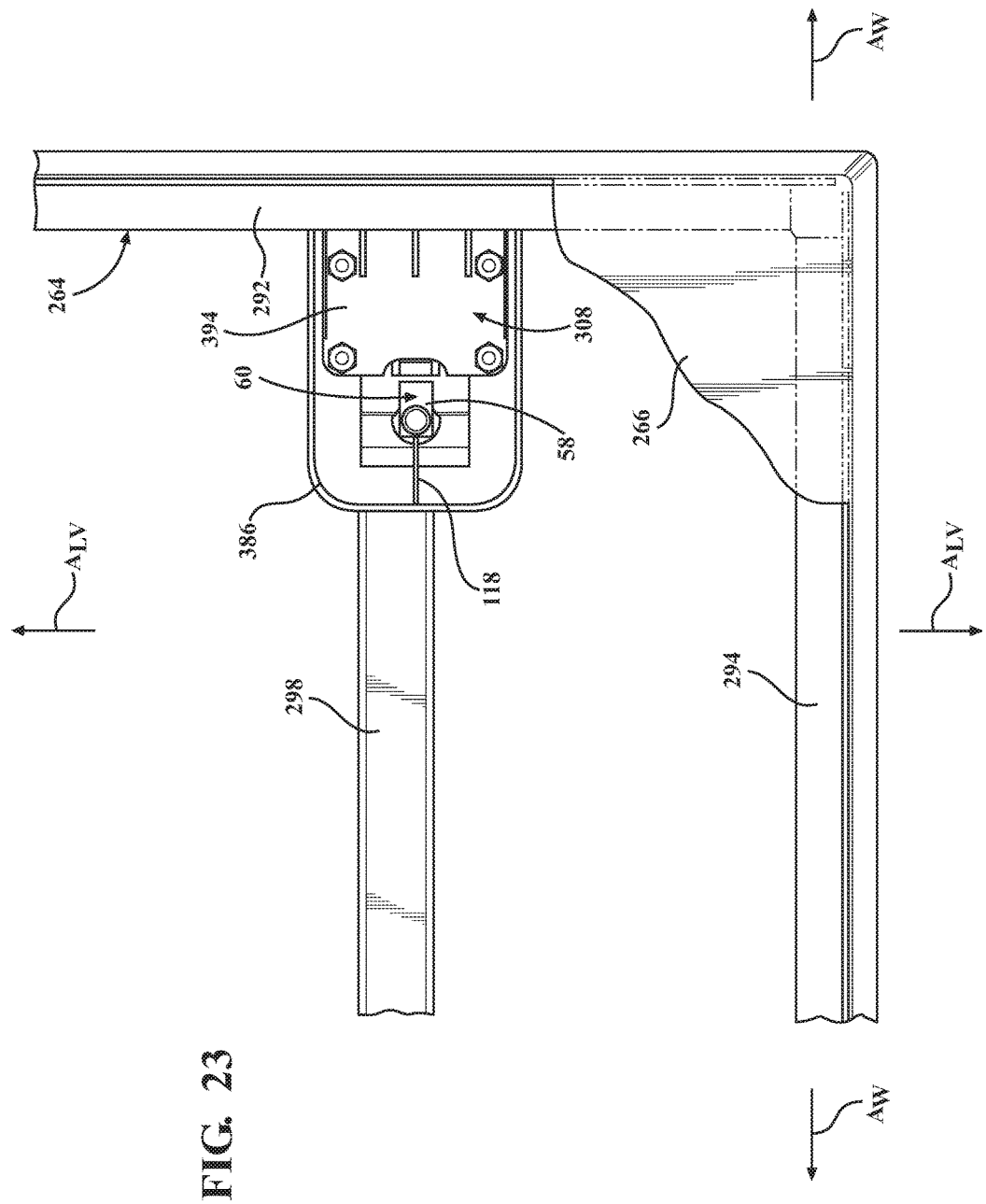
FIG. 23 is a top plan view of another portion of the foldable flexible tonneau cover system, illustrating portions of the second latch mechanism and the second adjustment mechanism.
Figure 24:
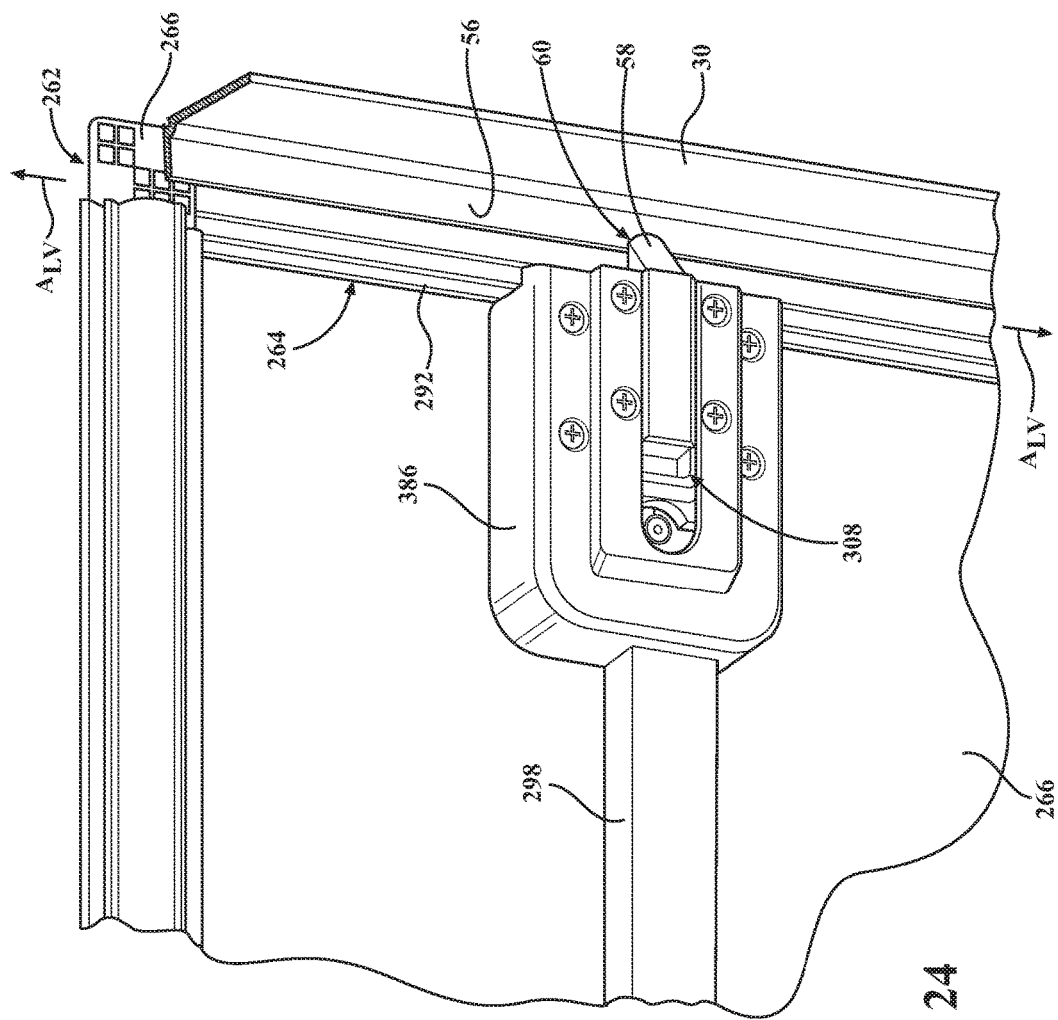
FIG. 24 is a bottom perspective view of the other portion of the foldable flexible tonneau cover system of FIG. 23.
Figure 25:
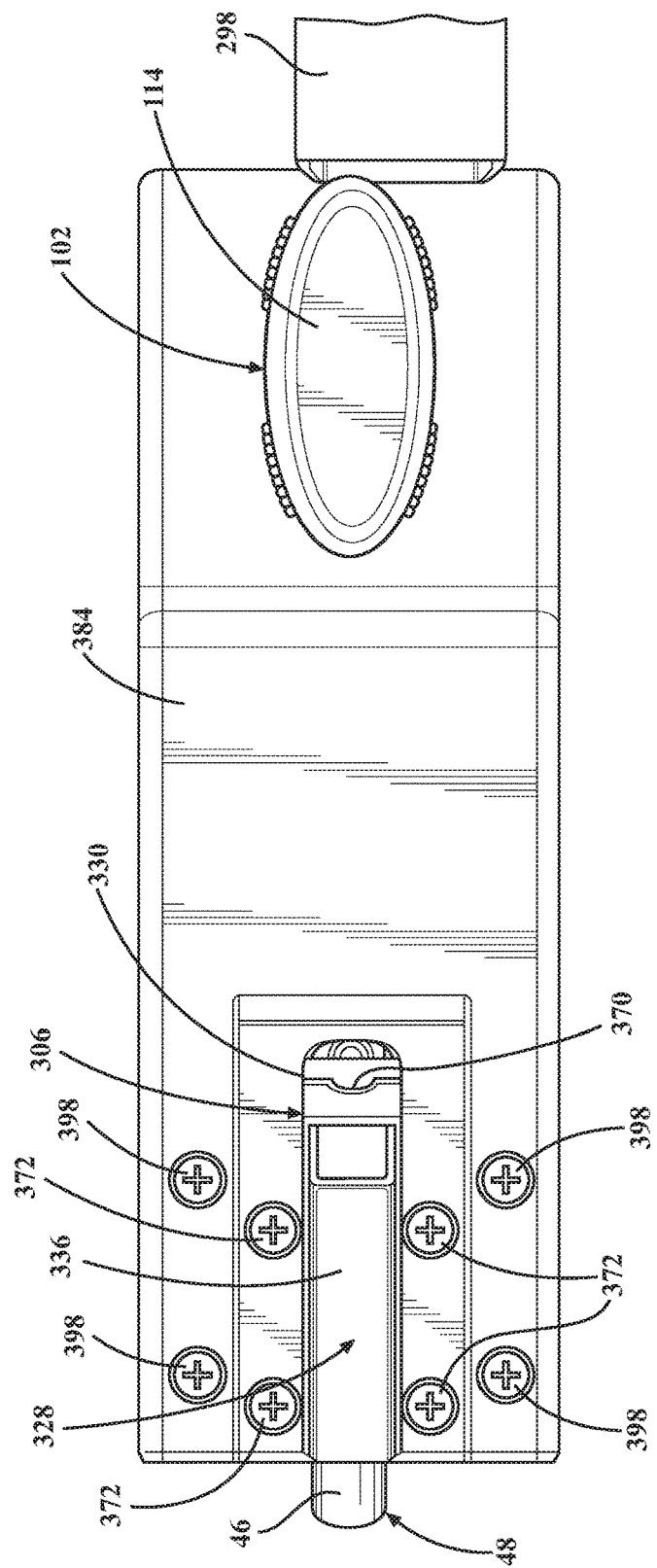
FIG. 25 is a bottom view of a portion of the foldable flexible tonneau cover system, illustrating the portions of the first latch mechanism, the first adjustment mechanism, and the release device.
Figure 26:
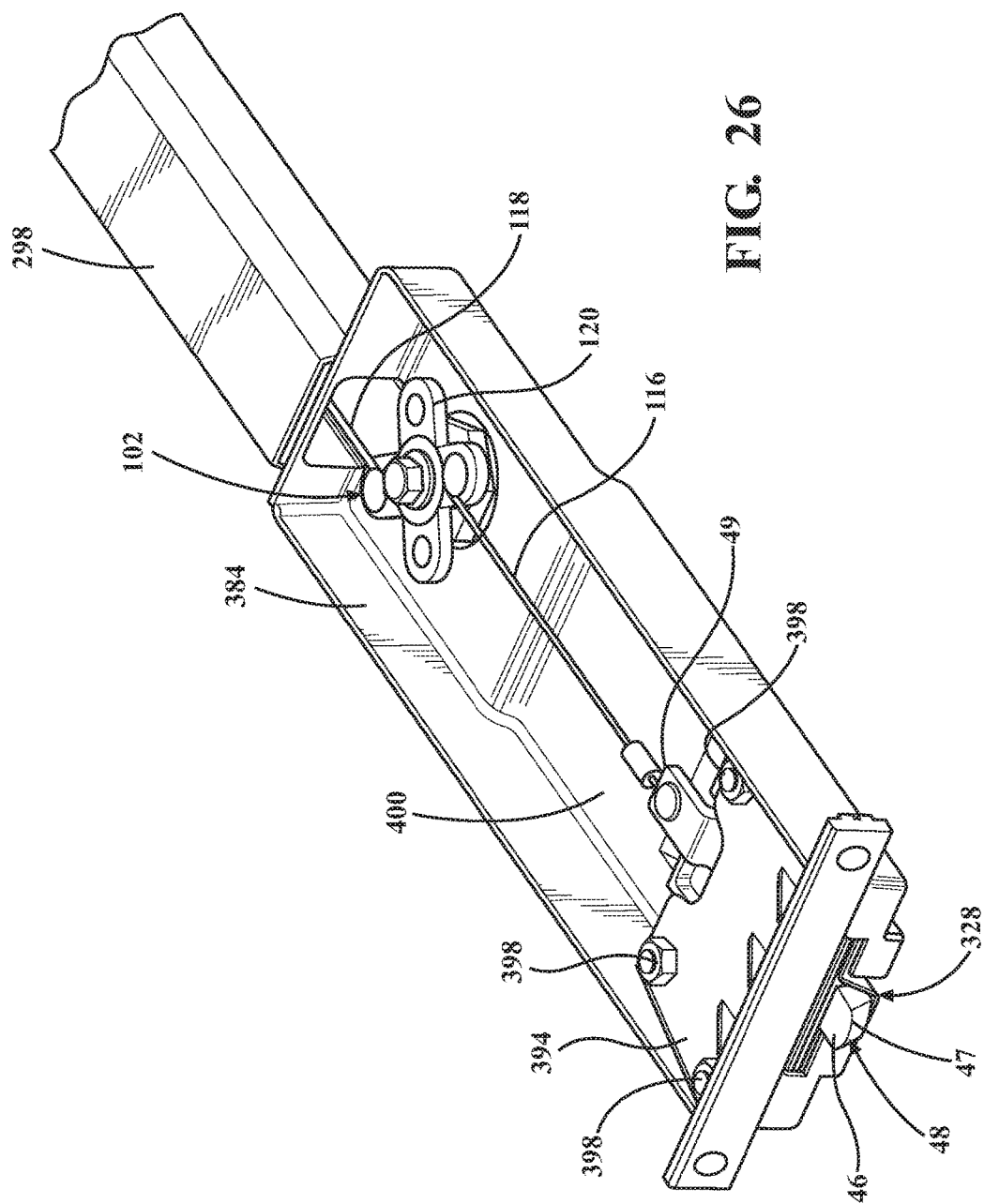
FIG. 26 is a semi-schematic top perspective view of a portion of the foldable flexible tonneau cover system.

Details of the side rails 28, 30 are the same as previously described for the tonneau cover system 10, where the side rail 28 defines the first receiving feature 44 and the second side rail 30 defines the second receiving feature 56. The first receiving feature 44 receives the first catch 46 of the first latch mechanism 48 coupled to the cover assembly 62 of the tonneau cover system 200, as shown in FIG. 21. The second receiving feature 56 receives the second catch 58 of the second latch mechanism 60 coupled to the cover assembly 62 of the tonneau cover system 200, as shown in FIG. 24.

The tonneau cover system 200 further comprises the cover assembly 262 coupled to the first 28 and second 30 side rails. The cover assembly 262 comprises the frame 264 and the cover 266 disposed over and coupled to the frame 264 for covering the cargo bed 12 of the vehicle 14. In one embodiment, and as shown at least in FIGS. 17-19, the cover assembly 262 is further defined as a foldable flexible cover 266. The foldable flexible cover 266 may be a tarp, canvas, or other covering formed from a suitable flexible material and/or fabric. In a non-limiting example, the flexible cover 266 is formed from or includes a vinyl material.

Figure 32A:
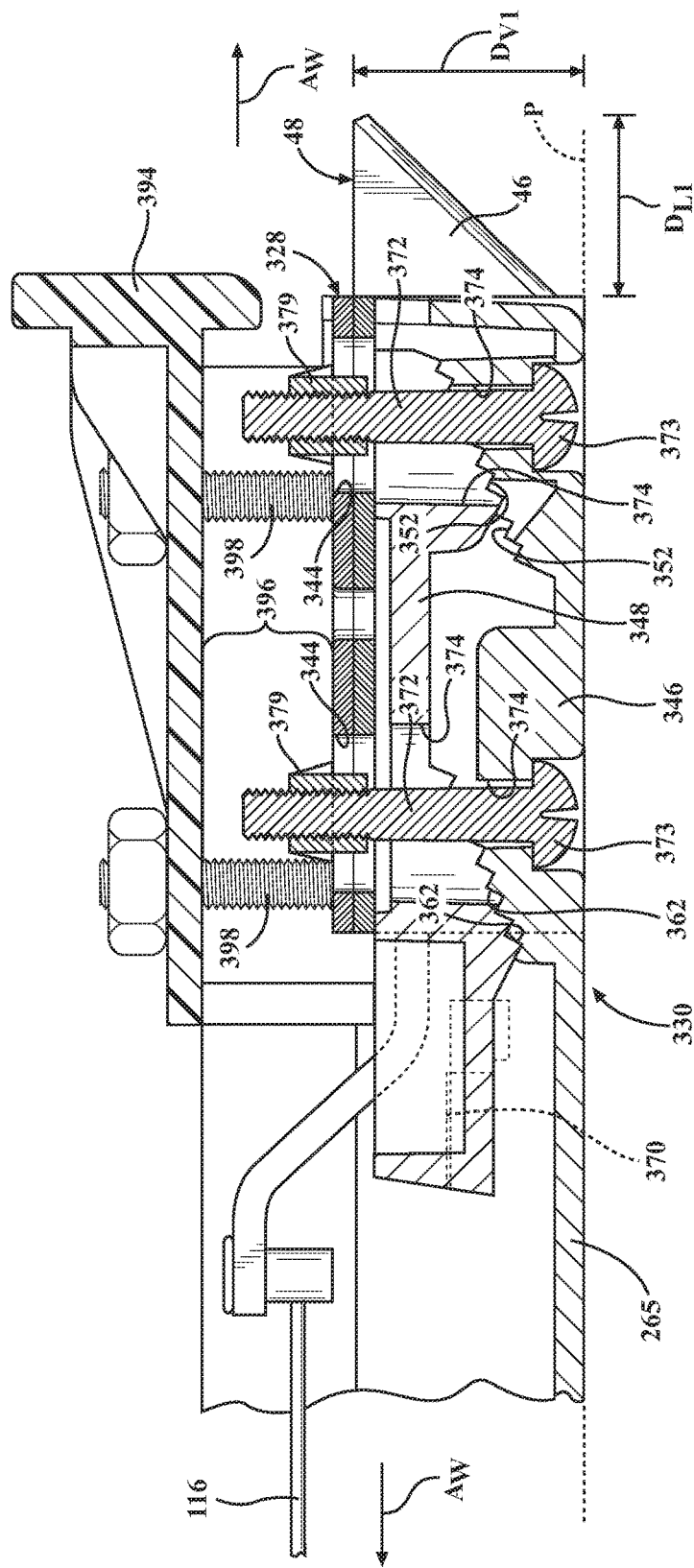
FIG. 32A is a cross-sectional view of a portion of the cover assembly of the foldable flexible tonneau cover system taken along line 32A-32A in FIG. 27.

The flexible cover 266 has a perimeter or periphery 288, and the cover assembly 262 further has the frame 264 disposed about the perimeter 288. The frame 264 has a lower 265 surface, as shown in FIG. 32A. The frame 264 further has a plurality of outer frame members, including a first outer frame member 290 adjacent and substantially parallel to the first side rail 28 and a second outer frame member 292 adjacent and substantially parallel to the second side rail 30. The first 290 and second 292 outer frame members extend along the longitudinal axis $A_{LV}$, and the first 290 and second 292 outer frame members are substantially parallel to one another. The frame 264 further includes third 294 and fourth 296 outer frame members extending along the width-wise axis $A_W$ and between the first 290 and second 292 outer frame members. In addition, the third 294 and fourth 296 outer frame members are substantially parallel to one another. In an embodiment, the cover assembly 266 further includes a latch mechanism 402 coupled to the third outer frame member 294. The latch mechanism 402 latches the cover assembly 266 to the side rails 28, 30 adjacent the header 16 of the cargo bed 12.

The outer frame members 290, 292 are coupled or joined to one another with one or more hinges (not shown). The hinges allow the flexible cover 266 to be lifted and/or folded to provide at least partial access to the interior of the cargo bed 12 of the vehicle 14. The frame 264 further has at least one cross bow 295 extending along the width-wise axis $A_W$ between the outer frame members 290, 292. The cross bow(s) 295 may be mounted to the frame 264 utilizing any suitable fastening mechanism. The cross bow(s) 295 hold and/or supports the flexible cover 266 so that the flexible cover 266 is relatively taut and has a smooth appearance. To this end, the flexible cover 266 is less likely to sag and/or collect water or debris.

The frame 264 further includes an inner frame member 298 extending along the width-wise axis $A_W$ between the first 290 and second 292 outer frame members. The inner frame member 298 is also substantially parallel to the third 294 and fourth 296 outer frame members. The inner frame member 298 defines a first housing 384 about one end of the inner frame member 298 and a second housing 386 about the other end of the inner frame member 298. The first housing 384 supports the first latch mechanism 48, a first adjustment mechanism 306, and a release device 102. The second housing 386 supports the second latch mechanism 60 and a second adjustment mechanism 308.

The tonneau cover system 200 further includes the first 48 and second 60 latch mechanisms. Each of the first 48 and second latch mechanisms is coupled to the frame 264. For instance, the first latch mechanism 48 is coupled to the first outer frame member 290, and the second latch mechanism 60 is coupled to the second outer frame member 292. The first 48 and second 60 latch mechanisms are used for latching the cover assembly 262 to the first 28 and second 30 side rails. In one embodiment, the first 48 and second 60 latch mechanisms are coupled to the frame 264 adjacent the tailgate 18. In the embodiment shown, the inner frame member 298 is positioned adjacent the outer frame member 296, and the latch mechanisms 48, 60 supported by the inner frame member 298 are also positioned adjacent the outer frame member 296. It is to be appreciated that the inner frame member 298 can be positioned anywhere along the length of the cover assembly 262.

Details of the first 48 and second 60 latch mechanisms for the foldable flexible tonneau cover system 200 are the same as described above for the foldable hard tonneau cover system 10. Again, the first latch mechanism 48 has the first catch 46 moveable between latch and unlatch positions, and the second latch mechanism 48 has the second catch 58 moveable between latch and unlatch positions.

As with the earlier embodiment, it is to be appreciated that each of the latch mechanisms 48,60 have common or similar components such that discussion of one of the latch mechanisms may equally apply to other latch mechanisms. For illustrative purposes, not all of the latch mechanisms are shown with the same level of detail.

The tonneau cover system 200 further includes the release device 102 coupled to the frame 264 and the first 48 and second 60 latch mechanisms. The release device 102 is actuatable to move the first catch 46 and second catch 58 to the unlatch position. In the illustrated embodiment, the release device 102 is coupled to the housing 384 of the inner frame member 298. The release device 102 includes the handle 114 mounted to an exterior surface 388 of the housing 384. The release device 102 further has the first cable 116 coupling the handle 114 to the first latch mechanism 48, and the second cable 118 coupling the handle 114 to the second latch mechanism 60. The release device 102 includes the coupler 120 coupled to the handle 114 and disposed within the housing 384. The first 116 and second 118 cables are directly mounted to the coupler 120. The handle 114 is actuatable to simultaneously move the first catch 46 of the first latch mechanism 48 and the second catch 58 of the second latch mechanism 60 to the unlatch positions. For example, an operator may actuate the handle 114 by rotating the handle 114 in one or more directions. When the handle 114 is rotated, the coupler 120 rotates and pulls the first cable 116 in a direction opposite the biasing direction of the first catch 46 and toward the unlatch position and pulls the second cable 118 in a direction opposite the biasing direction of the second catch 58 and toward the unlatch position. When pulled or moved toward the unlatch position, the catch 46, 58 is released from the side rails 28, 30.

With the release device 102 supported by the first housing 384 of the inner frame member 298, the release device 102 is positioned closer to the first latch mechanism 48 than the second latch mechanism 60. With this configuration, the first cable 116 coupled to the first latch mechanism 48 is shorter in length than the second cable 118 coupled to the second latch mechanism 60. Alternatively, the second housing 386 of the inner frame member 298 could support the release device 102. In this alternative embodiment, the release device 102 would be located closer to the second latch mechanism 60, and the second cable 118 would be shorter in length than the first cable 116.

Figure 32B:
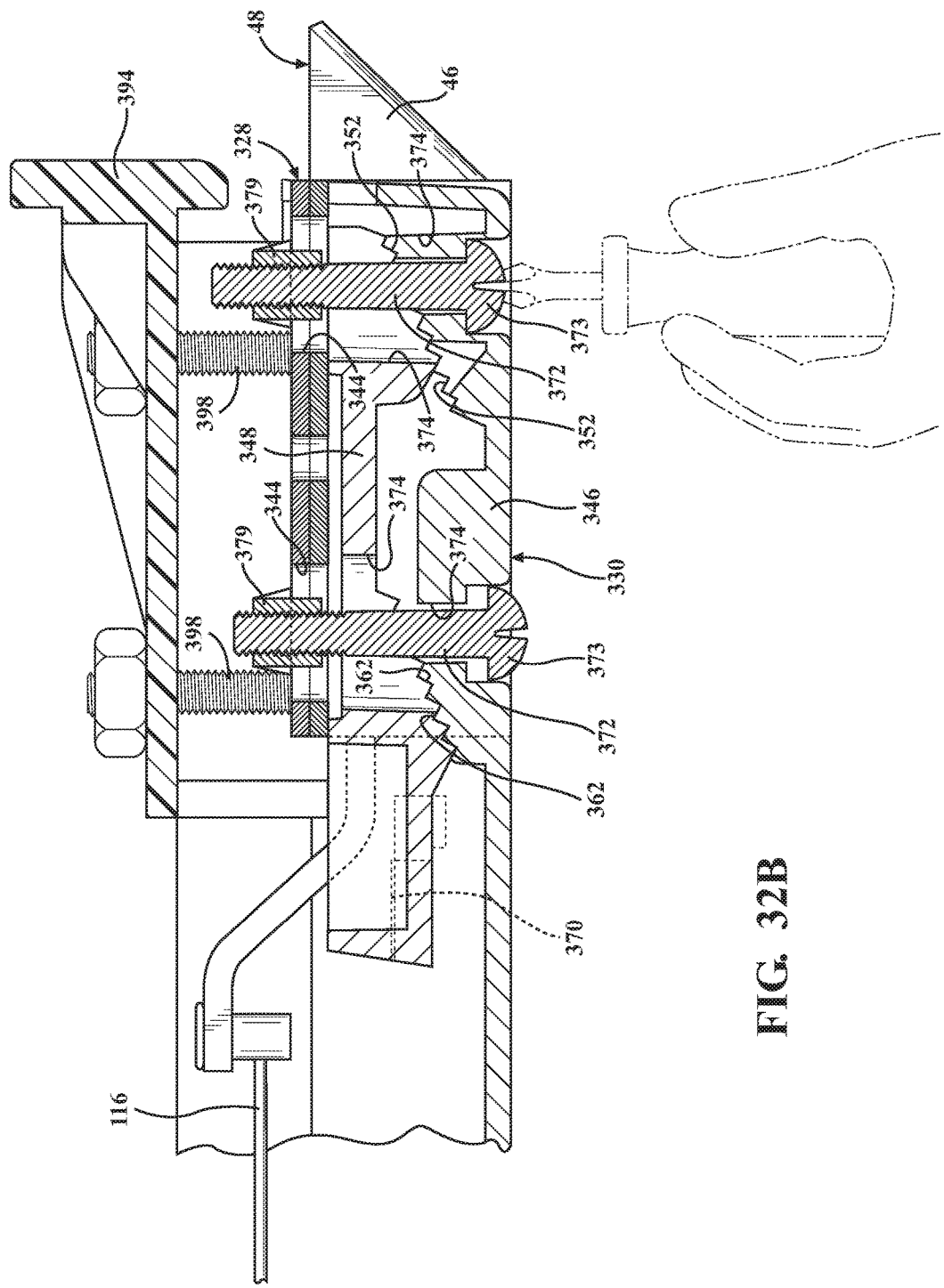
FIG. 32B is a cross-sectional view of the portion of the cover assembly of FIG. 27 illustrating loosening of the fasteners of the adjustment mechanism for adjustment of the latch mechanism.
Figure 32C:
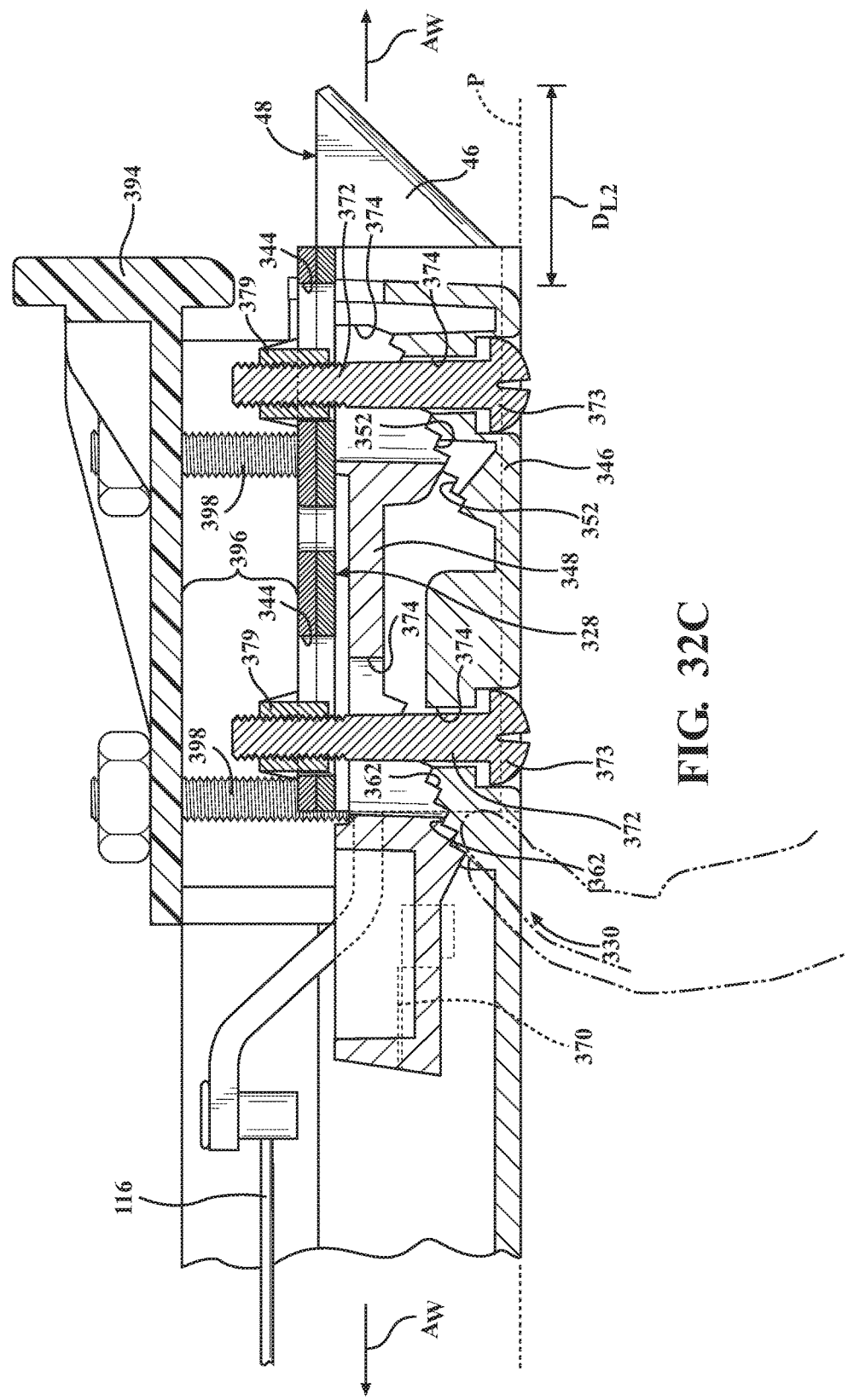
FIG. 32C is a cross-sectional view of the portion of the cover assembly of FIG. 27 illustrating adjustment of a lateral position of the latch mechanism independent of a vertical position adjustment.
Figure 32D:
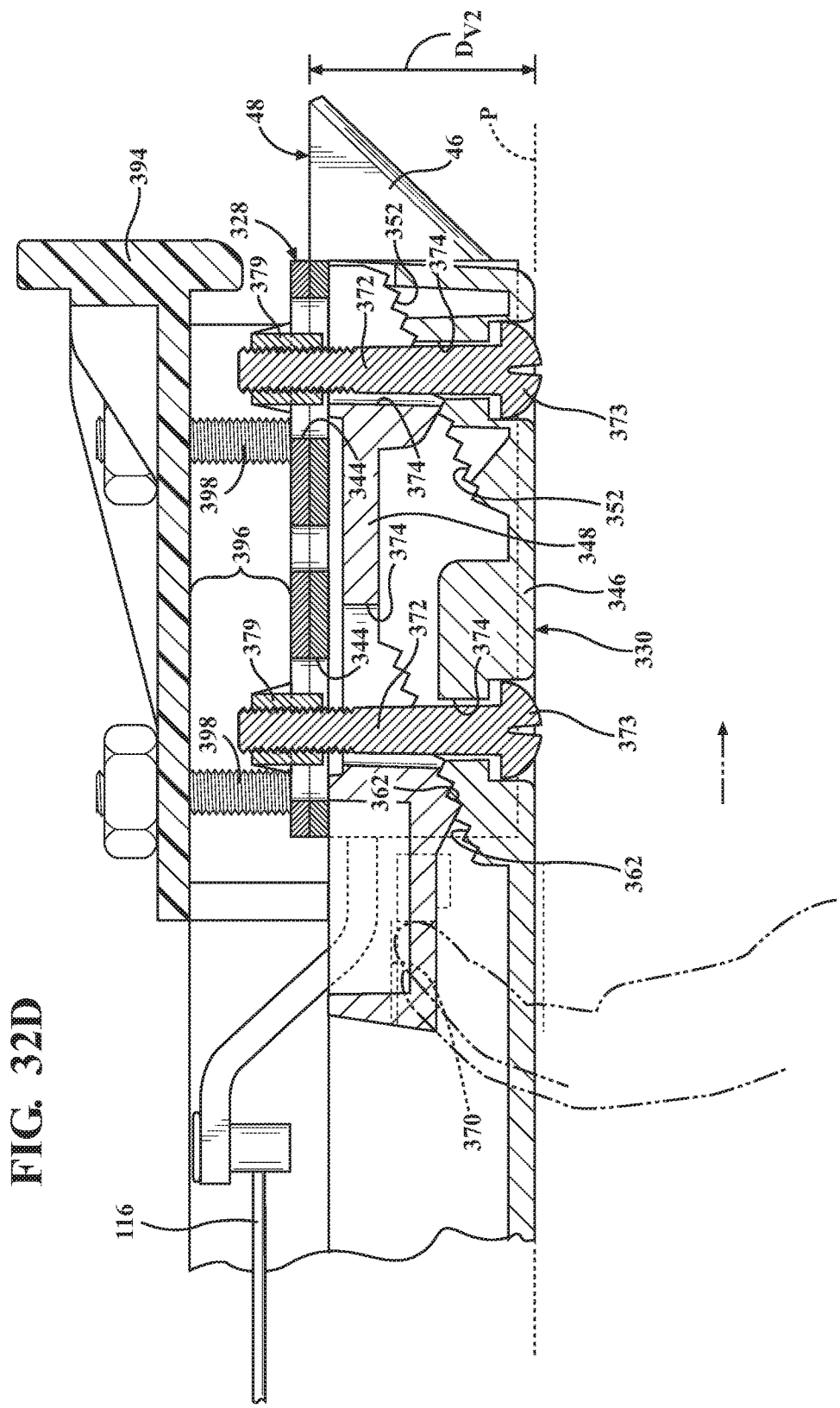
FIG. 32D is a cross-sectional view of the portion of the cover assembly of FIG. 27 illustrating adjustment of a vertical position of the latch mechanism independent of a lateral position adjustment.

Turning to FIGS. 32A-32E, it is to be appreciated that for illustrative purposes, the orientation of the components shown in FIGS. 32A-32E has been reversed relative to the orientation of these components shown in previous Figures. Adjustment of a position of the catch 46 of the first latch mechanism 48 and adjustment of a position of the catch 58 of the second latch mechanism may be accomplished utilizing first 306 and second 308 adjustment mechanisms coupled to the first 48 and second 60 latch mechanisms, respectively. In one embodiment, the adjustment mechanisms 306, 308 may be used to adjust a vertical position of the catch 46, 58. This is illustrated in FIG. 32D. In this embodiment, adjustment to the vertical position of the catch 46, 58 is accomplished independent of adjustment to the lateral position of the catch 46, 58. In another embodiment, the adjustment mechanisms 306, 308 may be used to adjust a lateral position of the catch 46, 48. This is illustrated in FIG. 32C. In this embodiment, adjustment to the lateral position of the catch 46, 58 is accomplished independent of adjustment to the vertical position of the catch 46, 58. In yet another embodiment, the adjustment mechanism 306, 308 may be used to adjust both the vertical and lateral positions of the catch 46, 58. In this embodiment, adjustment of the vertical position of the catch 46, 58 may be accomplished substantially simultaneously with adjustment of the lateral position of the catch 46, 58. This is shown in FIG. 32E. It is to be understood that when the lateral position of the catch 46, 58 is adjusted, the lateral adjustment is accomplished independent of the movement of the catch 46, 48 between the latch and unlatch positions. The adjustment(s) to the vertical and/or lateral position of the catch 46, 58 allows the catch 46, 58 to adequately engage the side rail 28, 30 when the catch 46, 58 is moved to the latch position.

Details of the first adjustment mechanism 306 is described below with reference to FIGS. 25-32E. The second adjustment mechanism 308 includes operational components that are substantially the same as the first adjustment mechanism 306. Accordingly, the details of the first adjustment mechanism 306 described below are also applicable to the second adjustment mechanism 308.

Figure 27:
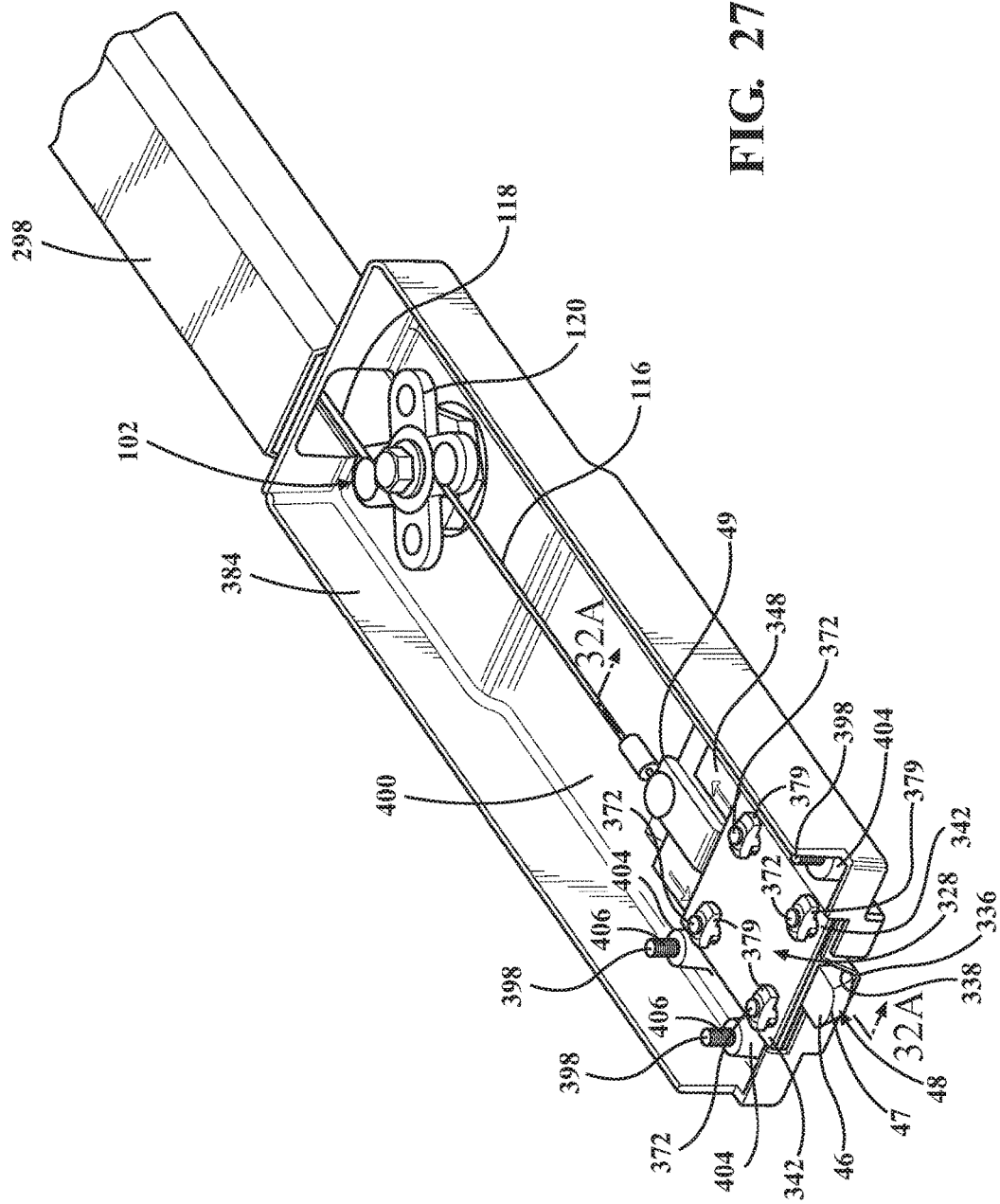
FIG. 27 is a semi-schematic top perspective view of the portion of the cover assembly of FIG. 26 with a mounting device removed.
Figure 30:
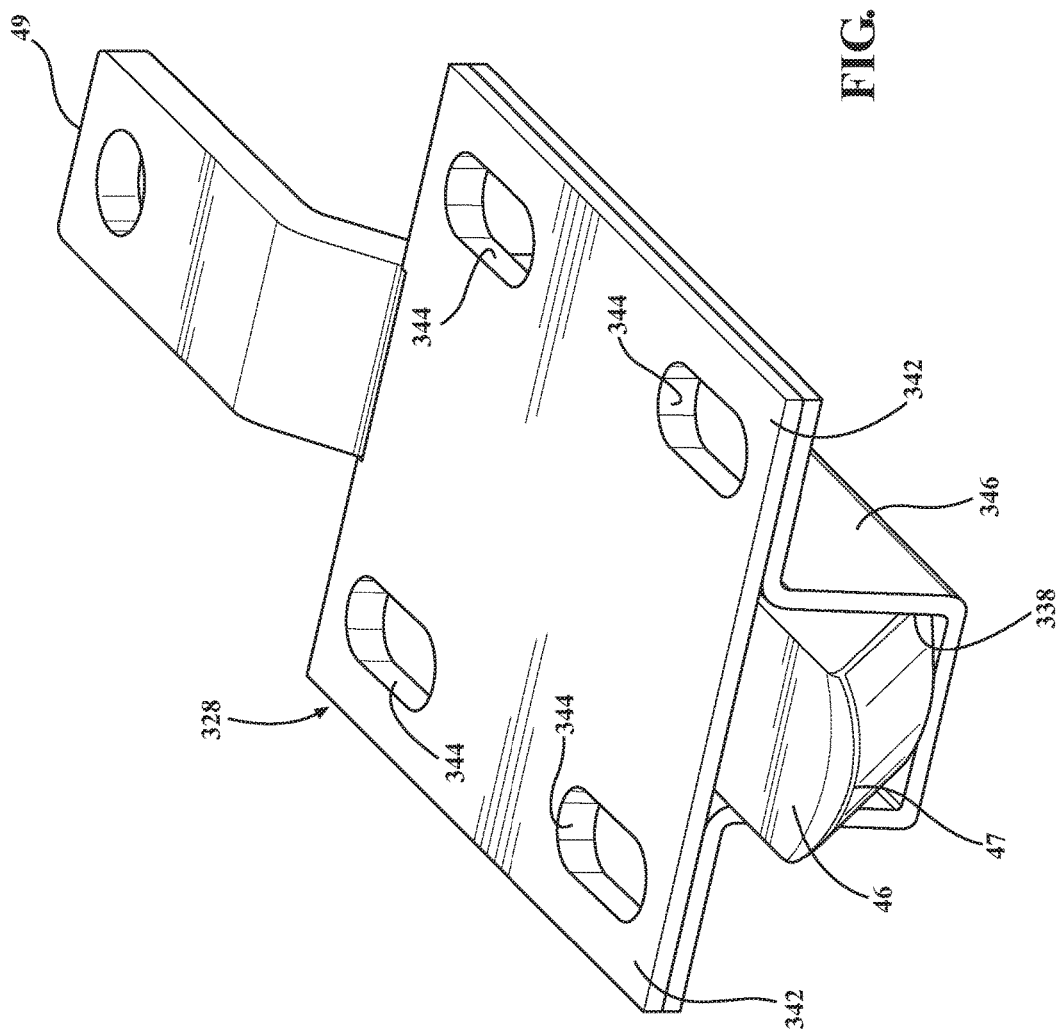
FIG. 30 is a perspective view of a first portion of the first adjustment mechanism and a portion of the first latch mechanism coupled to the first portion of the adjustment mechanism of the foldable flexible tonneau cover system.
Figure 31:
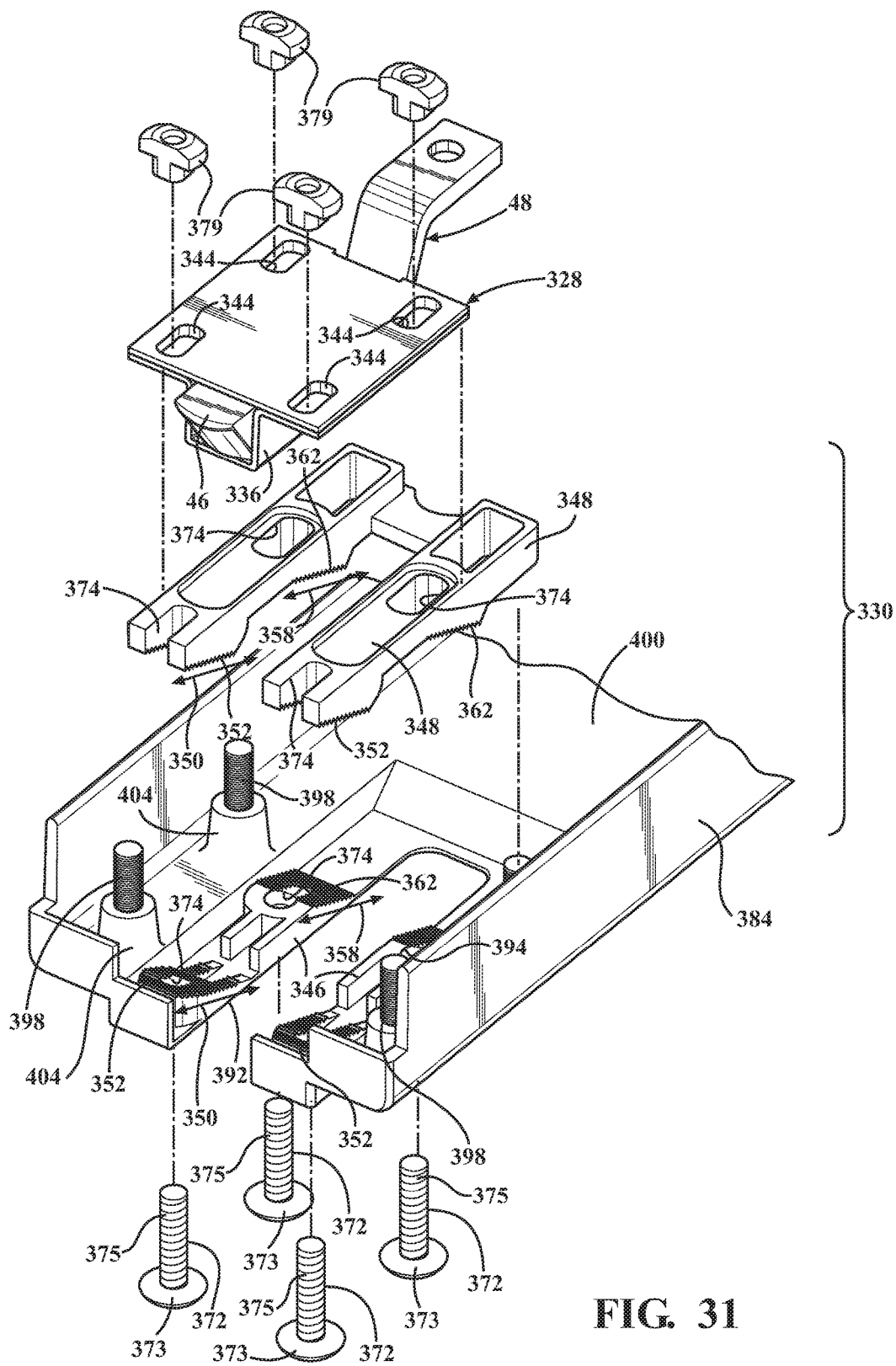
FIG. 31 is an exploded view of a portion of the foldable flexible tonneau cover system.

As shown in FIGS. 27 and 30, the first portion 328 of the adjustment mechanism 306 has first 360 and second 364 plates joined to one another to form a single component. In one example, the first 360 and second 364 plates are welded to one another such as by stamp welding. In another embodiment, the first plate 360 may be integral with the second plate 364 to form the single component.

The first portion 328 is coupled to the first catch 46 and the adjustment mechanism 306 further includes a second portion 330 interacting with the first portion 328 to adjust the vertical position of the first catch 46. The first portion 328 of the adjustment mechanism 306 includes a catch housing 336 for receiving and supporting at least a portion of the catch 46 of the latch mechanism 48. The catch housing 336 defines a first opening 338 and a second opening (not shown). The front end 47 of the catch 46 protrudes through the first opening 338 when the catch 46 is biased toward the side rail 28 in the latch position. When in the unlatch position, the catch 46 is moved opposite the biasing direction and a majority of the front end 47 of the catch 46 is moved inside the catch housing 136. The tail end 49 of the catch 46 protrudes through the second opening when the catch 46 is in the latch and unlatch positions, with more of the tail end 49 protruding through the second opening when the catch 46 is in the unlatch position compared to when the catch 46 is in the latch position.

The first portion 328 of the adjustment mechanism 306 further has a flange 342 with the second portion 330 of the adjustment mechanism 306 engaging the flange 342. As shown at least in FIG. 30, and in an embodiment, the first portion 328 of the adjustment mechanism 306 has two flanges 342, with each flange 342 extending from the catch housing 336 in opposite directions. Each of the flanges 342 defines a plurality of apertures 344 having an oval configuration.

The second portion 330 of the adjustment mechanism 306 has a fixed segment 346 fixed to the frame 264 and a moveable segment 348 moveable relative to the fixed segment 346. The fixed segment 346 is integral with the housing 384 of the inner frame member 298. The moveable segment 348 abuts the first portion 328. The moveable segment 348 is also sandwiched between the first portion 328 and the fixed segment 346 of the second portion 330. As shown, the flange 342 of the first portion 328 extends over and engages the moveable segment 348 with the moveable segment 348 located between the housing 384 and the flange 342. In addition, the housing 380 defines a slot 392, and the first portion 328 is partially disposed within the slot 392. The fixed segment 346 is integral with the housing 384 and partially surrounds the slot 392 defined in the housing 384.

At least one of the first 328 and second 330 portions of the adjustment mechanism 306 forms a sloped profile 350. In an embodiment, the second portion 330 forms the sloped profile 350. In another embodiment, at least one of the fixed segment 346 and the moveable segment 348 forms the sloped profile 350. In this embodiment, at least one of the fixed segment 346 and the moveable segment 348 defines a plurality of notches 352 forming the sloped profile 350, and the other of the fixed segment 346 and the moveable segment 348 engages the plurality of notches 352. In yet another embodiment, both of the fixed segment 346 and the moveable segment 348 form a sloped profile 350. In this embodiment, the fixed segment 346 defines a plurality of notches 352 forming the sloped profile 350 on the fixed segment 346, and the moveable segment 348 defines a plurality of notches 352 forming the sloped profile 350 on the moveable segment. The plurality of notches 352 of the fixed segment 346 and the plurality of notches 352 of the moveable segment 348 engage one another.

The configuration of the sloped profile 350 is similar the sloped profile 150 as described above for the foldable hard tonneau cover system 10. In addition, the plurality of notches 352 forming the sloped profile 350 of the fixed segment 346 and the plurality of notches 352 forming the sloped profile 350 of the moveable segment 348 has the same configuration as the plurality of notches 152 as previously described for the foldable hard tonneau cover system 10.

In an embodiment, the sloped profile 350 of the fixed segment 346 is further defined as a first sloped profile 350, and the fixed segment 346 further has a second sloped profile 358. The second sloped profile 158 is spaced from the first sloped profile 350 of the fixed segment 346. Similarly, the sloped profile 350 of the moveable segment is further defined as a first sloped profile 350, and the moveable segment 348 further has a second sloped profile 358. The second sloped profile 358 of the fixed segment 346 may be the same or different in configuration compared to the first sloped profile 350 of the fixed segment 346. Similarly, the second sloped profile 358 of the moveable segment 348 may be the same or different in configuration compared to the first sloped profile 350 of the moveable segment 348. For example, the fixed segment 346 defines a second plurality of notches 362 forming the second sloped profile 358 on the fixed segment 346, and the moveable segment 348 defines a second plurality of notches 362 forming the second sloped profile 358 on the moveable segment 348. The configuration of the second plurality of notches 362 may be the same as or different from the configuration of the first plurality of notches 352.

The slope of the second sloped profile 358 may be the same as or different from the slope of the first sloped profile 350. In the embodiment shown, the slope of the second sloped profile 358 of the fixed segment 346 is substantially the same as the slope of the first sloped profile 350 of the fixed segment 346. Similarly, the slope of the second sloped profile 358 of the moveable segment 348 is substantially the same as the slope of the first sloped profile 350 of the moveable segment 348. To this end, the first sloped profile 350 is parallel to the second sloped profile 358.

Figure 28:
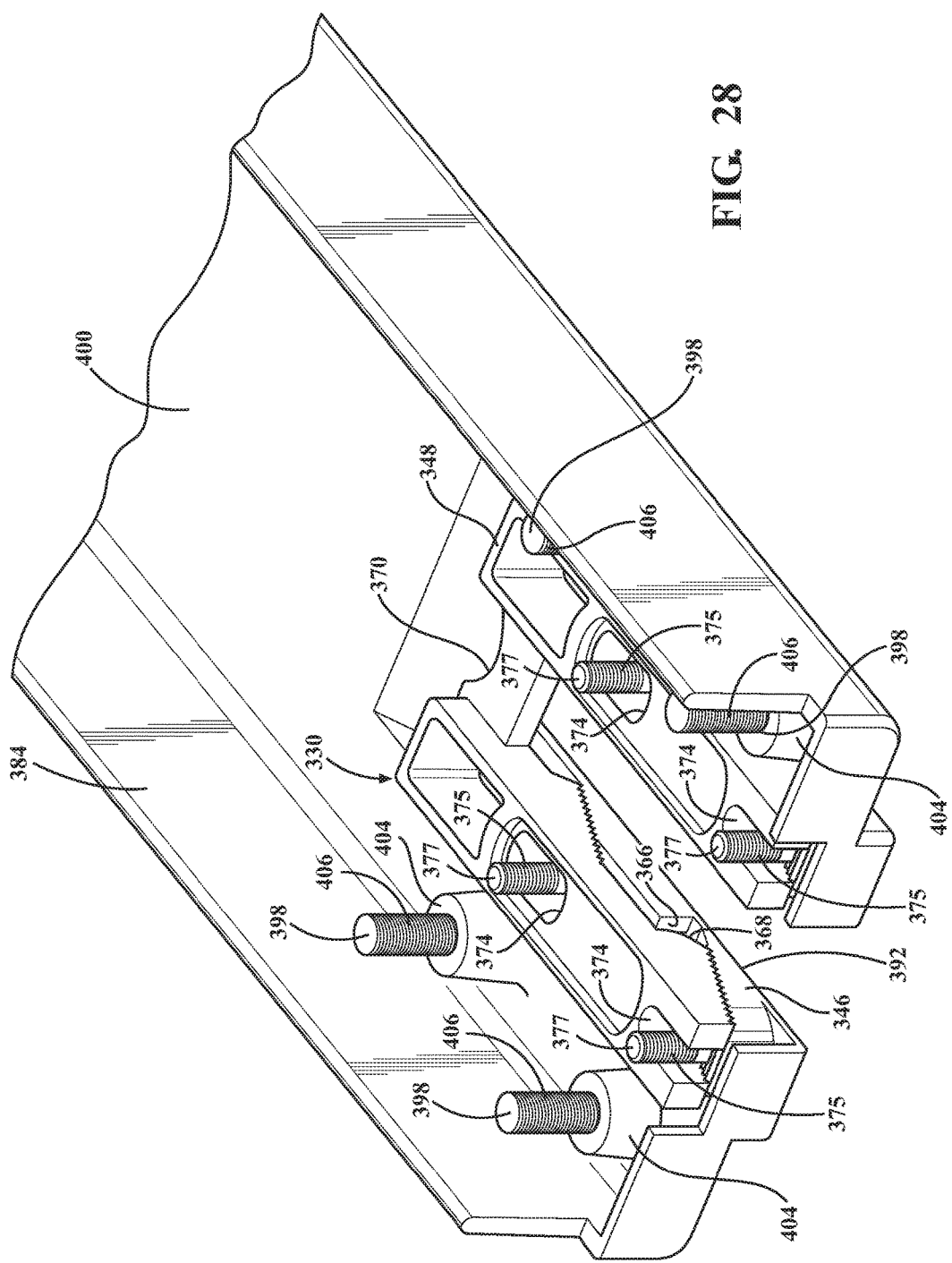
FIG. 28 is an enlarged portion of the top perspective view of the portion of the cover assembly of FIG. 26 with the mounting device and a first portion of the first adjustment mechanism removed.
Figure 29:
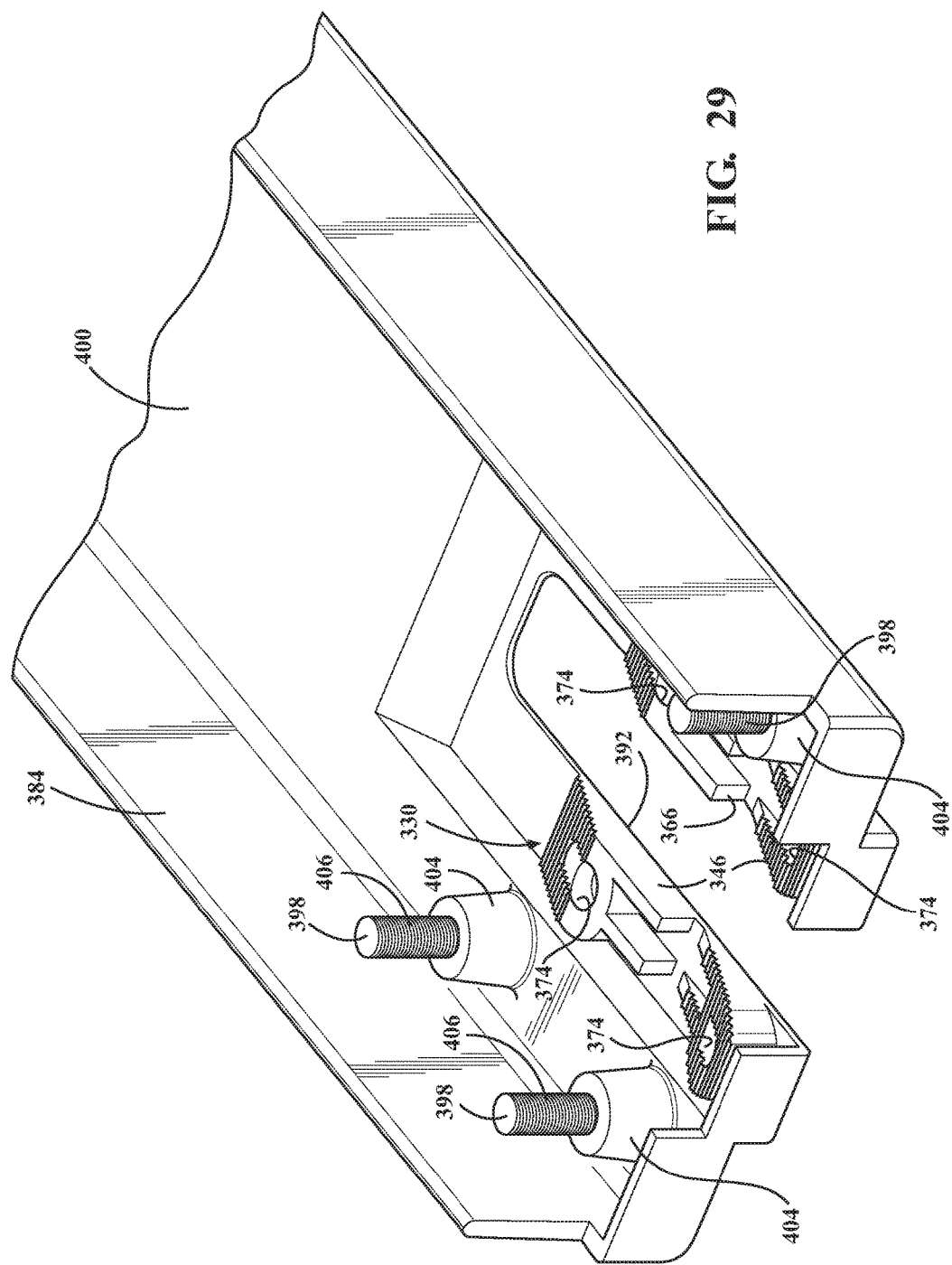
FIG. 29 is an enlarged top perspective view of the portion of the cover assembly of FIG. 26 with the mounting device, the first portion of the first adjustment mechanism, and a moveable segment of a second portion of the first adjustment mechanism removed.

As shown at least in FIG. 28, the fixed segment 346 has a stop 366 and the moveable segment 348 has a stop 368. As described in further detail below, the moveable segment 348 is moveable along the width-wise axis $A_W$ to adjust the vertical position of the catch 46. In an embodiment, the moveable segment 348 may be moved along the width-wise axis $A_W$ until the stop 368 of the moveable segment 348 engages the stop 366 of the fixed segment 346. At this point, an operator may not be able to move the moveable segment 348 further along the width-wise axis $A_W$.

In an embodiment, the second portion 330 of the adjustment mechanism 306 further has a tab 370, with the tab 370 being actuatable to manually effect movement of the second portion 330 along the width-wise axis $A_W$. In the embodiment shown, the tab 370 is defined in the moveable segment 348 of the second portion 330. When the cover assembly 262 is disposed on and completely covers the cargo bed 12, the tab 370 is accessible from under the cover assembly 262. As described further below, an operator can grasp and move the tab 370 to effect movement of the moveable segment 348 along the width-wise axis $A_W$ when adjusting the vertical position of the catch 46.

In an embodiment, and as shown at least in FIGS. 26 and 32A-32E, the cover assembly 262 further includes a mounting device 394 covering the adjustment mechanism 306. The mounting device 394 is spaced from the first portion 328 to define a gap 396 between the mounting device 394 and the first portion 328 to allow movement of the first portion 328 relative to the mounting device 394. The cover assembly 262 further includes a plurality of mounting fasteners 398 extending through a floor 400 of the housing 384 and through the mounting device 394 to secure the first 328 and second 330 portions of the adjustment mechanism 306 within the housing 384. As shown, each of the mounting fasteners 398 have a spacer 404 and a threaded portion 406 extending through the spacer 404. It is to be appreciated that the mounting fasteners 398 are not intended to be loosened or removed during adjustment of the catch 46. As shown in FIG. 21, for example, the mounting device 394 is mounted to the outer frame member 290 to mount the inner frame member 298 to the outer frame member 290. In an embodiment, the mounting device 394 is mounted to the outer frame member 290 utilizing one or more fasteners, etc.

The cover assembly 262 further includes a plurality of adjustment fasteners 372 extending through the first 328 and second 330 portions of the adjustment mechanism 306. As previously mentioned, the first portion 328 has the apertures 344 having the oval configuration. The second portion 330 also has apertures 374 having an oval configuration. In addition, the apertures 374 may be closed or open. The size of the apertures 374 of the second portion 330 may be the same or different than the size of the apertures 344 of the first portion 328. The apertures 344 of the first portion 328 are aligned with the apertures 374 of the second portion 330, and the fasteners 372 extend through the aligned apertures 344, 374. The oval configuration of the aligned apertures 344, 374 enables movement of the first 328 and second 330 portions relative to the fasteners 372. In the illustrated embodiment, each of the fixed segment 346 and the moveable segment 348 of the second portion 330 has the plurality of apertures 374, with the plurality of apertures 374 of the moveable segment 348 having the oval configuration. The fasteners 372 extend through the aligned apertures 344, 374 of the first portion and the fixed 328 and moveable 330 segments. The oval configuration of the apertures 344 of the first portion 328 and the apertures 374 of the moveable segment 348 enable movement of the moveable segment 348 relative to the fasteners 372.

In addition, and as shown, the apertures 374 of the fixed segment 346 have substantially the same configuration as the fasteners 374. At least because of this configuration, the fixed segment 346 remains substantially stationary when the second portion 330 of the adjustment mechanism 306 is adjusted.

Each of the fasteners 372 has a head portion 373 and a threaded portion 375 having a tip 377. Unlike the foldable hard tonneau cover system 10, the fasteners 372 of the foldable flexible tonneau cover system 200 are arranged such that the head portion 373 of the fasteners 372 is exposed through the bottom of the housing 384 of the inner frame member 398 and is accessible by an operator when adjusting the catch 46 of the latch mechanism 48. The threaded portion 375 of the fasteners 372 extends upwards through the aligned apertures 344, 374 and the tip 377 mates with a nut 379 to secure the adjustment mechanism 306 in position. In an embodiment, the nut 379 has a T-shaped configuration and sits within the aperture 344 defined in the first portion 328 of the adjustment mechanism 306 such that the nut 379 does not rotate when the fasteners 372 are loosened during adjustment of the catch 46.

As mentioned above, the adjustment mechanism 306 is used to adjust a lateral and/or vertical position of the catch 46 of the latch mechanism 48. Examples of the vertical and/or lateral adjustment of the catch 46 are described below with reference to FIGS. 32A-32E.

FIG. 32A illustrates a portion of the cover assembly 266 prior to adjustment of a position of the catch 46. As shown, the front end 47 of the catch 46 extends a first lateral distance $D_{L1}$ from the fixed segment 346 of the second portion 330 of the adjustment mechanism 306. The front end 47 of the catch 46 also extends a first vertical distance $D_{V1}$ from a plane P defined by the lower surface 265 of the frame 264 of the cover assembly 262.

The position of the catch 46 may be adjusted manually. For example, the operator can lower the tailgate 18 and reach under the cover assembly 262 for access to the adjustment mechanism 306. As shown in FIG. 32B, the operator can loosen each of the fasteners 372. Once the fasteners 372 are loosened, the operator can manually adjust the lateral and/or vertical position of the catch 46. In one example, the lateral position of the catch 46 is adjusted by moving the first portion 328 along the width-wise axis $A_W$ relative to the second portion 330. As mentioned above, adjustment of the lateral position of the catch 46 is independent of the movement of the catch 46 between the latch and unlatch positions. This may be accomplished, for example, by grasping the catch housing 336 exposed through the slot 392 defined in the housing 384 and pushing the first portion 328 in either direction along the width-wise axis $A_W$ with the operator's hand as shown in FIG. 32C.

It is to be appreciated that with the fasteners 372 being loosened, rather than being removed, the first portion 328 is also moveable relative to the fasteners 372. The distance that the first portion 328 can be moved is typically restricted by the diameter of the oval configuration of the apertures 344, 374 through which the fasteners 372 are disposed. Accordingly, the amount of adjustment of the lateral position of the catch 46 is restricted may be due, at least in part, to the restricted movement of the first portion 328 relative to the fasteners 372.

In the example shown in FIG. 32C, the operator moves the first portion 328 of the adjustment mechanism 306 towards the right (which would be toward the side rail 28) to adjust the lateral position of the catch 46. The first portion 328 of the adjustment mechanism 306 is moved such that the front end 47 of the catch extends a second lateral distance $D_{L2}$ from the second portion 330 of the adjustment mechanism 306. Since the first portion 328 has been moved, the second lateral distance $D_{L2}$ is larger than the first lateral distance $D_{L1}$.

The operator can also manually adjust the vertical position of the catch 46. The operator can use the adjustment mechanism 306 to adjust the vertical position of the catch 46 relative to the frame 264 transverse to the width-wise axis $A_W$. Once the fasteners 372 are loosened, the operator can grasp the tab 370 defined in the moveable segment 348 of the adjustment mechanism 306. This is shown in FIG. 32D. The operator can push or pull the moveable segment 348 in either direction along the width-wise axis $A_W$ to manually move the moveable segment 348 of the adjustment mechanism 306 along the width-wise axis $A_W$. In the present embodiment, the moveable segment 348 moves relative to the first portion 328 of the adjustment mechanism 306 to adjust the vertical position of the catch 46.

When the moveable segment 348 is moved along the width-wise axis $A_W$, the plurality of notches 352, 362 of the moveable segment 348 moves along or follows the plurality of notches 352, 362 of the fixed segment 346. In an example, the moveable segment 348 is moveable in increments as each notch of the plurality of notches 352, 362 of the moveable segment 348 engages the plurality of notches 352, 362 of the fixed segment 346. Alternatively, the moveable segment 348 could be moved a predefined distance along the width-wise axis $A_W$, rather than notch-by-notch. For instance, the moveable segment 348 could be separated slightly from the fixed segment 346 to disengage the notches 352, 362 of the fixed 346 and moveable 348 segments, moved a predefined distance along the width-wise axis $A_W$, and then brought back into contact with the fixed segment 346 to re-engage the notches 352, 362 of the fixed 346 and moveable 348 segments.

FIG. 32D illustrates the positioning of the adjustment mechanism 306 after the moveable segment 348 has been moved along the width-wise axis $A_W$. When the moveable segment 348 is moved, the second portion 330 of the adjustment mechanism 306 moves the catch 46 of the latch mechanism 48 to adjust the vertical position of the catch 46. For example, when the moveable segment 348 is moved toward the side rail 28 (i.e., to the right-hand-side of the figure), the moveable segment 348 moves relative to the fixed segment 346 in an upwards direction as the plurality of notches 352, 362 of the moveable segment 248 moves along or follows the plurality of notches 352, 362 of the fixed segment 346. The moveable segment 348 causes the first portion 328 of the adjustment mechanism 306 and the latch mechanism 48, which is coupled to the first portion 328, to move upwards as well. In the example shown in FIGS. 32A and 32D, the second portion 330 of the adjustment mechanism 306 moves the catch 46 between a first position spaced a first vertical distance $D_{V1}$ relative to the plane P of the frame 264 (as shown in FIG. 32A) and a second position spaced a second vertical distance $D_{V2}$ relative to the plane P (as shown in FIG. 32D). In the example shown, when the moveable segment 348 is moved toward the side rail 28, the second vertical distance $D_{V2}$ is greater than the first vertical distance $D_{V1}$, indicating an adjustment in the vertical position of the catch 46.

With the fasteners 372 being loosened, rather than removed, the moveable segment 348 is moveable relative to the fasteners 372 as mentioned above. It is to be understood that the distance that the moveable segment 348 can be moved is typically restricted by the diameter of the oval configuration of the apertures 344, 374 through which the fasteners 372 are disposed. Accordingly, the amount of adjustment of the vertical position of the catch 46 is restricted may be due, at least in part, to the restricted movement of the moveable segment 348 relative to the fasteners 372.

The vertical and lateral positions of the catch 46 may be adjusted independently, as described above. In an embodiment, the vertical and lateral positions of the catch 46 may be adjusted at the same time. Said differently, the first portion 328 of the adjustment mechanism 306 may be adjustable along the width-wise axis $A_W$ to adjust the lateral position of the catch 46 simultaneously with the second portion 330 interacting with the first portion 328 to adjust the vertical position of the catch 46. This is shown in FIG. 32E. In this embodiment, the first portion 328 of the adjustment mechanism is moved at the same time as the moveable segment 348 of the second portion 330 of the adjustment mechanism 306. The movement of both the first 328 and second 330 portions of the adjustment mechanism causes simultaneously adjustment of the vertical and lateral positions of the catch 46.

The tonneau cover system 10, 200 is described in detail above as being coupled to the cargo bed 12 of the vehicle 14. It is to be appreciated, however, that the tonneau cover system 10, 200 could alternatively be used for covering another space defined by the vehicle 14, not limited to the cargo bed 12. For instance, the tonneau cover system 10, 200 could be used for covering a passenger compartment of a vehicle, a storage compartment of a vehicle, etc. It is also to be appreciated that the tonneau cover system 10, 200 can be used for other purposes not specifically related to vehicles, such as for homes, buildings, boats, etc.

While the invention has been described with reference to the examples above, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all examples falling within the scope of the appended claims.

What is claimed is:

1. A tonneau cover system for a cargo bed of a vehicle, said system comprising:
a first side rail adapted to be mounted about the cargo bed of the vehicle with said first side rail having a first receiving feature;
a second side rail adapted to be mounted about the cargo bed of the vehicle with said second side rail spaced from said first side rail to define a width-wise axis extending between said side rails and adapted to extend along a width of the cargo bed;
a cover assembly coupled to said side rails with said cover assembly comprising:
a frame;
a cover disposed over and coupled to said frame for covering the cargo bed of the vehicle;
a latch mechanism coupled to said frame with said latch mechanism having a catch biased toward a latch position to engage said first receiving feature to secure said cover to said first side rail and said catch being retractable to an unlatch position spaced from said first receiving feature to release said cover from said first side rail;
a release device coupled to said frame and latch mechanism, and actuatable to move said catch to said unlatch position; and
an adjustment mechanism coupled to said latch mechanism with said adjustment mechanism having a first portion coupled to said catch and a second portion interacting with said first portion to adjust a vertical position of said catch relative to said frame transverse to said width-wise axis with at least one of said first and second portions forming a sloped profile.

2. The tonneau cover system as set forth in claim 1 wherein said second portion of said adjustment mechanism has a fixed segment fixed to said frame and a moveable segment moveable relative to said fixed segment.

3. The tonneau cover system as set forth in claim 2 wherein said moveable segment is moveable along said width-wise axis to adjust said vertical position of said catch.

4. The tonneau cover system as set forth in claim 2 wherein said moveable segment abuts said first portion and said moveable segment moves relative to said first portion to adjust said vertical position of said catch.

5. The tonneau cover system as set forth in claim 2 wherein said first portion has a flange with said moveable segment engaging said flange.

6. The tonneau cover system as set forth in claim 2 wherein at least one of said fixed segment and said moveable segment forms said sloped profile.

7. The tonneau cover system as set forth in claim 6 wherein said at least one of said fixed segment and said moveable segment defines a plurality of notches forming said sloped profile, and the other of said fixed segment and said moveable segment engages said plurality of notches.

8. The tonneau cover system as set forth in claim 2 wherein both of said fixed segment and said moveable segment form a sloped profile.

9. The tonneau cover system as set forth in claim 8 wherein said fixed segment defines a plurality of notches forming said sloped profile on said fixed segment and said moveable segment defines a plurality of notches forming said sloped profile on said moveable segment, with said plurality of notches of said fixed segment and said plurality of notches of said moveable segment engaging one another.

10. The tonneau cover system as set forth in claim 9 wherein said plurality of notches of said fixed segment is complementary in configuration to said plurality of notches of said moveable segment.

11. The tonneau cover system as set forth in claim 2 wherein said fixed segment has a stop and said moveable segment has a stop with said stop of said moveable segment engaging said stop of said fixed segment to prevent movement of said moveable segment along said width-wise axis.

12. The tonneau cover system as set forth in claim 2 wherein said sloped profile is further defined as a first sloped profile and further including a second sloped profile spaced from said first sloped profile.

13. The tonneau cover system as set forth in claim 12 wherein said first sloped profile is parallel to said second sloped profile.

14. The tonneau cover as set forth in claim 1 wherein said frame has upper and lower surfaces with said lower surface defining a plane extending along said frame with said second portion moving said catch between a first position spaced a first distance relative to said plane and a second position spaced a second distance relative to said plane with said second distance being different from said first distance.

15. The tonneau cover system as set forth in claim 1 wherein said cover assembly further includes a plurality of fasteners extending through said first and second portions of said adjustment mechanism with said first and second portions having apertures with oval configurations to enable movement relative to said fasteners.

16. The tonneau cover system as set forth in claim 2 wherein said cover assembly further includes a plurality of fasteners extending at least through said first portion and said fixed and moveable segments of said second portion, with said moveable segment having a plurality of apertures each having an oval configuration to enable movement of said moveable segment relative to said fasteners.

17. A tonneau cover system for a cargo bed of a vehicle, said system comprising:
a first side rail adapted to be mounted about the cargo bed of the vehicle with said first side rail having a first receiving feature;
a second side rail adapted to be mounted about the cargo bed of the vehicle with said second side rail spaced from said first side rail to define a width-wise axis extending between said side rails and adapted to extend along a width of the cargo bed;
a cover assembly coupled to said side rails with said cover assembly comprising:
a frame;
a cover disposed over and coupled to said frame for covering the cargo bed of the vehicle;
a latch mechanism coupled to said frame with said latch mechanism having a catch biased toward a latch position to engage said first receiving feature to secure said cover to said first side rail and said catch being retractable to an unlatch position spaced from said first receiving feature to release said cover from said first side rail;
a release device coupled to said frame and latch mechanism, and actuatable to move said catch to said unlatch position; and
an adjustment mechanism coupled to said latch mechanism with said adjustment mechanism having a first portion coupled to said catch and adjustable along said width-wise axis to adjust a lateral position of said catch independent of said movement of said catch between said latch and unlatch positions, and said adjustment mechanism further including a second portion interacting with said first portion to adjust a vertical position of said catch relative to said frame transverse to said width-wise axis.

18. The tonneau cover system as set forth in claim 17 wherein said second portion of said adjustment mechanism has a fixed segment fixed to said frame and a moveable segment moveable relative to said fixed segment.

19. The tonneau cover system as set forth in claim 18 wherein said moveable segment is moveable along said width-wise axis to adjust said vertical position of said catch.

* * * * *